US007194095B2

(12) United States Patent
Cheng

(10) Patent No.: US 7,194,095 B2
(45) Date of Patent: Mar. 20, 2007

(54) ANTI-NOISE PICK-UP

(76) Inventor: Ziyi Cheng, 4 Bld 4 Dr., Apt 501, Fenghe Dong Yuan, Baidi Rd., Naikai Distr. (CN)

( * ) Notice: Subject to any disclaimer, the term of this patent is extended or adjusted under 35 U.S.C. 154(b) by 788 days.

(21) Appl. No.: 10/203,107

(22) PCT Filed: Feb. 2, 2001

(86) PCT No.: PCT/CN01/00108

§ 371 (c)(1),
(2), (4) Date: Aug. 2, 2002

(87) PCT Pub. No.: WO01/63969

PCT Pub. Date: Aug. 30, 2001

(65) Prior Publication Data

US 2003/0021425 A1 Jan. 30, 2003

(30) Foreign Application Priority Data

Feb. 3, 2000 (WO) .................... PCT/CN00/00775
Oct. 24, 2000 (WO) .................... PCT/CN00/00358

(51) Int. Cl.
*H04B 15/00* (2006.01)

(52) U.S. Cl. .................................... 381/94.1; 381/71.1

(58) Field of Classification Search ................. 381/92, 381/94.1, 94.7, 71.1, 313, 317, 321, 355–358, 381/170
See application file for complete search history.

(56) References Cited

U.S. PATENT DOCUMENTS

| | | | | |
|---|---|---|---|---|
| 3,995,124 | A * | 11/1976 | Gabr | 381/357 |
| 5,381,473 | A * | 1/1995 | Andrea et al. | 381/94.7 |
| 6,547,620 | B1 * | 4/2003 | Hatamura et al. | 455/415 |

* cited by examiner

*Primary Examiner*—Ping Lee

(57) ABSTRACT

An individual-type or combined-type of high performance noise-canceling pickup with front and rear sound inlets that are roughly toward the same direction or perpendicular to each other is provided to be composed of a plurality of noise-canceling sensors. The noise-canceling performance of that pickup is much better than that of only individual-type noise canceling pickup with the sound inlets on the front wall of the front cover and the rear wall of the rear cover. Even in the extremely bad circumstances of high volume of noise, high signal/noise ratio can be still maintained so that voice is distinct.

22 Claims, 41 Drawing Sheets

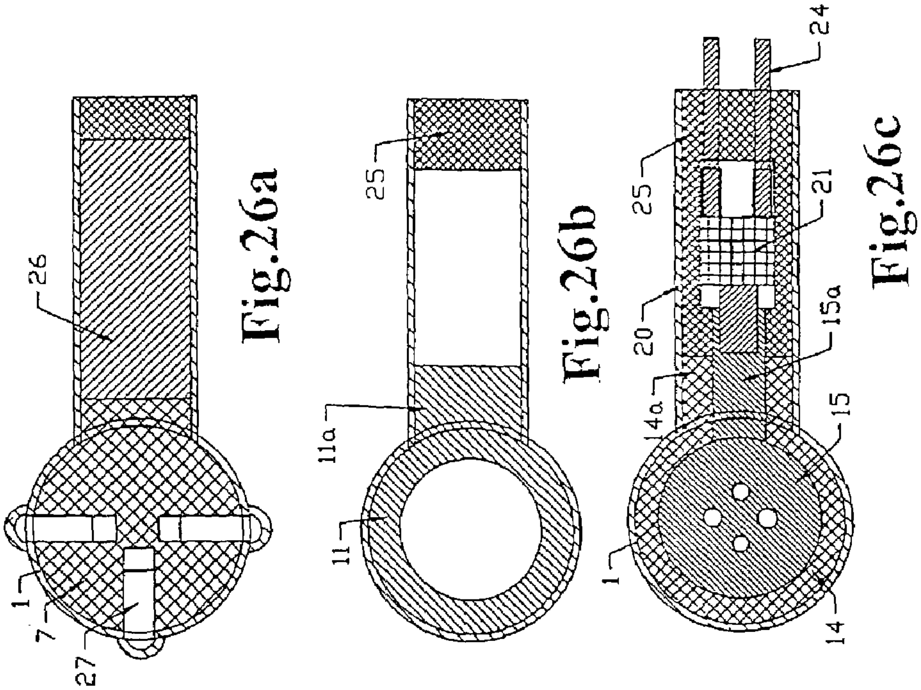
Fig.26a
Fig.26b
Fig.26c
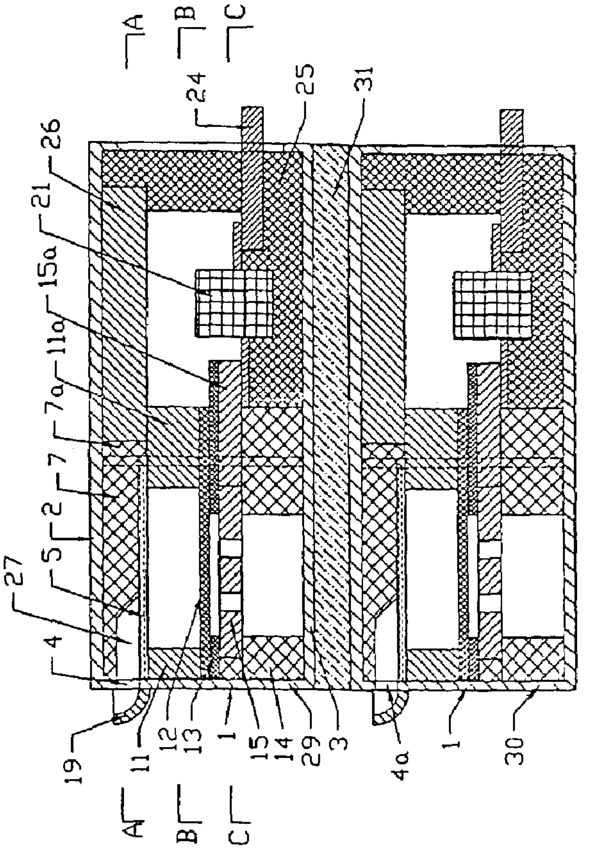
Fig.26

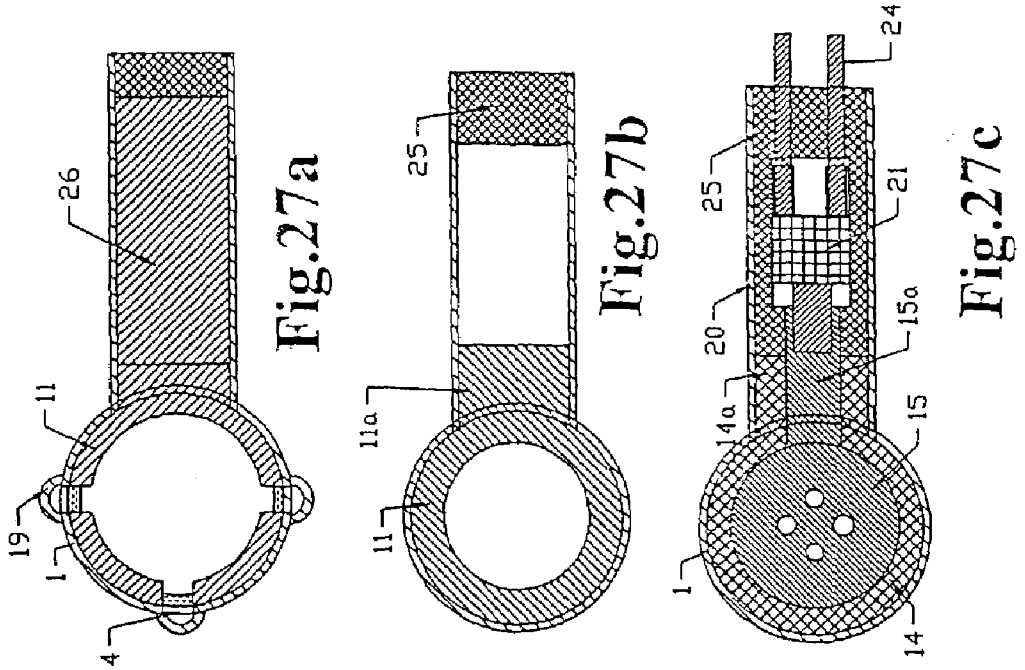
Fig.27a
Fig.27b
Fig.27c
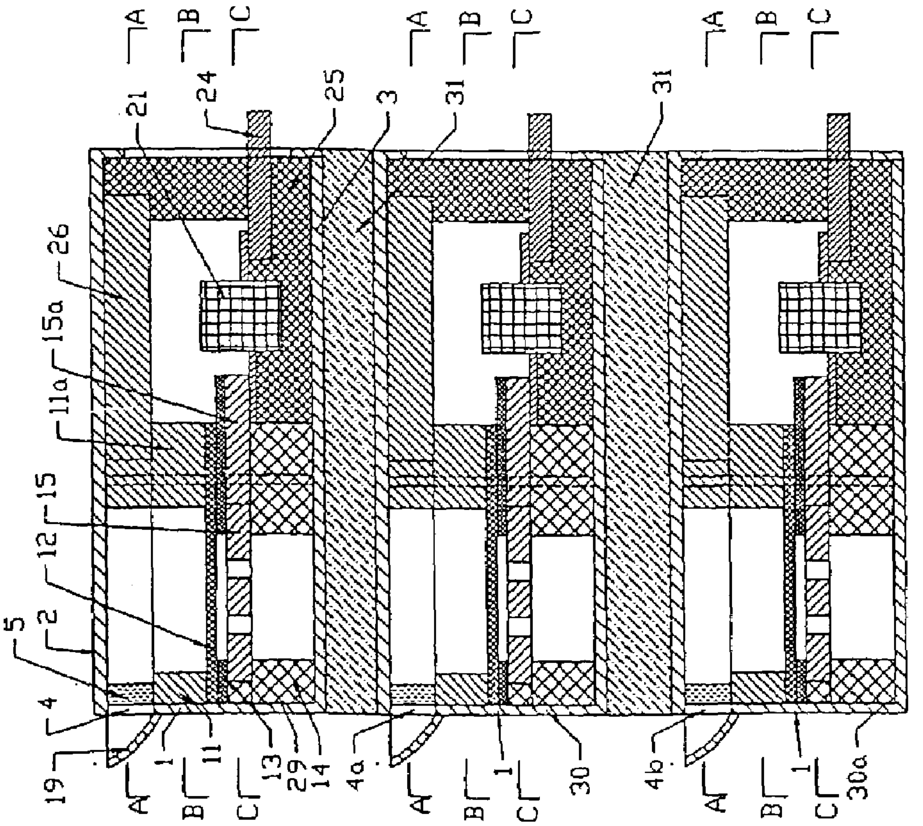
Fig.27

ANTI-NOISE PICK-UP

The present invention relates to a pickup. In particular, the present invention relates to an individual-type or a combined-type noise-canceling pickup with the orientations of its front and rear sound inlets being roughly toward the same or perpendicular to each other.

When receiving voice, especially in a relatively high frequency band, it is desirable that pickups used in both communication systems and our daily life are able to reduce ambient noises as much as possible, while not decreasing or notably lowering sensitivity of the pickups. Particularly, when used in high noise environment, it is more important for the pickups to have a strong noise-canceling ability. Therefore, the main objective of the present invention is to provide an improved pickup, which has an excellent ability to cancel noise.

The technical solutions disclosed in the present application are novel improvements over several previous patent applications commonly owned by the present inventor. The present inventor's prior patent applications PCT/CN99/00097 (electret noise-canceling pickup), CN Utility Model Application No.98207092.6, and CN Utility Model Application No. 99217256.X, disclosed in detail the electret noise-canceling pickup and the whole structure and internal assembling interrelationship of a combined noise-canceling pickup. These pickups are composed of two portions, i.e. a main cylinder body and a rear cylinder body. As an individual type of noise-canceling pickup, the individual-type noise-canceling pickup has such advantages as high signal/noise ratio, as well as excellent noise-canceling ability even in high frequency band. It is light in structure, easy to assemble. The microphone no longer needs a shell and can be directly fixed on other external devices. However, as the front and rear sound inlets of the individual-type electret noise-canceling pickup are located on the front wall of the front cover and the rear wall of the rear cover of the pickup body, one faces right to the main sound source and the other one is deviated from the main sound source. Therefore, if the pickup is over 10 cm away from the main sound source, the sound wave arriving at that point is close to a plane wave, thus, a significant difference in characteristics between the two sound waves at front sound inlet and rear sound inlet will occur, which will affect the noise canceling result, even though the thickness of the main cylinder body has been reduced. Under certain adverse circumstances, such as high noise environment, the individual-type noise-canceling pickup does not show sufficient noise-canceling ability. Especially, when used for signal input in a computer voice-identification system, the individual-type noise-canceling pickup does not meet the needs. Hence, it is an urgent task to design a noise-canceling pickup with an assembled structure, which has an improved ability to cancel noises and other excellent performances even in adverse circumstances of high noise or used for voice signal input at higher frequency band. Therefore, it is desirable to design a pickup with a strong noise-canceling ability, in which front and rear sound inlets face roughly the same direction or face to directions substantially perpendicular to each other.

In conventional electret non-anti-noise pickups, components not for receiving voice signal, such as an impedance conversion circuit, are directly arranged within the cylinder body of the non-anti-noise pickup, resulting in a thick profile of the pickup. In the noise-canceling pickup with front and rear sound inlets facing roughly the same direction or perpendicular to each other according to the present invention; however, two individual electret noise-canceling sound sensors or two individual non-anti-noise electret sound sensors are arranged to overlap each other. The effect of noise canceling and the frequency range of noise canceling are directly associated with the distance between the two voice receiving ports, which receive voice from a main voice resource, of the two individual sound sensors. In other words, the shorter the distance is, the better effect of noise canceling is obtained, and the wider frequency range of noise canceling is applicable. According to the above-mentioned patent applications of the present inventor, the drawback resulted from the big value thickness of the voice receiving portion of the main cylinder body of the electret noise canceling pickup has been overcome. The thickness of the voice receiving portion of the main cylinder body can be reduced to 0.2 to 20 mm based on the design or process requirements, and can be thinner or thicker than 0.2 to 20 mm if necessary. In the conventional non-anti-noise electret pickup, the corresponding thickness is relatively large, and there is a gap between the two individual sound sensors for voice entering into, so that the two voice receiving ports of the main voice resource of the two individual sound sensors is far away from each other. As a result, the required performance can not be obtained.

In conventional electret non-anti-noise pickups, the sound inlet is on the front wall of the front cover. In the noise-canceling pickup with front and rear sound inlets facing roughly the same direction or perpendicular to each other according to the present invention, however, two individual electret noise-canceling sound sensors or two individual non-anti-noise electret sound sensors are arranged to overlap each other. In order to let the sound wave go into the inlet on the front wall of the front cover of the rear sound sensor, a sound pass should be set up between two front and rear non-anti-noise electret sound sensors to increase the distance between two sound sensors.

As the pickup of the present invention cancels environmental noise by means of different distances between the pickup and the main sound source and between the pickup and the environmental noise, it is a sound device very sensitive to the distance between the pickup and the main sound source. When it exceeds effective receiving distance, the sound signal from the main sound source will be attenuated rapidly; therefore, an alarming signal for exceeding the receiving distance should be generated timely. In addition, an amplifying ratio control circuit that can automatically adjust the amplifying ratio according to the distance between the pickups and the main sound source is needed.

The object of the present invention is to provide a noise canceling pickup with front and rear sound inlets that face roughly the same direction or substantially perpendicular to each other, which has a high ability to cancel noises, and overcomes the drawbacks of conventional individual noise canceling sound sensors, which has an insufficient ability to cancel noise in adverse circumstances of high noises.

Another object of the present invention is to provide a noise canceling pickup with front and rear sound inlets that face roughly the same direction or substantially perpendicular to each other to control the tolerance of the parts and raise the yield when producing in large scale.

Another object of the present invention is to provide a kind of pickup, which has the sound inlets on the sidewalls of non-anti-noise sound sensors. This kind of pickup can be used for places where the sound inlets need to be on the sidewall. For example, in case that several non-anti-noise sound sensors ranged front and back are used to form a noise canceling pickup, if the conventional non-anti-noise pickup has its sound inlet on its front wall of the front cover, in order to let sound wave go into the sound inlets on the front wall of the front cover of the rear sound sensor, a sound pass between front and rear sound sensors will need to be set up. In the case of a pickup with its sound inlets on its sidewall, a sound pass will not be needed and, thus, the distance between front and rear sound inlets of a noise canceling pickup that includes a plurality of non-anti-noise sensors can be reduced. Of course, this kind of pickup is also suitable for use in places where other conventional pickups are usually used.

Another object of the present invention is to provide a device and a circuit, which can monitor whether or not the distance between the pickup and the main sound source exceeds the receiving distance, make an over-distance alarm and adjust the amplifying ratio of the amplifier according to the distance between the pickup and the main sound source.

A noise-canceling pickup according to one embodiment of the present invention comprises a main cylinder body and a rear cylinder body. The main cylinder body has one or more noise-canceling sound sensors and/or one or more non-anti-noise sound sensors with an one-dimensional or multi-dimensional structure. There are one or more front sound inlets and/or one or more rear sound inlets on front end and rear end of the sidewall of the main cylinder body. The angle between the orientations of a front sound inlet and a rear sound inlet is 0°~135°. The outside main cylinder body has one or more noise-canceling sound sensors and/or one or more non-anti-noise sound sensors with an one-dimensional or multi-dimensional structure. There are one or more front sound inlets and/or one or more rear sound inlets on front end and rear end of the sidewall of the main cylinder body. The angle between the orientations of a front sound inlet and a rear sound inlet is 0°~135°.

Especially, the sound inlets are not connected to each other in the main cylinder body and located at the corresponding side of a vibration diaphragm. Especially, the front sound inlets are on the sidewall of the main cylinder body and/or the rear sound inlets are on the sidewall of the main cylinder body. Especially, the sound inlets are on the sidewall of the sound sensors. Especially, there are sound collecting caps at the front and rear sound inlets on external sidewall of the main cylinder body. Especially, there are diaphragm-tightening rings in the main cylinder body. A division plate with an extrusion portion at its center is placed between the front spacer in front of diaphragm-tightening ring and the division plate spacer. The extrusion portion at the center of the division plate is set into the diaphragm-tightening ring with the edge of the extrusion portion touching tightly with the inner edge of the diaphragm-tightening ring, making a cavity between it and the vibration diaphragm. Especially, the division plate in the noise canceling sensor is set in inside edge of the diaphragm-tightening ring and there is set a division plate spacer between the vibration diaphragm and the division plate. Especially, there is a symmetrical structure in the noise canceling sound sensor, including from both sides of the vibration diaphragm to front and rear sound inlets. Especially, there is a back electrode, which goes through a back-electrode hole in the back electrode seat at the same level of back electrode and is connected to the related circuit. Especially, there is a sound guide and a sound tube at the place of sound inlet in the main cylinder body. Especially, the electric circuit of noise-canceling sound sensor is set in the main cylinder body or in the rear cylinder body. Especially, there is a conductive contact in the rear cylinder body and between the diaphragm-tightening ring and the outer shell of sound sensor body in the noise canceling pickup. Especially, there is a sound control switch circuit that consists of detecting circuit, comparison circuit and switching circuit. Especially, there is a distance alarm circuit in the pickup, which consists of comparison circuits. Especially, there is included an amplifying ratio control circuit that can regulate the amplifying ratio of amplification circuit according to receiving distance. This amplification circuit consists of window comparison circuits of multiple sections. Especially, there is included a second common mode rejection circuit for second differential mode sound signals received by sound sensors. Especially, the front and rear sound inlets are on the sidewall of the front cover of the main cylinder body and/or on the sidewall of the main cylinder body individually. Especially, along the lines of the main sound source on a side of the main cylinder body, the front and rear sound inlets are on a sidewall of the front cover of the main cylinder body and/or on the other side of the rear cover of the main cylinder body and ranged front and back, or along the lines of the main sound source on a side of the main cylinder body, the front and rear sound inlets are on a sidewall of the front cover of a main cylinder body and on the other side of the rear cover of the other main cylinder body and ranged front and back. Especially, the multi-front-cylinder-body are ranged front and back, and the front and rear sound inlets are set on the sidewall of the front cover of the front cylinder-body individually and/or at the sidewall of rear cover of the front cylinder-body, along the lines of the main sound source on a side of the main cylinder body, the front and rear sound inlets are set near the center of the sidewall of the front cover and/or rear cover, or along the lines of the main sound source on a side of the main cylinder body, they are set on the both sides of front and/or rear sidewalls front and back.

The primary advantage of the present invention is an individual-type or combined-type noise-canceling pickup that comprises multiple sound inlets arranged in front and back, or at least, a pair of corresponding front and rear sound inlets. The orientations or directions of the openings of the corresponding front and rear sound inlets are roughly the same (the range is 0°±45°), or substantially perpendicular to each other (the range is 90°±45°), (i.e. the angle between the orientations of the opening s of the front and rear sound inlets is about 0°~135°). The meaning of roughly same direction or perpendicular is that when the main sound source 38 is located at the extension line 40 of the central line of the main cylinder body of pickup of the front wall 39 of front cover of the pickup, there can be one or more front sound inlets, and one or more rear sound inlets. Let the angle between the direction of the opening of the front sound inlet and the extension line 40 be $\alpha$ and the angle between the direction of the opening of the rear sound inlet and the extension line 40 be $\beta$. If $\alpha-\beta$ is about 0°, it means the directions or orientations of the front and rear sound inlets are roughly the same. If $\alpha-\beta$ is about 90°, it means the directions or orientations of the front and rear sound inlets are roughly perpendicular to each other. The difference between the two angles is within about 0°~130°.

The anti-noise function of the present invention is much better than that of existing pickup with only one sound sensor. As the directions of sound inlets are same (especially acoustic structure of acoustic channels to the vibration diaphragm are roughly same), the phase of inlet sound signals are roughly same. The phase of a sound signal reached at the vibration diaphragm can be changed by changing the structure of acoustic structure of acoustic channels or through an electrical circuit. Then a common mode rejection circuit is used for common mode rejection of that signal with other inlet signal. The final output is a differential mode signal without noise. Even under very harsh environment with high noise, the pickup of the present invention still has a high signal-to-noise ratio. It can be treated with a computer digital treatment procedure to make an anti-noise treatment, so as to reach a receiving purpose at a fixed position. The noise-canceling pickup of this present invention can also be used in places where low noise pickup are usually used. Furthermore, a problem of non-symmetrical acoustic structure at the front and back sides of the vibration diaphragm in the main cylinder body in my patents mentioned above has been improved. This is achieved by changing structure of the pickup. For example, the shape and position of the division plate 9 with a central extrusion and the division plate spacer 10 between the front spacer 8 and the diaphragm-stretching ring 11 can be changed by providing a ring-shaped division plate 9 and putting it into the diaphragm-stretching ring 11, with its outside edge closing to the inside edge of the diaphragm-stretching ring 11. Division plate spacer 10 can be set between the division plate 9 and the vibration diaphragm 12. The back electrode and the back electric electrode can be integrated in a single unit. The back electric electrode can be connected from the back electrode seat directly to inner back cylinder body. These structure improvements also increase the yield of the products.

BRIEF DESCRIPTION OF DRAWINGS

The embodiments of the present invention will be described in conjunction with accompanying drawings as follows.

FIG. 26 is a cross section view of noise-canceling pickup of present invention. FIG. 26A–FIG. 26C are the cross section views in lines A—A, B—B and C—C as shown in FIG. 26, respectively.

FIG. 27 is a cross section view of a noise-canceling pickup of present invention. FIG. 27A–FIG. 27C are the cross section views in lines A—A, B—B and C—C as shown in FIG. 27, respectively.

DETAILED DESCRIPTION OF EMBODIMENTS

Figures 1, 1A, 1B, 1C:
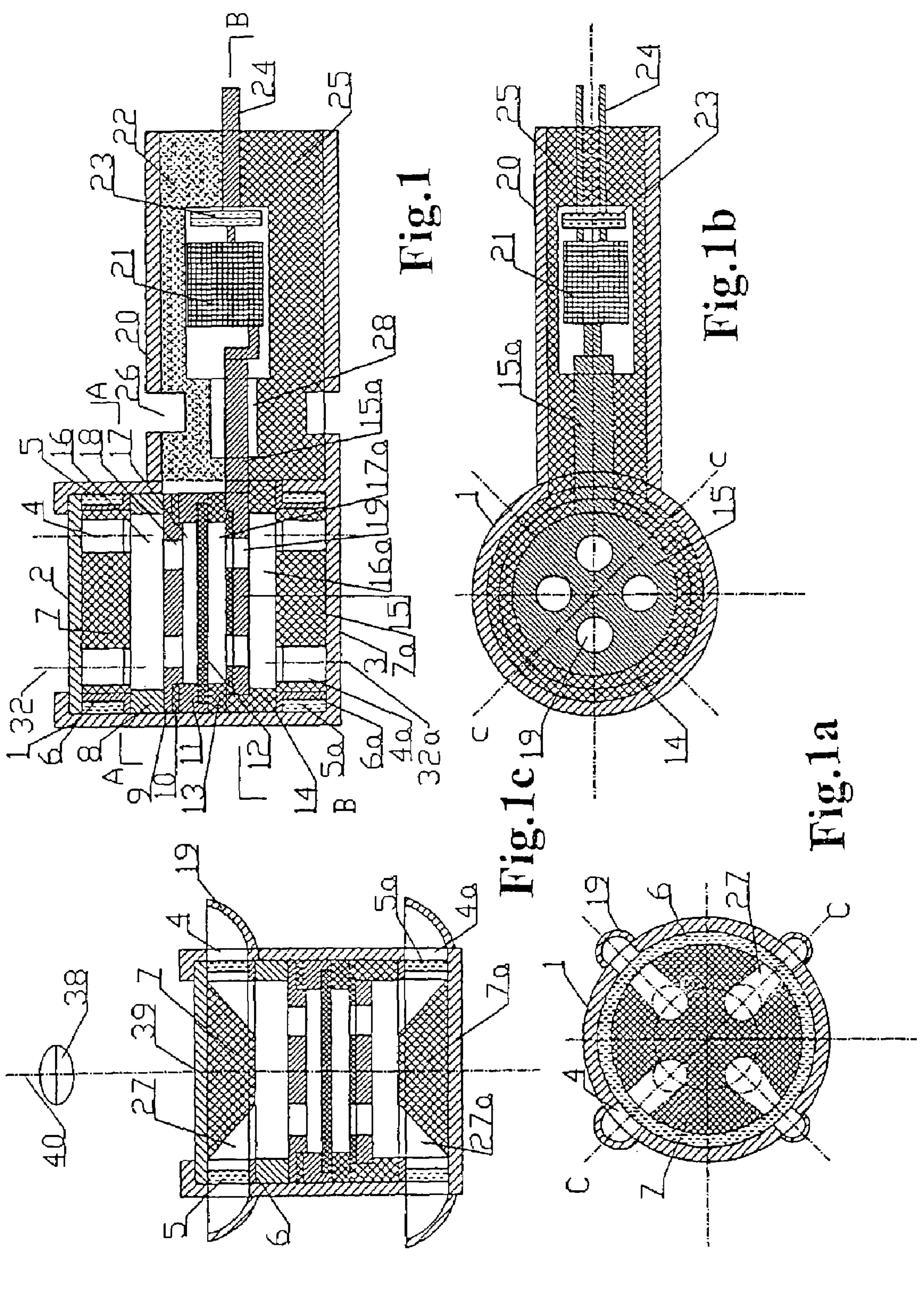
FIG. 1 is a cross section view of a noise-canceling pickup of present invention.
FIG. 1A~1C are the cross section views in lines A—A and B—B and C—C as shown in FIG. 1, respectively.

FIG. 1 is a cross section view of a noise-canceling pickup of the present invention. FIG. 1A~1C are the cross section views in lines A—A and B—B and C—C as shown in FIG. 1 respectively. In FIG. 1, the electret noise-canceling pickup of present invention has a cylinder shell that is formed by combining inner sidewall 1 with inner rear cylinder body 20. At the front of the sidewall 1 of inner cylinder body there is provided a front wall 2 of the front cover, and at the rear of the sidewall 1 of inner cylinder body there is provided a rear wall 3 of the rear cover. The cylinder shell can also be square, or rectangular, or oval, or other shape. The outer diameter of the sidewall 1 of inner cylinder can be within 0.2~55 mm and the height within 0.2~50 mm according to the test results. In the main cylinder body there are provided anti-noise sound picking unit(s), which can comprise following elements: One or more front sound inlets 4 and one or more rear-sound inlets 4*a* are provided at the front end and rear end of the sidewall 1 of inner cylinder of the cylinder shell, respectively. A sound-collecting cover 19 is located on the outer surface of sidewall 1 of the inner cylinder at locations corresponding to the front and rear sound inlets. On the inner wall of the inner sidewall 1 around the front and rear sound inlets 4 and 4*a*, there are provided a front damping film 5 and a rear damping film 5*a*, which are placed in a cavity formed between a front damping film fixing sheet 6, a rear damping film fixing sheet 6*a* and the sidewall 1 of inner cylinder body. If desirable, those damping films can be placed at other positions at the front or back side of the vibration diaphragm in the main cylinder body or at the outside of the inlets. According to design requirements, a complete or a part of diaphragm can be used, or some parts can be added or removed. In addition, vibration diaphragm 12 near to division plate spacer 10 and diaphragm-stretching ring 11 can be set at the position near the center of the sidewall 1 of the inner cylinder or close to front wall of front cover or rear wall of rear cover. The division plate 9 with a central extrusion is set at the position between the division plate spacer 10 in front of the diaphragm-stretching ring 11 and the front spacer 8, with the central extrusion of the division plate 9 inserting into the diaphragm stretching ring 11 and the edge of the central extrusion is pressed against the inner edges of the division plate spacer 10 and the diaphragm-stretching ring 11, so that a cavity between the vibration diaphragm 12 and the division plate 9 is formed. Therefore, the rear surface of the division plate 9 is near to the front surface of the vibration diaphragm 12, but there is a distance between the rear surface of the division plate 9 and the front surface of the vibration diaphragm 12. There is a division plate in the main cylinder body and there is a gap between the vibration diaphragm and the division plate. If desirable, the separate distance between the rear surface of the division plate 9 and the front surface of the vibration diaphragm 12 can be made about the same as that between the near surface of the vibration diaphragm 12 and the front surface of back electrode 15. In general, the distance between the rear surface of the division plate 9 and the front surface of the vibration diaphragm 12 should be determined according to the acoustic characters of the front and rear sides of vibration diaphragm 12, so that the time for a sound to travel from the front sound inlet to the front side of the vibration diaphragm 12 is about the same as that from the rear sound inlet to the rear side of the vibration diaphragm 12, Thus, the acoustic characters at both sides of the vibration diaphragm 12 are about the same. According to design requirements, the front spacer 8, the division plate 9 and the division plate spacer 10 can be made of conductive or non-conductive metal or nonmetal materials. If division plate 9 is made of metal material, the division plate 9 can be electrically connected with the diaphragm stretching ring 11, e.g., through direct contact, on the other hand, the two can be separated with a nonmetal material between them and insulated from each other. The nonmetal material can also secure a tight connection. The thickness of the central extrusion of division plate 9 can be equal to or not equal to the thickness of the back electrode 15. In order to make their thickness about equal, the front surface of the division plate 9 can be made flat, or convex, or concave relative to the vibration diaphragm 12. The thickness and shape of division plate 9, back electrode 15 and division plate spacer 10 may be adjusted so as to make the acoustic characters at both sides of the vibration diaphragm 12 be similar or about the same. For example, the shape for the rear surface of the back electrode, which faces the rear wall of the rear cover, can be designed to be a similar or the same shape as that of the front surface of the division plate 9, or the thickness of the back electrode can be made equal to that of the central extrusion of division plate 9 and so on. There is set a hole 18 on the division plate 9, and a hole 18*a* on the back electrode. The quantity, size and position of the holes 18 and 18*a* on the two can be symmetrical or non-symmetrical.

The division plate spacer 10 can be set at the position between the front surface of diaphragm stretching ring 11 and the edge of the non-extruding portion of division plate 9, or at the inner edge of diaphragm stretching ring 11 between the vibration diaphragm 12 and the central extrusion of division plate 9, so as to form a cavity between the vibration diaphragm 12 and the central extrusion of division plate 9 and the inner edge of division plate 9. The division plate 9 can be installed at other places as long as it has the function of separating the vibration diaphragm 12 from the central extrusion of division plate 9 at a predetermined distance. The distance between the division plate 9 and the vibration diaphragm 12 depends on the thickness of division plate spacer 10. The corresponding inner edge of back electrode spacer 13 can be extended to a position corresponding to the inner edge of division plate spacer 10.

At the front end of the sidewall 1 of inner cylinder body, there are provided a front sound inlet 4, a rear sound inlet 4*a*. Between a front damping film fixing sheet 6 and a rear damping film fixing sheet 6*a*, there are provided a front sound wave guide 7 and a rear sound wave guide 7*a*. Through the guide by the front and the rear sound wave guides 7 and 7*a* and the front and rear sound channels 27 and 27*a*, the transmission direction of sound wave entered into the front and rear sound inlets are changed towards the vibration diaphragm so that the sound vibrations at both sides of vibration diaphragm are similar and the common mode rejection can be done efficiently. According to design requirements, sound channels 27 and 27*a* can point to other directions. It is possible to use only sound channel without the sound guide, or not to use the sound channel and the sound guide. A division plate front cavity 16 is formed between the inner surface of sound wave guide 7, inner wall of the front spacer 8 and the front surface of the division plate 9. A vibration diaphragm front cavity 17 is formed between the vibration diaphragm 12, diaphragm stretching ring 11 set along the sidewall of inner cylinder body and the rear surface of the division plate 9. Sound wave goes through sound gathering cover 19, front sound inlet 4, front damping film 5, front damping film fixing sheet 6, guide 7, sound channel 27, into division plate front cavity 16, then though division plate hole 18 on the division plate 9 into vibration diaphragm front cavity 17, and acts on the front surface of vibration diaphragm 12. In order to reduce environmental noise and form a "8" shape or "hart" shape direction character, at the rear end of sidewall of inner cylinder body there is set one or more rear sound inlets 4*a*. The sound wave goes through sound gathering cover 19, rear sound inlet 4*a*, rear damping film 5*a*, rear damping film fixing sheet 6*a*, rear sound channels 27 in rear sound wave guide 7*a*, and enters back electrode rear cavity 16*a* that is formed between the rear surface of the back electrode 15, front surface of sound wave 7*a* and the rear surface of the back electrode set 14, then passes through the back electrode hole 18*a* of the back electrode 15 and reaches into the vibration diaphragm rear cavity 17*a* between the back electrode 15 and the vibration diaphragm 12, which are separated with the back electrode spacer 13, and acts on the rear surface of the vibration diaphragm 12. According to design requirements, it will be possible to remove division plate spacer 10, frond sound wave guide 7, rear sound wave guide 7*a* and sound channels 27 in rear sound wave guide 7*a*, completely or partially. The sound wave guide can be made of conductive or non-conductive metal or nonmetal materials. The sound wave guide and the damping film fixing sheet can be made from same or different materials. They can be made into one unit or individual units. According to design requirements, it will be possible to remove the sound wave guide.

By making the acoustic characters of the sound wave signal arriving at the vibration diaphragm 12 from the front sound inlet be similar or about the same as that from the rear sound inlet to the vibration diaphragm 12 and by means of mechanical structure, the phase difference of the sound waves acted on two sides of the vibration diaphragm 12 can be roughly about 180°, which will have better common mode rejection results, outputting differential mode signal to cancel noise.

Because except that the electret noise-canceling pickup of this present invention adds sound gathering cover 19, front and rear sound inlets 4 and 4*a* on the sidewall of inner main cylinder body, frond sound wave guide 7, rear sound wave guide 7*a*, front damping film 5 and rear damping film 5*a* in front of front and rear sound wave guide 7 and 7*a*, inner rear cylinder body 20, and inner-rear-cylinder-body-fixing unit 26, and some other structures, its operating principle, structure, materials, and circuits are similar as those of the above-mentioned patents and prior patent applications, so their details are omitted.

Figures 3, 3A, 3B, 3C:
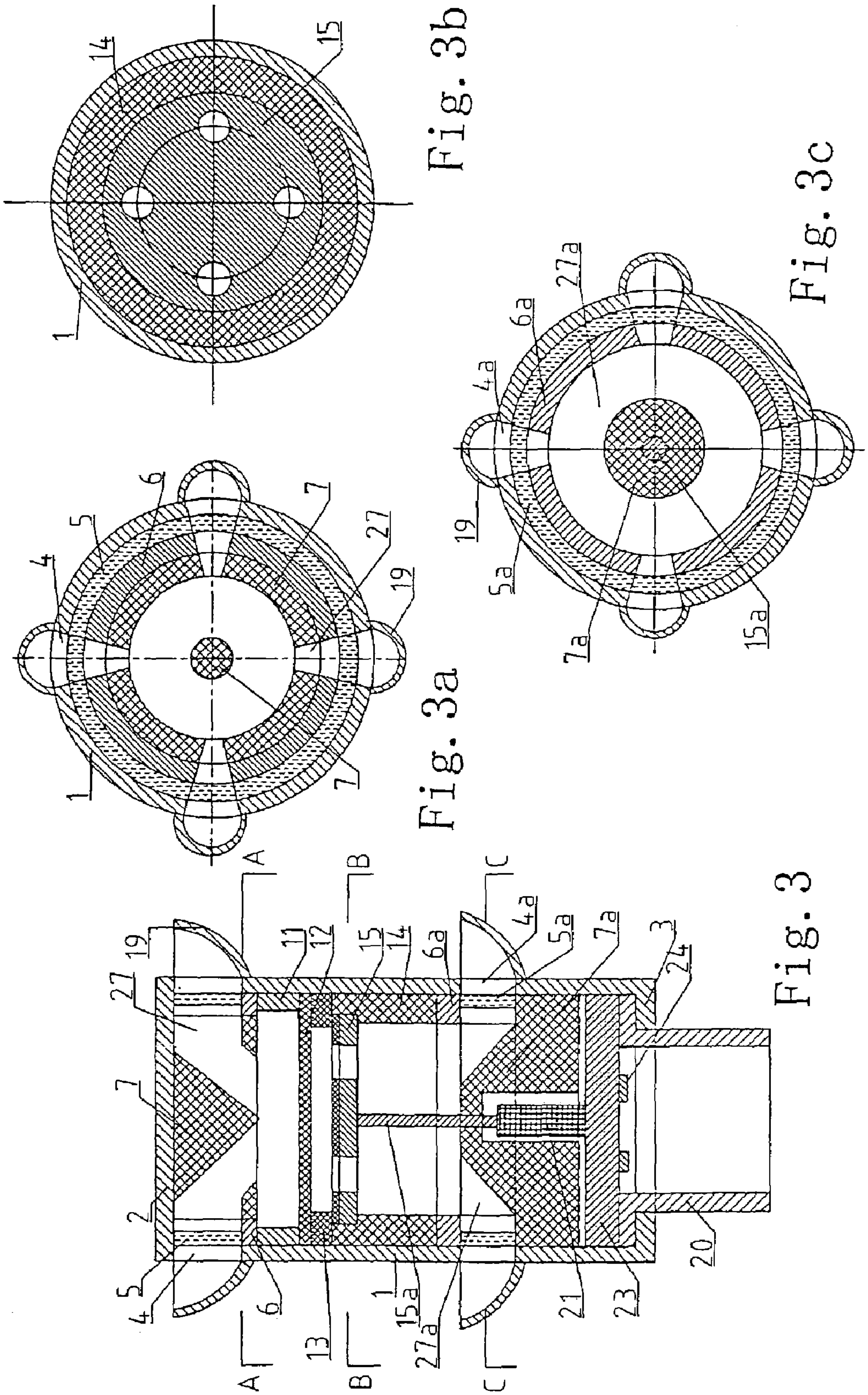
FIG. 3 is a cross section view of a noise-canceling pickup of present invention.
FIG. 3A~3C are the cross section views in lines A—A and B—B and C—C as shown in FIG. 3 respectively.

The opening of sound gathering cover 19 can point towards the main sound source (or other directions). The direction of each opening of sound gathering cover 19 should be same. Of course, those directions of the openings of sound gathering covers can be made different. Sound gathering covers 19 collect sound waves generated from the main sound source and guide them into sound inlets 4 and 4*a* and, in the mean time, reduce noises from other directions. It can be larger than, equal to or less than outside size of the sound inlet. The sound gathering cover 19 has the function to change the direction of the sound inlets of the main cylinder body, which can make the directions of the front and rear sound inlets about the same and make the phases of sound waves at the front and rear sound inlets roughly the same. Phase shift of the sound wave entered into sound sensors is then conducted by mechanical or electrical method to make the phase difference of sound waves from the front and the rear sound inlets about 180°, which will be input to a common mode rejection circuit for common mode rejection, outputting differential mode signal to cancel noise. Depending on design requirements, the noise-canceling sound sensors used in the preset invention may or may not use sound gathering covers 19 over the sound inlets, or only use over some of the sound inlets. The positions of sound inlets of the sound sensors and the sound gathering cover 19 can be symmetrical or non- symmetrical and their direction can be same or distinct. The central line 32 of front sound gathering cover 19 can be on or not on the same line with the central line 32*a* of rear sound gathering cover 19. When they are on different lines, front central line 32 can be in parallel with rear central line 32*a*, or they are intersected at a certain angle. Front central line 32 and rear central line 32*a* can be in parallel with the axial line of inner main cylinder body or they are intersected at a certain angle. When the sound gathering cover is not used, (1) the directions of sound inlet 4 and 4*a* on the sidewall of inner cylinder body do not point towards the main sound source but point the same direction, as shown in FIG. 1, or (2), as shown in FIG. 3, partial sound inlets are set on the front wall 2 of front cover, towards to the main sound source, and other partial sound inlets are set on the sidewall 1 of inner cylinder body, towards to a direction perpendicular to the main sound source. Under this situation, through its anti-noise function is not as good as when sound gathering cover 19 with direction towards to main sound source is used, but its anti-noise efficiency is better than when the sound inlets are formed on the rear sidewall of front and rear covers and is still satisfactory. Therefore, the sound gathering cover 19 can be used or not used according to design requirement. The internal and external shape of external rear cylinder body, external main cylinder body, internal main cylinder body, internal main cylinder body support 31, internal rear cylinder body 20, rear cylinder body 20*a*, sound gathering cover 19, front and rear sound wave guide 7 and 7*a*, sound inlets 4 and 4*a*, sound channels 27 and 27*a*, division plate 9, division plate hole 18 and front spacer 8 etc can be regular or irregular square, rectangle, circle, cylinder, triangle, diamond, polygon, sector, oval or other curved shapes, such as para-curve and so on, or other geometry, or other basic shapes, partial curve, or a complex shape that consists of some simple curves and so on. They can be made of metal or nonmetal or other complex materials.

The internal main cylinder body and internal rear cylinder body 20 can be straight-line or curved. The length and width of sidewall 1 of internal cylinder body can be within the range of 0.2~50 mm, in general within 1~15 mm. The sound wave guides 7 and 7*a* can be made as a unit with damping film fixing sheets 6 and 6*a* or separately made. They can use metal or nonmetal materials, or they can be made with the same or different materials. In order to have a heart-shape direction character, it is possible to fill damping materials into the back electrode cavity 16*a* to adjust transmitting speed of sound wave, so that sound waves entered from the front and rear sound inlets reach at the two sides of vibration diaphragm 12 at about the same time. Using that filling method, the two sound waves can be correctly coupled to cancel noise. If it is a "8"-shape direction character, the damping material (called as "damping material 'A'") for reducing transmitting speed of sound wave can be omitted. The kind and quantity of the filled "damping material 'A'" depend on design requirements and can be decided through test. Damping film 5 and/or 5*a* can be used at any point of the sound transmitting passage from the outside of inlets 4 and 4*a* on the sidewall of the cylinder body to the vibration diaphragm. Damping film 5 and/or 5*a* can also be removed. Damping film 5 and/or 5*a* can be made of non-metal material such as carpet or non-woven fabric etc, or metal material such as metal net, or mixed metal with nonmetal materials, or other synthetic materials with sound damping functions (called as "damping material 'B'"). Using "damping material 'B' damping film is to cancel possible noise generated by the breath from the user's mouth imposed onto vibration diaphragm 12. The material and application principle are the same as that of the damping film installed at front of sound inlet on the internal shell of the noise-canceling electret sensor. When the noise-canceling electret sensor of present invention is used directly without being protected by a microphone shell, in order to present vibration diaphragm 12 from being damaged and to prevent it from reducing its effect, the noise-canceling electret sensor may be put into an external shell. Damping film 5 can be made of damping carpet or damping non-woven fabric or other materials with sound damping performance. Damping film 5 and/or 5*a*, and damping film fixing sheet 6 and/or 6*a* can be used or not used according to design requirement. For example, in case that a sound sensor is put into the external shell, the damping film may be not put into the pickup. If an external shell is not used and the pickup of present invention is used alone, it may be put in the pickup according to the demand in application. Back electrode seat 14 can be made with insulation materials.

Because only necessary elements of a noise-canceling electret sound sensor are put in the internal cylinder body, other elements such as impedance transformer circuit 21 (it can be a composition field effect transistor or IC or other circuits), printed circuit board 23, connection terminals 24 are put in the internal rear cylinder body, the distance between front and rear sound inlets on the sidewall of internal main cylinder body respectively facing to sound source can be very short to have higher anti-noise capability at high frequency. On the other hand, the internal rear cylinder body can also be connected with the microphone supporter directly without external shell of the microphone. In order to install the pickup onto an external device and prevent it from falling down, a fixing mechanism 26 is provided on the outside of internal rear cylinder body 20 or on any proper position of the internal rear cylinder body 20. The fixing mechanism 26 can have bulging or hollow shape or other shape. FIG. 1 shows a fixing mechanism 26 with hollow shape. In rear cylinder body there are put a front internal support 22 and a rear internal support 25. There is a back electrode 15*a* on the back electrode seat 14 and the support going through the hole 28 and a sidewall of the internal main cylinder body into the internal rear cylinder body.

Back electrode 15*a* goes through the back electrode through hole 28 of the back electrode seat 14 at the same level of back electrode 15. It can be made together with back electrode 15 as a single unit or made as an individual unit. Back electrode 15*a* is connected with a pin of field effect transistor 21 (or IC). The composition field effect transistor 21 and other circuit components are installed on the printed circuit board 23, which is connected with an external circuit through output pin 24. The lead of back electrode, "Back electrode 15*a*", can also be led out through the rear wall 3 of rear cover or the wall of internal rear cylinder body. The lead of back electrode, "Back electrode 15*a*", can be made together with the back electrode as an integrated unit or made as an individual unit. According to design requirement, the electric circuit can be installed in the rear cylinder body or on other position in the outside of the pickup, not in internal main cylinder body or the internal rear cylinder body. The internal rear cylinder body 20 can be cylindrical or other shapes. Its diameter (or its section area) can be more than, equal to or less than diameter of the sidewall 1 of internal cylinder body. Internal rear cylinder body 20 can be installed at any proper position in the internal main cylinder body as long as it does not disturb sound wave going into the front sound inlet 4 and the rear sound inlet 4*a*. It can point to any direction.

According to the performance of vibration diaphragm 12 on vibration, vibration diaphragm 12 can be made of FEP50A (Copolymer of Teflon with polysixfluoroethylene) or polyester film and so on, or metal, nonmetal, composite or other materials for vibration film. Its thickness can be decided by test, it may be about 12 μm, or larger or less than 12 μm. There may be a metal layer on the vibration diaphragm 12. A electret film can be applied on the back electrode 15. The sidewall 1 of internal cylinder body, the front wall of front cover 2, the rear wall of rear cover 3, the internal rear cylinder body 20, and the shell of sound gathering cover 19 can be made of stainless steel, copper, aluminum and other metal materials, or plastic materials or other composite materials. For other parts of the pickup of present invention please refer to the structure and materials of various 1-stage or multi-stage air-conductive type of electret noise-canceling pickups with the direction character of "heart shape" or "8-shape". The sidewall 1 of internal cylinder body, the front wall of front cover 2, the rear wall of rear cover 3, the internal rear cylinder body 20, and the shell of sound gathering cover 19 can be made separately and assembled together as shown in the drawings or be made assome composites and then assembled. The same method can be used for internal structures.

Other new high performance anti-noise pickups can be made by using various inner main cylinder body of noise-canceling pickups in present inventor's prior patents and patent applications and by improving various existing sound noise-canceling pickups, as well as by adding the sound gathering cover 19, sound inlets 4 and 4*a* on the sidewall of internal main cylinder body, front sound wave guide 7, rear sound wave guide 7*a* and so on.

Actually, each embodiment of present invention can be established by using noise-canceling sound picking-up and distance sound receiving pickup that consists of single or multiple noise canceling sound sensor/sensors and/or single or multiple non-noise-canceling sound sensor/sensors.

Figure 2:
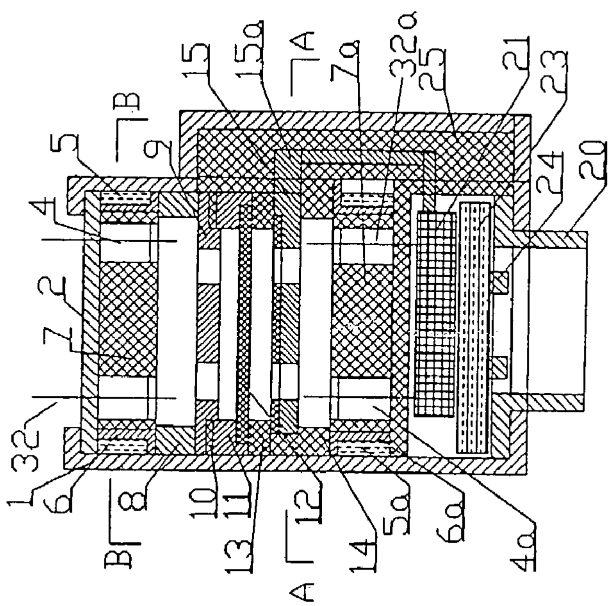
FIG. 2 is a cross section view of a noise-canceling pickup of the present invention.
Figure 2A:
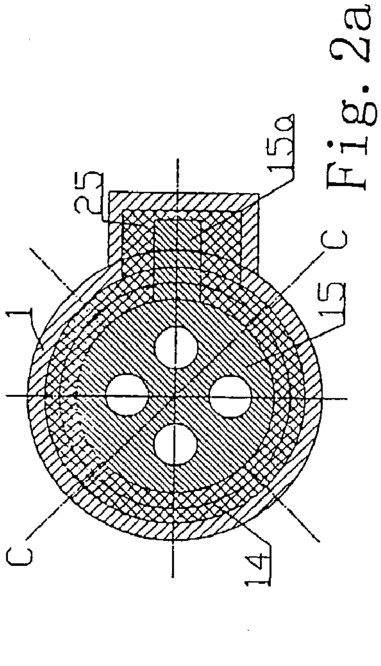
FIGS. 2A to 2C are the cross section views in lines A—A, B—B and C—C as shown in FIG. 2, respectively.
Figure 2B:
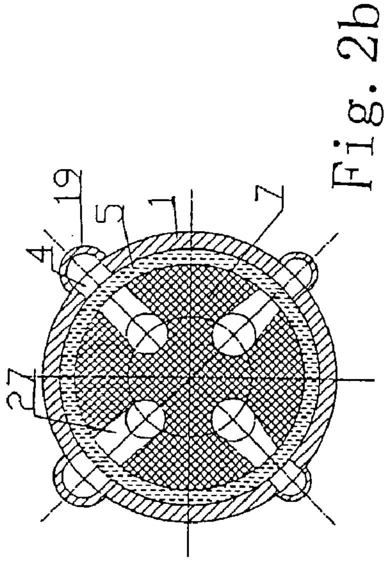
Figure 2C:
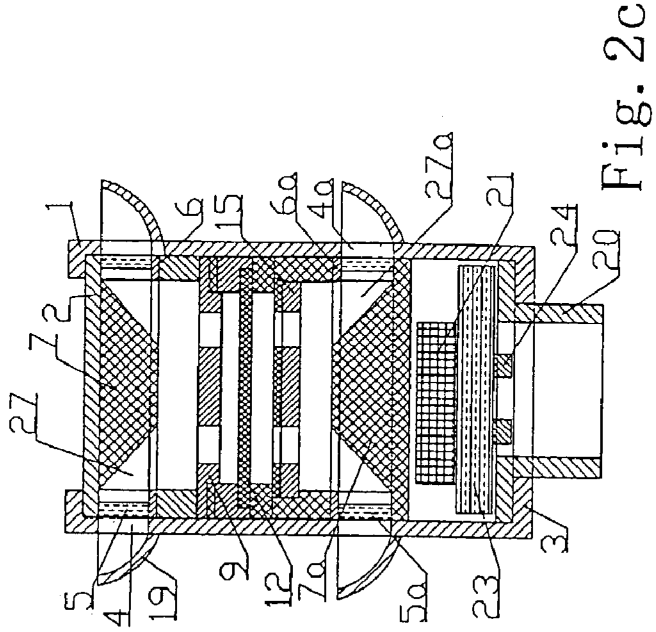

FIG. 2 shows the sectional view of an acoustic noise canceling pickup of this invention and FIGS. 2A to 2C are the sectional view of the A—A line, B—B line and C—C line shown in FIG. 2. From the comparison between FIG. 2, FIG. 1 and FIGS. 1A to 1C, we can see that their difference lies in: Back electrode electrode 15*a* bypasses the sound channel 27*a* of back electrode seat 14 from outside back electrode seat 14 and is connected to the impedance conversion electric circuit 21 and printed electric circuit board 23 placed at rear end of the internal main cylinder body (They can also be placed inside the internal rear cylinder body 20 connected to the rear end of the side wall 1 of the internal cylinder body).

FIG. 3 shows the sectional view of an acoustic noise canceling pickup of this invention and FIGS. 3A to 3C are the sectional view of the A—A line, B—B line and C—C line shown in FIG. 3. From the comparison with FIG. 2, FIG. 1 and FIGS. 1A to 1C, we can see that their difference lies in: the division plate and the division plate spacer in front of the vibrating diaphragm 12 are removed. Sound waves entering from sound gathering cover 19 and front sound inlet 4 pass through front damping film 5 and front damping film fixing sheet 6 and are guided by the sound channel 27 on sound wave guide 7, so that the transmission direction of sound waves is changed to approximately pointing to the vibrating diaphragm. The sound waves then directly enter the cavity 17 and act on vibrating diaphragm 12 in front surface of vibrating diaphragm 12 to cause it to vibrate. And since internal rear cylinder body is unavailable, electric circuits are placed in the internal cylinder body. Therefore, those structures behind back electrode 15 need to be modified accordingly. Back electrode electrode 15*a* does not pass through the back electrode through hole 28 on back electrode seat 14 and the side wall of the internal main cylinder body to enter the rear cylinder body, rather it directly enters the rear section of the pickup to connect with impedance conversion electric circuit 21. Printed electric circuit board 23 is also in the internal cylinder body 1. (In reality, it means the addition of inlets 4 and 4*a* on the side wall of internal main cylinder body, front sound wave guide 7, rear sound wave guide 7*a*, front damping film 5 and rear damping film 5*a* on one of the available acoustic noise canceling pickup to change into the acoustic noise canceling pickup of this invention, with the direction of front and rear sound inlets is approximately the same or approximately perpendicular to each other.)

The most basic requirements of this embodiment of the present invention is to provide the openings of front and rear sound inlets 4 and 4*a* on the side wall of the internal main cylinder body, rather than install the rear opening on the rear wall of the rear cover, as is the case in the conventional acoustic noise canceling pickups.

Figure 4A:
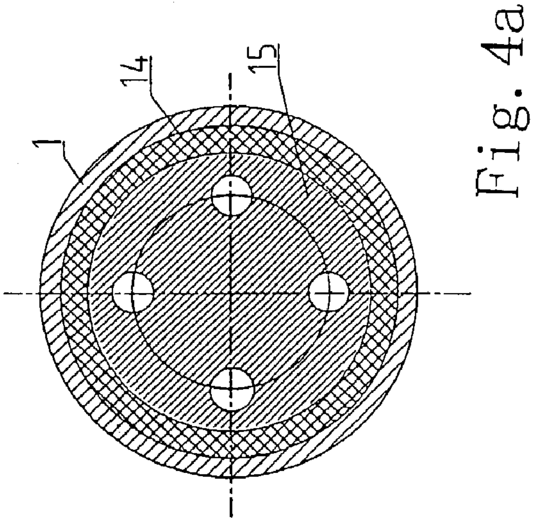
FIG. 4A~4B are the cross section views in lines A—A and B—B as shown in FIG. 4, respectively.
Figure 4B:
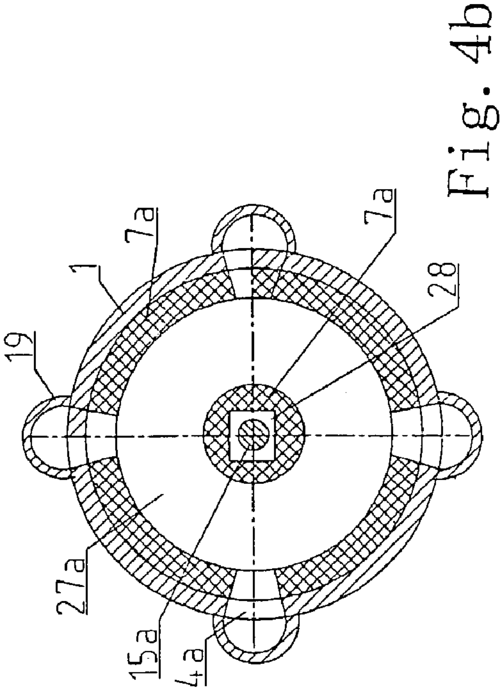
Figure 4:
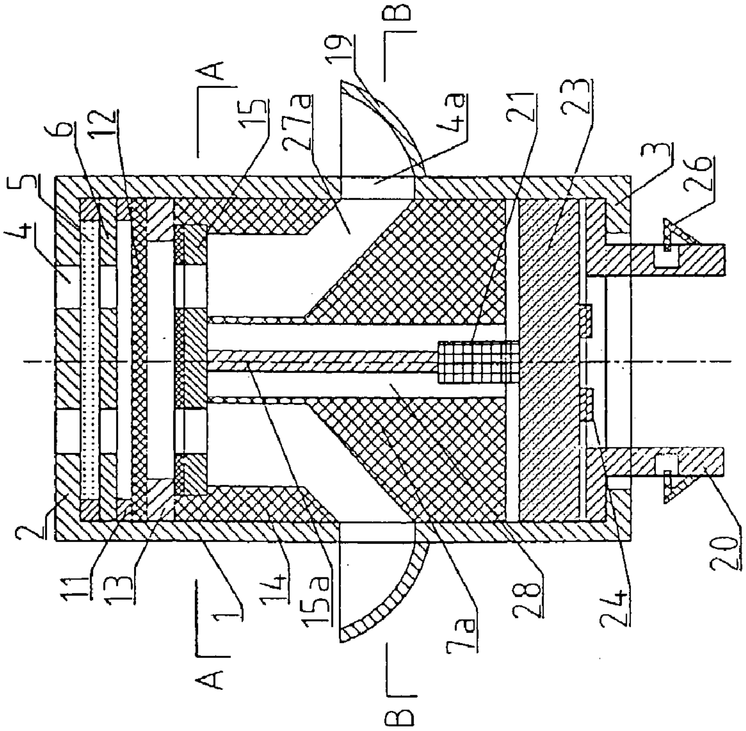
FIG. 4 is a cross section view of a noise-canceling pickup of present invention.

FIG. 4 the sectional view of an acoustic noise canceling pickup of this invention and FIGS. 4A to 4B are the sectional view of the A—A line and B—B line shown in FIG. 4.

From the comparison between FIG. 4, FIG. 3 and FIGS. 3A to 3C, we can see that their difference lies in: Front sound inlet is not on the side wall of internal cylinder body side wall, rather it is on front cover front wall 2. In this way, the sound gathering cover 19 outside front sound inlet 4 will be of no use. The most basic requirements of this embodiment of the present invention is to install the opening of rear sound inlet 4*a* on the side wall 1 of the internal main cylinder body, rather than install the opening of rear sound inlet 4*a* on the rear wall of rear cover as is the case in conventional acoustic noise canceling pickups, and to add sound gathering cover 19 outside rear sound inlet 4*a* and allow the direction of the opening of sound gathering cover 19 to be approximately the same as that of the opening of the front sound inlet.

Figures 5, 5A, 5B, 5C:
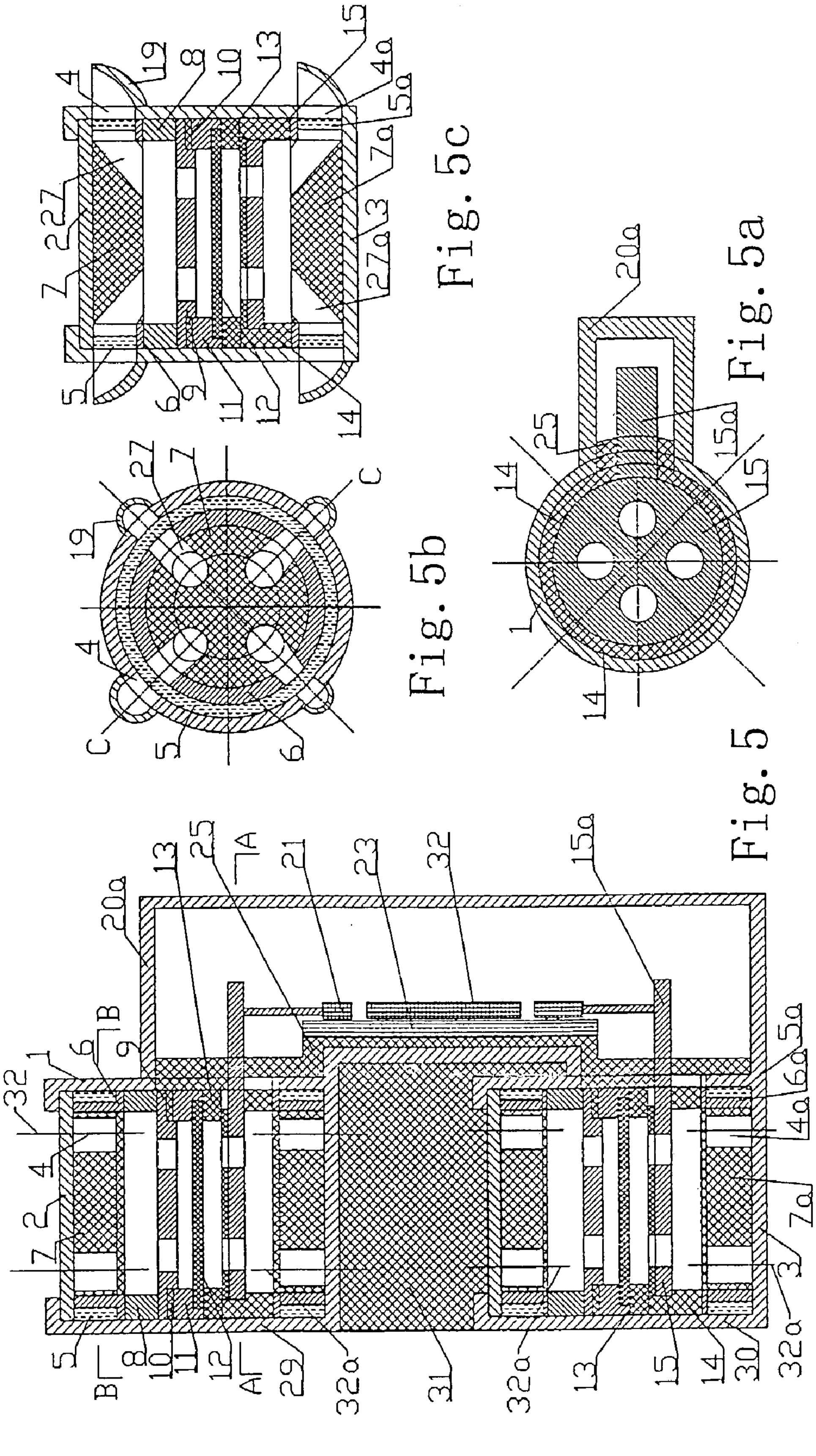
FIG. 5 is a cross section view of a noise-canceling pickup of present invention.
FIG. 5A~5C are the cross section views in lines A—A and B—B and C—C as shown in FIG. 5, respectively.

FIG. 5 shows the sectional view of an acoustic noise canceling pickup of this invention and FIGS. 5A to 5C are the sectional view of the A—A line, B—B line and C—C line shown in FIG. 5.

From the comparison between FIG. 5 and FIG. 1, we can see that their difference lies in: The rear cylinder body of the electret pickup in this embodiment of the present invention is a complete supporting cylinder body. It can serve as the rear cylinder body of the internal main cylinder body of two or more single sound sensors (In the Figure are the upper electret sound sensor 29 and lower electret sound sensor 30 of on two single sound sensors). Therefore, the internal main cylinder body of rear cylinder body 20*a* and upper electret sound sensor 29 and the internal main cylinder body of lower electret sound sensor 30 are made into one component. Rear cylinder body 20*a* can be made of stainless steel, copper, aluminum and other metals, plastics or nonmetal materials or compound materials. Its shape can be approximately the same as that of the internal rear cylinder body 20 in FIG. 1 or different from it. When several sound sensors are used, this invention uses a common mode signal inhibition electric circuit to take out the differential mode signals received by two sound sensors to cancel noises. Common mode signal inhibition electric circuit 32 can be placed in the internal cylinder body 20*a* or at other proper places.

Here, the central axis ( axis formed by the extended central line) of the internal main cylinder body of various single electret sound sensors (such as the internal main cylinder body of upper electret sound sensor 29 and the internal main cylinder body of lower electret sound sensor 30) can be overlapped or not overlapped. When they are not overlapped, they can be parallel to each other or have a certain angle between them.

In this embodiment of the present invention, the distance between various single electret sound sensors and the main sound source must be different and the distance between front sound inlets 4 on the front covers (front wall 2 of front cover) of the front sound receiving ends of the internal main cylinder body of two electret noise canceling sound sensors (such as the internal cylinder body side wall 1 of upper electret sound sensor 29 and the internal cylinder body side wall 1 of lower electret sound sensor 30) is decided based on design requirement. For instance, it can either range from 0.1 to 200 mm or be higher or lower than this distance. It can be decided by test and usually ranges from 1 to 20 mm.

Based on design requirement, the internal main cylinder body of various electret sound sensors can either be placed inside an external main cylinder body for protection and support or multiple electret sound sensors can share the same external main cylinder body. Based on design, an internal main cylinder body support 31 can be used to connect and fix multiple internal main cylinder bodies of various electret sound sensors (such as the internal main cylinder body of upper electret sound sensor 29 and the internal main cylinder body of lower electret sound sensor 30) or internal main cylinder body and external main cylinder body 33 (see FIG. 11) are connected and fixed for strengthening fixation. There can be one or more internal main cylinder body support 31, whose shape can either be a cross or circle. In this embodiment of the invention, all external rear cylinder body, external main cylinder body, internal main cylinder body support 31, internal cylinder body side wall 1, internal rear cylinder body 20, rear cylinder body 20*a*, sound gathering cover 19, front and rear sound wave guiding module 7 and 7*a*, sound channels 27 and 27*a* and front spacer 8 can be either regular or irregular in shape based on design and actual needs, such as square, rectangle, circle, oblong, triangle, rhombus, polygon and fan, or arcs in shape, such as oval, parabolic camber and other basic shapes. They can also be complicated shapes due to the combination of various basic shapes or a simple shape, or the a three-dimensional structure (or a hollow three-dimensional structure) of various shapes, such as the compound consisting of various single shapes, such as tube, channel, ball, board, piece, etc. They can either be a whole or a part of a whole. But the shape and installation position of this external rear cylinder body, external main cylinder body, internal main cylinder body support, internal rear cylinder body and external rear cylinder body cannot affect the noise canceling effects of each electret sound sensor, electret noise canceling sound sensor and noise canceling pickup whose front and rear sound inlets are generally of almost the same direction or perpendicular. This external main cylinder body, internal main cylinder body support, internal rear cylinder body and external rear cylinder body can be integrated or independent from each other. All of them can be used or only some of them is used based on design.

To obtain differential mode signals to cancel noises, two methods can be employed: a. The acoustic characters of the two sound wave channels from two corresponding initial sound inlets of front and rear internal main cylinder bodies 29 and 30 to the vibration diaphragm are made approximately the same (or not completely the same), and the phase difference of the two sound wave signals is made about 180° by the mechanical structures, so that they have better common mode inhibition effect when acting on vibration diaphragm to obtain differential mode signals to cancel noises; b. The acoustic characters of the two sound wave channels from two corresponding sound inlets of front and rear internal main cylinder bodies 29 and 30 to the vibration diaphragm are made approximately the same (or not completely the same) and their phases are almost the same and common mode inhibition electric circuit can be used for common mode inhibition to obtain differential mode signals to cancel noises.

Based on design, shockproof spacer 36 or shockproof cushion 37 can be provided for shockproof separation between external main cylinder body 25, internal main cylinder body support 31 and the internal main cylinder body of electret sound sensor. The single sound sensors and components used in this invention can be various available noise canceling sound sensors or non-noise canceling sound sensors, such as electret sound sensor, moving-coil sound sensor, electromagnetic sound sensor, piezoelectric ceramic sound sensor, semiconductor sound sensor, etc.

Of course, it is also possible not to use the internal main cylinder body of noise canceling pickup whose front and rear sound inlets are of the same direction or perpendicular approximately and use the main cylinder bodies of the various noise canceling pickups in this inventor's previous patents and patent applications mentioned above to work out a new assembled high noise canceling pickup together with the available noise canceling sound sensors.

Figure 6A:
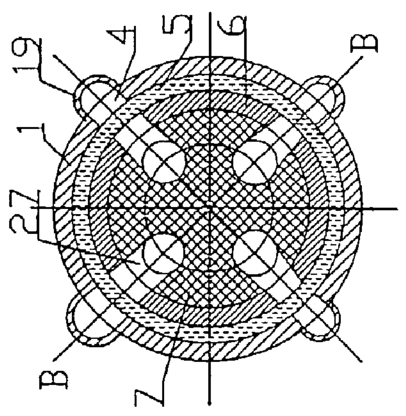
FIGS. 6A to 6B are the cross section views in lines A—A and B—B as shown in FIG. 6, respectively.
Figure 6B:
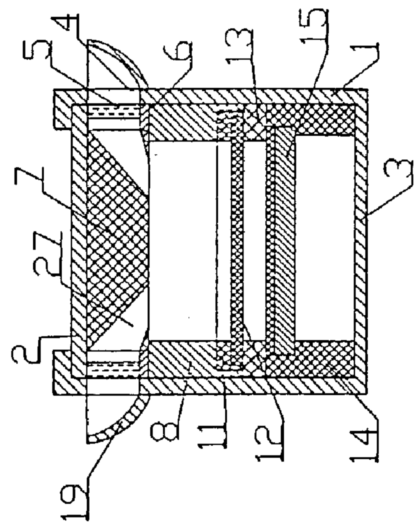
Figure 6:
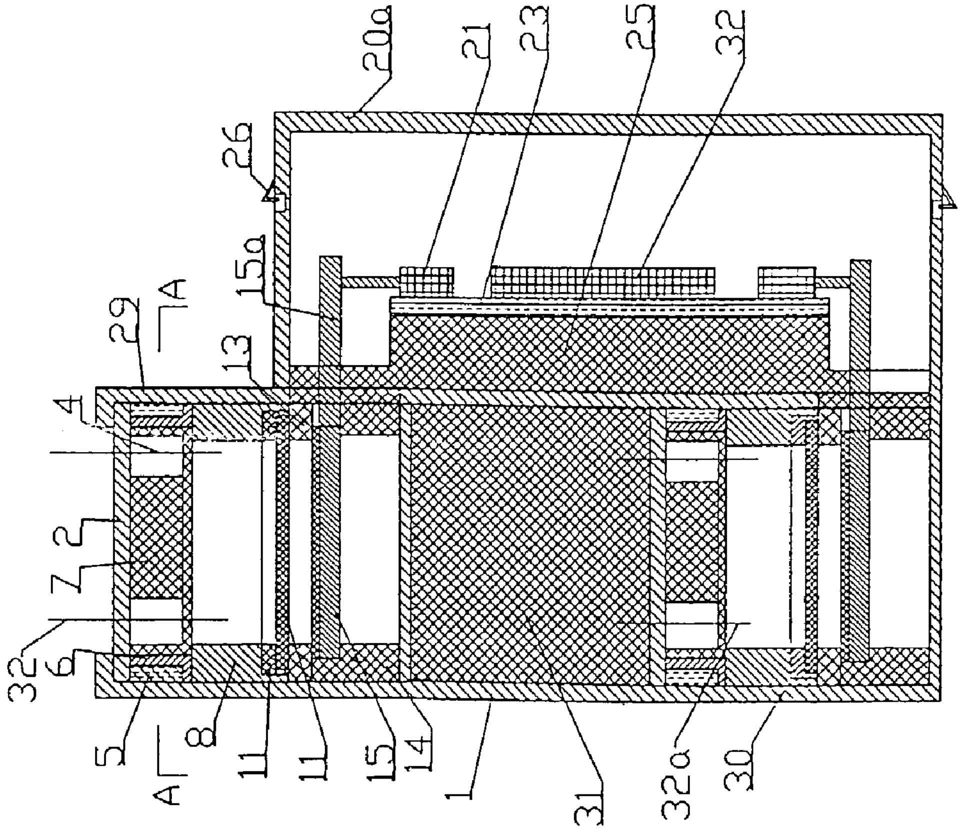
FIG. 6 is a cross section view of a noise-canceling pickup of the present invention.

FIG. 6 shows the sectional view of a noise canceling pickup in this invention and FIGS. 6A to 6B are the sectional view of the A—A line and B—B line shown in FIG. 6. From the comparison between FIG. 6, FIG. 5 and FIGS. 5A to 5C, we can see that their difference lies in: The rear sound inlet 4*a*, rear damping film fixing sheet 6*a* and rear sound wave guiding module 7*a* inside the internal main cylinder body of upper electret sound sensor 29 and lower electret sound sensor 30 and the rear sound channel 27*a* in rear sound wave guiding module 7*a* are removed and the front sound inlet 4, front damping film fixing sheet 6 and front sound wave guiding module 7 inside the internal main cylinder body of upper electret sound sensor 29 and lower electret sound sensor 30 and the front sound channel 27 in front sound wave guiding module 7 are kept to get an assembled noise canceling pickup with high noise canceling ability whose front and rear sound inlets are of approximately the same direction or perpendicular approximately. The pickup comprises an internal main cylinder body with upper electret sound sensor 29 of non-noise canceling sound sensor and internal main cylinder body and rear barel body 20*a* with lower electret sound sensor 30 to cancel noises with common mode inhibition electric circuits. The internal main cylinder body of upper electret sound sensor 29 and that of lower electret sound sensor 30 can be integrated into a single internal main cylinder body based on needs, rather than two independent ones.

In this way, the acoustic properties of the two sound wave channels from two corresponding sound inlets of two front and rear internal main cylinder bodies to vibration diaphragm can be approximately the same and their phases can also be about the same and common mode inhibition electric circuit can be used for common mode inhibition to obtain differential mode signals to cancel noises.

Figures 7, 7A, 7B:
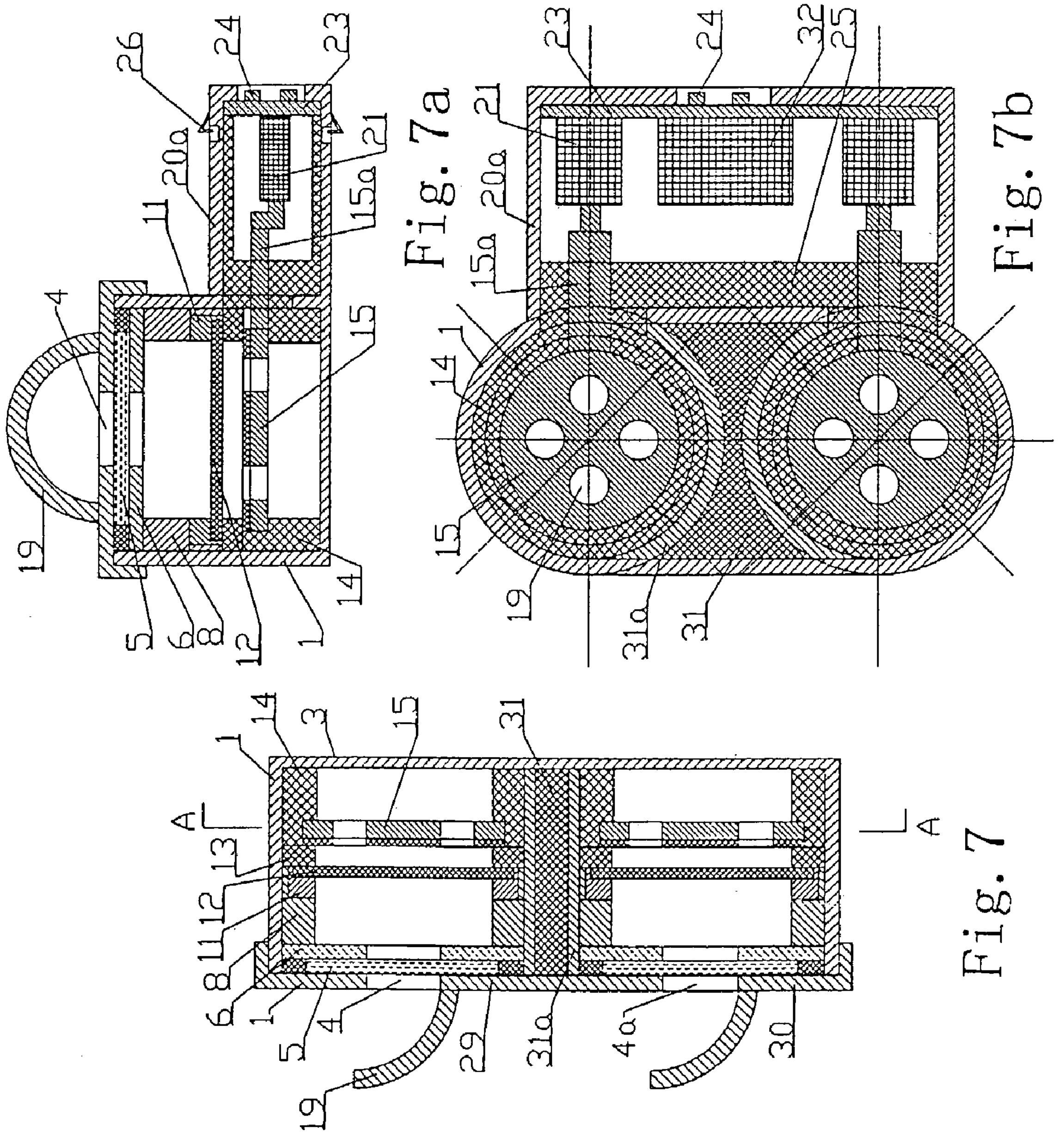
FIG. 7 is a cross section view of a noise-canceling pickup of the present invention.
FIGS. 7A to 7B are the cross section views in lines A—A and B—B as shown in FIG. 7, respectively.

FIG. 7 shows the sectional view of a noise canceling pickup in this invention and FIGS. 7A to 7B are the top view of FIG. 7 and the A—A line sectional view. From the comparison between FIG. 7, FIG. 6 and FIGS. 6A to 6B, we can see that their difference lies in: The internal main cylinder body of upper electret sound sensor 29 and that of lower electret sound sensor 30 are placed side by side, one in front and the other behind, front and rear sound inlets 4 and 4*a* are placed on the side wall of internal cylinder body (Though the one which should face vibration diaphragm 12 is front cover and front wall 2, since the two sound sensors are placed side by side with one in front and the other behind, a front and rear wall is formed at the sides in front of and behind the cylinder body of each sound sensor, therefore, their front wall 2 of the front cover forms cylinder body side wall 1) and sound gathering cover 19 is placed outside inlet 4, with openings facing the same direction. Based on design, internal main cylinder body support 31 can be placed between upper electret sound sensor 29 and lower electret sound sensor 30. It can be made of metal or non-metal material. If it is non-metal and the internal main cylinder body of upper electret sound sensor 29 and lower electret sound sensor 30 need electromagnetic shielding, a metal main support shielding frame 31*a* can be used. It can be a metal sheet or metal film coated on the non-metal material of internal cylinder body support 31. It can be made into one single main cylinder body or two main cylinder bodies. The pickup section and electric circuit section which are commonly-used today can also be placed into the non-noise canceling sound sensor structure (the sound sensor structure as shown in FIG. 18) of a main cylinder body to form an assembled high noise canceling pickup with internal barrel bodies placed one in front and the other behind, rather than the pickup consisting of main cylinder body and internal rear cylinder body as shown in the Figure.

Figures 8, 8A, 8B:
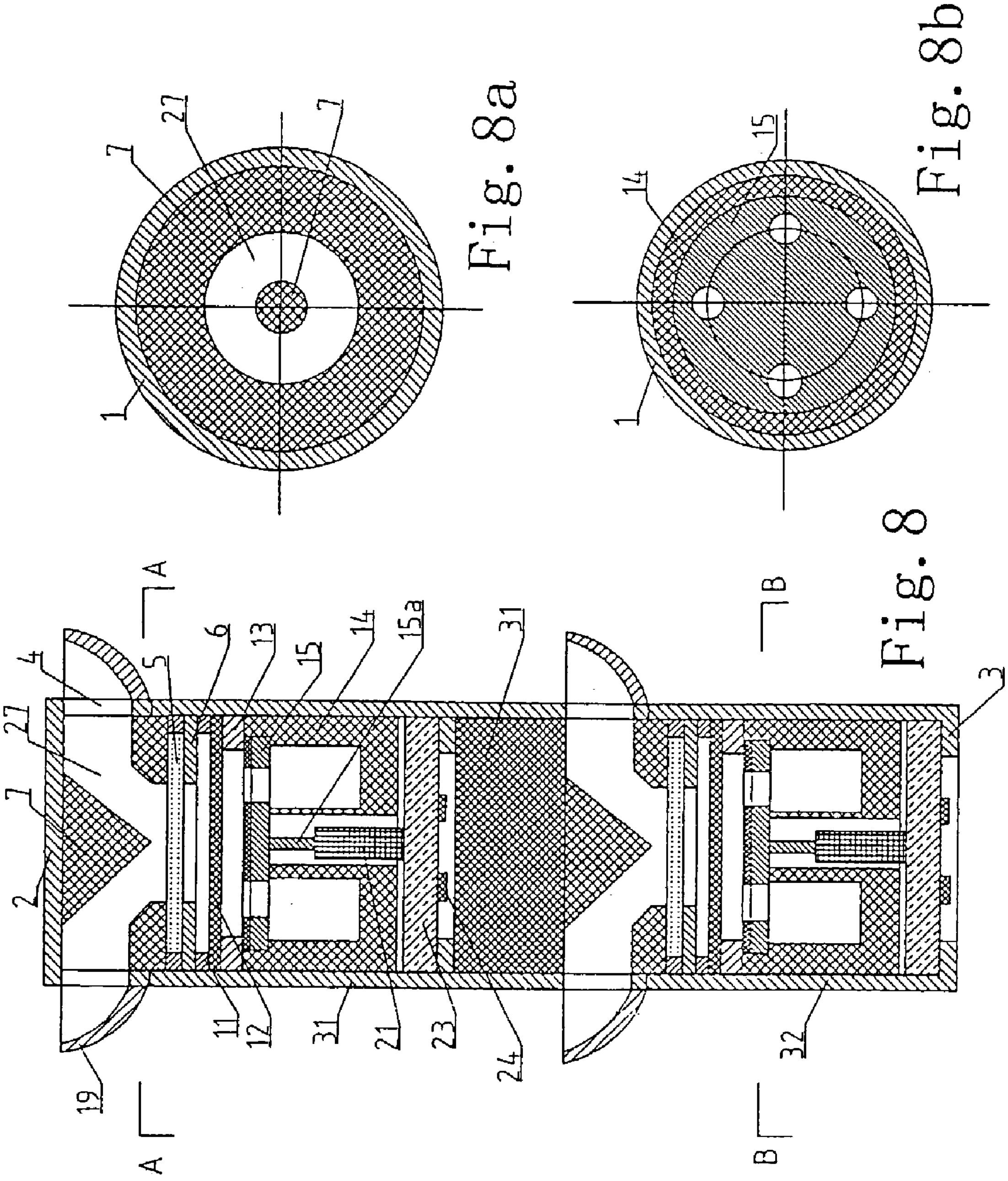
FIG. 8 is a cross section view of a noise-canceling pickup of the present invention.
FIGS. 8A to 8B are the cross section views in lines A—A and B—B as shown in FIG. 8, respectively.

FIG. 8 shows the sectional view of a noise canceling pickup in this invention and FIGS. 8A to 8B are the A—A line and B—B line sectional view as shown in FIG. 8. From the comparison between FIG. 8, FIG. 6 and FIGS. 6A to 6B, we can see that their difference lies in: Since internal rear cylinder body is not used and the electrical circuit is placed inside the internal main cylinder body, the structures behind back electrode 15 need to be modified accordingly. Rather than passing the back electrode pass hole 28 on back electrode seat 14 and entering the internal rear cylinder body through the sidewall of the internal main cylinder body, back electrode 15*a* directly enters the rear of pickup to connect with impedance conversion electric circuit 21. Printed electric circuit board 23 is also in the internal cylinder body 1 to form two sections, namely, upper sound sensor 31 and lower sound sensor 32. This in fact is just the addition of front sound wave guiding module 7 and front sound channel 27 to the internal structure of a non-noise canceling sound sensor. Many pickup and electric circuit sections which are the same as the currently available non-noise sound sensors can be installed inside a cylinder body, and internal cylinder body side wall sound inlet 4, front sound wave guiding module 7, front damping film 5, front damping film fixing sheet 6 and sound gathering cover 19 can be added in front of the pickup section of various electret sound sensors to form an assembled noise canceling pickup with the openings of sound inlets facing the same direction.

Figure 9A:
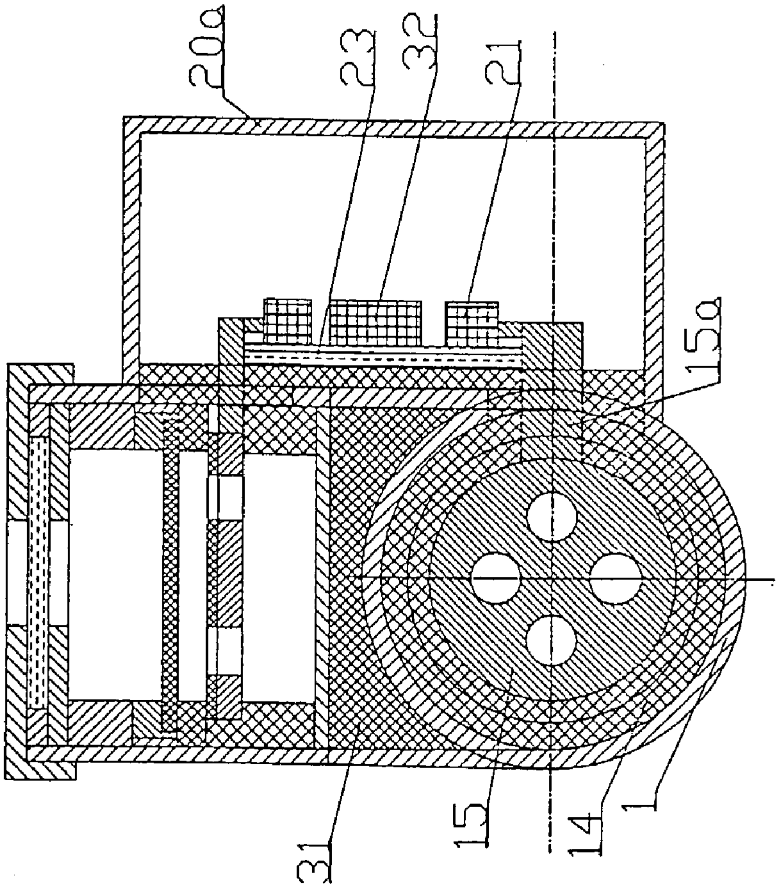
FIG. 9A is the cross section view in line A—A as shown in FIG. 9.
Figure 9:
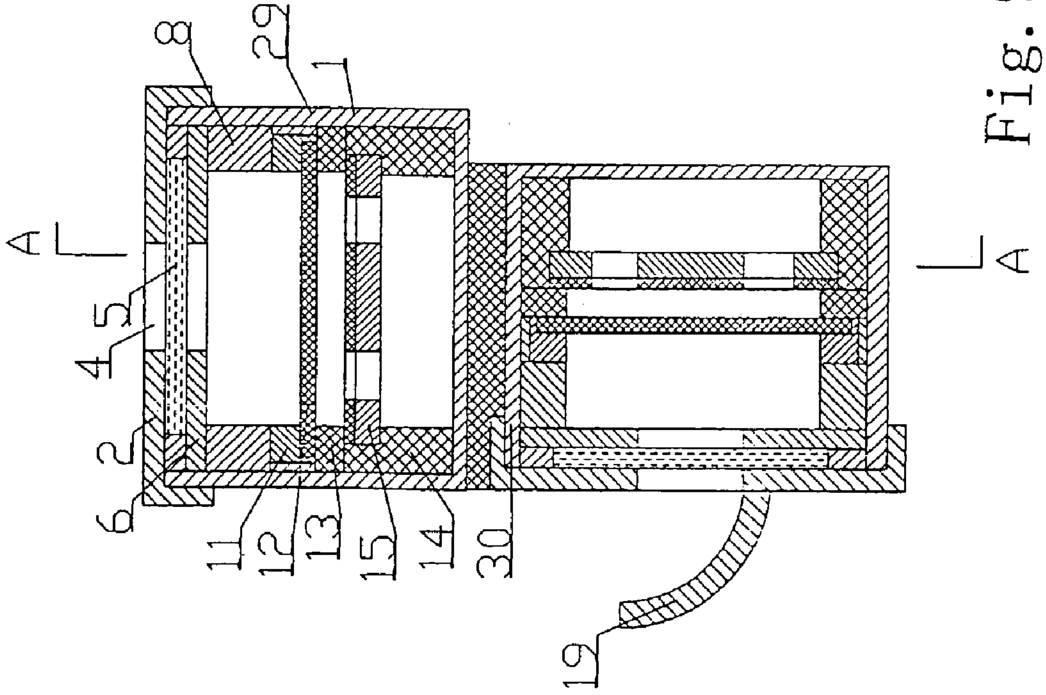
FIG. 9 is a cross section view of a noise-canceling pickup of the present invention.

FIG. 9 shows the sectional view of a noise canceling pickup in this invention and FIG. 9A is the A—A line sectional view as shown in FIG. 9. From the comparison between FIG. 9, FIG. 7 and FIGS. 7A to 7B, we can see that their difference lies in: The direction of the internal main cylinder body of the upper electret sound sensor 29 in the main cylinder body of a non-anti-noise sound sensor is changed to facing the front, inlet 4 is on front wall 2 the front cover facing the front and sound gathering cover 19 is outside the inlet 4 at the side of the internal main cylinder body of lower electret sound sensor 30, with openings facing the same direction. Based on design, internal main cylinder body support 31 can be placed between upper electret sound sensor 29 and lower electret sound sensor 30. It can be made into one single main cylinder body or two main cylinder bodies. The pickup section and electric circuit section which are commonly-used today can also be placed into the non-noise-canceling sound sensor structure (the sound sensor structure as shown in FIG. 18) of a main cylinder body to form an assembled high noise canceling pickup with internal barrel bodies placed one in front and the other behind, rather than the pickup comprising main cylinder body and internal rear cylinder body as shown in the Figure.

Figure 10A:
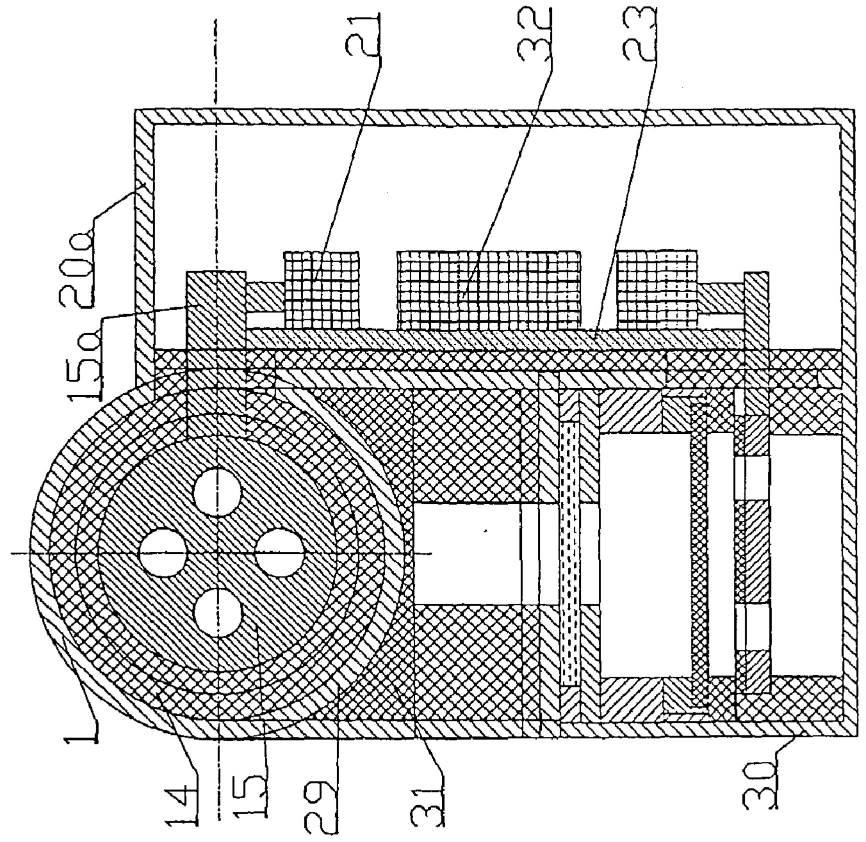
FIG. 10A is the cross section view in line A—A as shown in FIG. 10.
Figure 10:
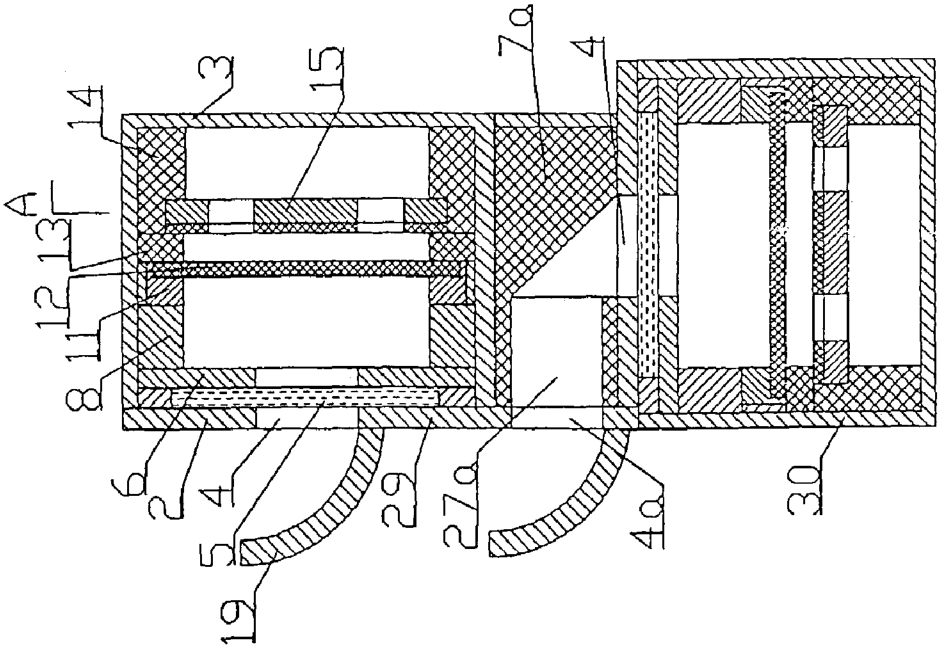
FIG. 10 is a cross section view of a noise-canceling pickup of the present invention.

FIG. 10 shows the sectional view of a noise canceling pickup in this invention and FIG. 10A is the A—A line sectional view as shown in FIG. 10.

From the comparison between FIG. 10, FIG. 7 and FIGS. 7A to 7B and FIG. 9, we can see that their difference lies in: The direction of the internal main cylinder body of the lower electret sound sensor 30 in the main cylinder body of a non-noise sound sensor is changed to facing the front, inlet 4 is on front wall 2 of the front cover facing the front and sound gathering cover 19 is outside the inlet 4*a* at the side of the internal main cylinder body of lower electret sound sensor 30, with opening facing the same direction as the sound gathering cover 19 of upper eletret sound sensor 29. Based on design, internal main cylinder body support 31 can be placed between upper electret sound sensor 29 and lower electret sound sensor 30, rear sound wave guiding module 7*a* can be placed in front of the inlet 4 of lower electret sound sensor 30 and rear sound channel 27*a* of rear sound wave guiding module 7*a* is available between inlets 4*a* and 4. It can be made into one single main cylinder body or two main cylinder bodies separately. The pickup section and electric circuit section which are commonly-used today can also be placed into the non-noise canceling sound sensor structure (the sound sensor structure as shown in FIG. 18) of a main cylinder body to form an assembled high noise canceling pickup with internal barrel bodies placed one in front and the other behind, rather than the pickup consisting of main cylinder body and internal rear cylinder body as shown in the Figure. Likewise, the upper electret sound sensor 29 and lower electret sound sensor 30 can also be reversed to get a new application.

Based on design, the internal main cylinder bodies of the upper electret sound sensor 29 and lower electret sound sensor 30 as shown from FIGS. 5 to 10 can also be designed into two separate main cylinder body casings or a shared internal main cylinder body casing. The internal main cylinder body of the original upper electret sound sensor 29 and the components inside lower electret sound sensor 30 are placed at the front and back inside the shared internal main cylinder body casing, between which internal main cylinder body support 31 inside the shared internal main cylinder body casing is placed for isolation, which can both have the effect of isolating sound waves and keeping the front and rear sound reception sections at a certain distance, as well as connection and supporting functions. Subject to needs, the internal main cylinder body support 31, the rear sound wave guiding module 7*a* of the front sound sensor and the front sound wave guiding module 7 of the rear sound sensor can be integrated or separated. The internal main cylinder body support 31 can either use materials with sound wave impedance or other materials and can be designed into various appropriate shapes based on needs.

Figure 11A:
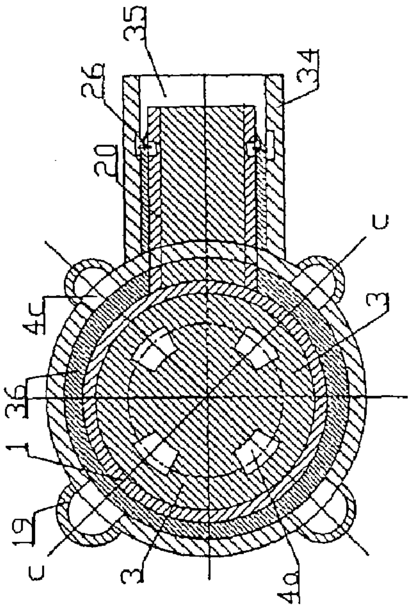
FIG. 11A~11C are the cross section views in lines A—A and B—B and C—C as shown in FIG. 11, respectively.
Figure 11B:
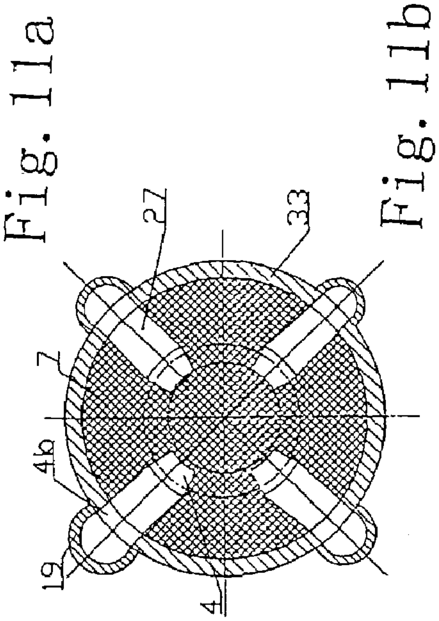
Figure 11:
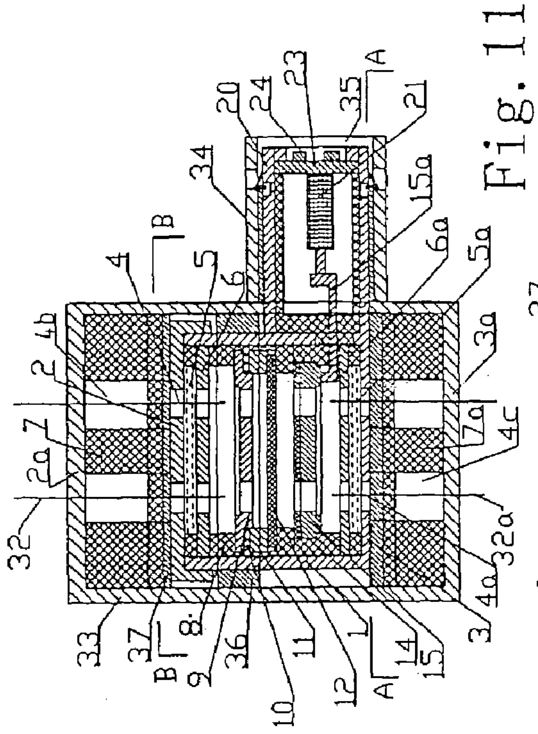
FIG. 11 is a cross section view of a noise-canceling pickup of present invention.
Figure 11C:
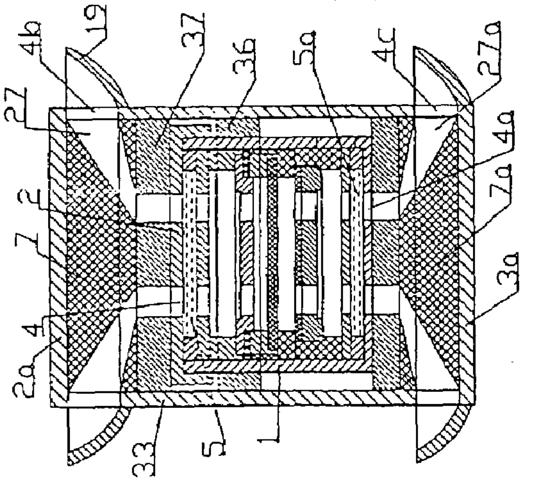

FIG. 11 shows the sectional view of a noise canceling pickup in this invention and FIGS. 11A and 11C are the A—A line, B—B line and C—C line sectional views as shown in FIG. 11. From the comparison between FIG. 11, FIG. 1 and FIGS. 1A to 1C we can see that their difference lies in: External main cylinder body 33 and external rear cylinder body 34 are used and various types of noise canceling sound sensors in this inventor's above-mentioned patents and patent applications are installed and used in the carriage.

The internal rear cylinder body 20 of a high noise canceling sound sensor is inserted into hole 35 of external rear cylinder body 34. The internal main cylinder bodies of various noise canceling sound sensors are placed in external main cylinder body 33 and sound wave guiding modules 7 and 7*a* and sound channels 27 and 27*a* in sound wave guiding modules 7 and 7*a* are placed outside the front sound inlet 4 and rear sound inlet 4*a* of internal cylinder body side wall 1.

Shockproof spacer 36 and shockproof cushion 37 can be provided between external main cylinder body 33, internal main cylinder body support 31, sound wave guiding modules 7 and 7*a*, internal cylinder body side wall 1, front cover front wall 2 and rear cover rear wall 3 for shockproof isolation. Subject to needs, shockproof spacer 36 can be used or not used between the internal rear cylinder body of electret sound sensor 20 and the internal wall of internal rear cylinder body insertion hole 35.

At the front end and rear end of noise canceling sound sensor inside the external main cylinder body are provided front sound inlet 4 and rear sound inlet 4*a*, and front sound wave guiding module 7 and rear sound wave guiding module 7*a* are placed between the front wall of the external front cover and rear wall of the external rear cover of external main cylinder body and the front cover front wall and rear cover rear wall of high noise canceling sound sensor inside. The inward openings of the front sound channel 27 and rear sound channel 27*a* among them should correspond to the front and rear sound inlets 4 and 4*a* on the front cover front wall and rear cover rear wall. Based on needs, shockproof cushion 37 can be used between the front cover front wall and rear cover rear wall and front sound wave guiding module 7 and rear sound wave guiding module 7*a* of high noise canceling sound sensor. A sound pass hole should be available on the shockproof cushion.

Sound gathering cover 19 can be provided at the front and rear sound inlets of the external wall of external main cylinder body 33.

Figure 12A:
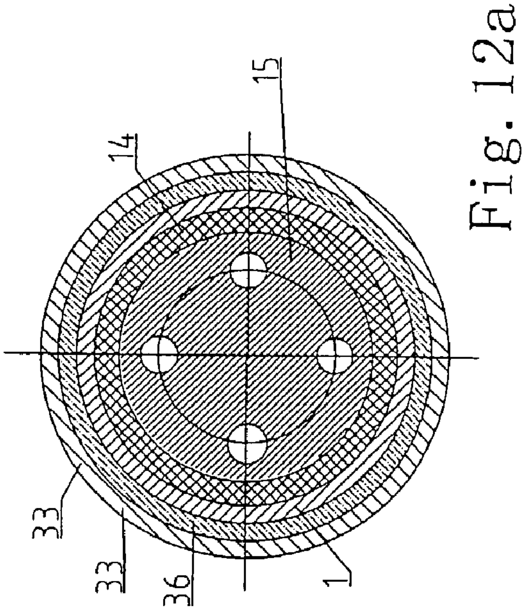
FIG. 12A~12B are the cross section views in lines A—A and B—B as shown in FIG. 12, respectively.
Figure 12B:
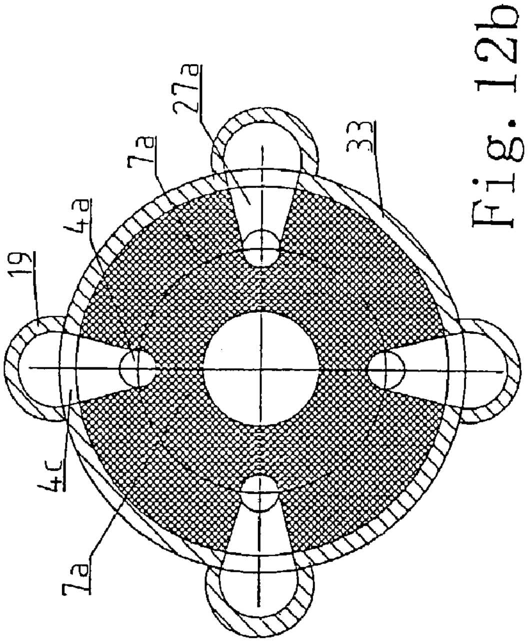
Figure 12:
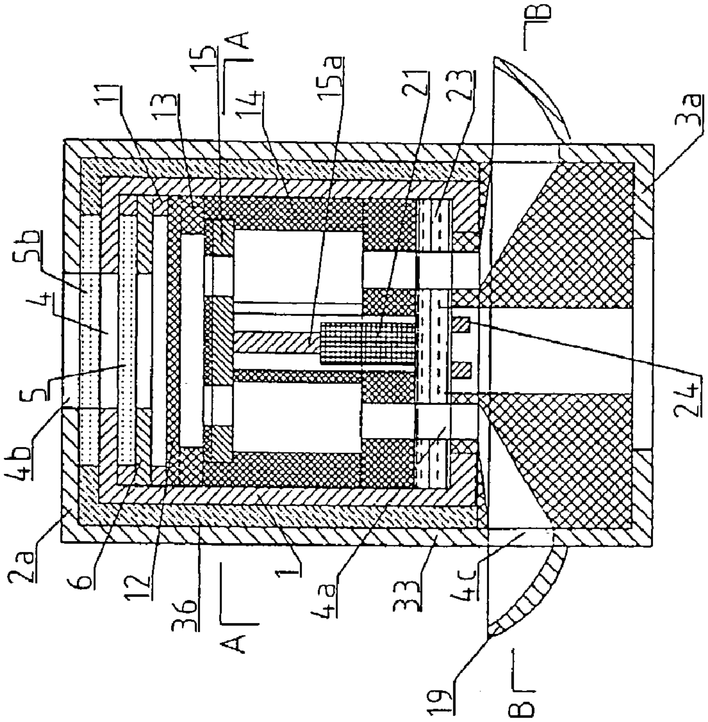
FIG. 12 is a cross section view of a noise-canceling pickup of present invention.
Figures 13, 13A, 13B, 13C:
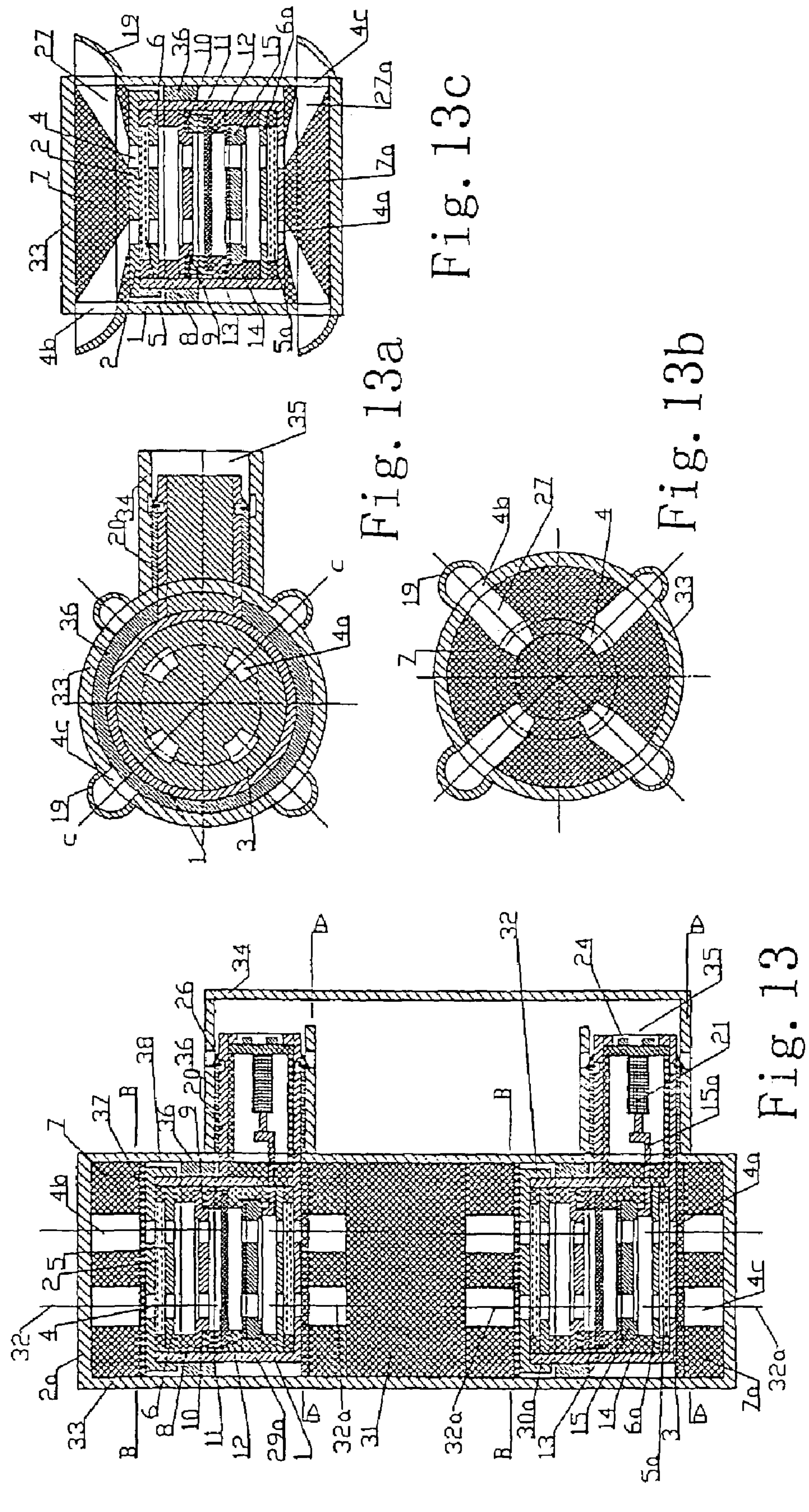
FIG. 13 is a cross section view of a noise-canceling pickup of present invention.
FIG. 13A~13C are the cross section views in lines A—A and B—B and C—C as shown in FIG. 13, respectively.

FIG. 12 shows the sectional view of a noise canceling pickup in this invention and FIGS. 12A and 12B are the A—A line and B—B line sectional views as shown in FIG. 12. From the comparison between FIG. 12, FIG. 11 and FIGS. 11A to 11D we can see that their difference lies in: The internal main cylinder body and internal rear cylinder body 20 used from FIGS. 11A to 11D are changed into a common noise canceling pickup whose components are placed in a single cylinder body. Outside it is provided external main cylinder body 33. Sound gathering cover 19 can be installed at the rear sound inlet at the external side wall of external main cylinder body 33. The front sound inlet of external main cylinder body is not on side wall but on front cover front wall. Rear sound wave guiding modules 7*a* are provided behind external main cylinder body 33 and the inward opening of their rear sound channel 27*a* corresponds to the rear sound inlet 4*a* on rear cover rear wall 3. Front damping film 5 can be placed between the front sound inlet of external main cylinder body 33 and the front sound inlet 4 of internal cylinder body side wall 1, or between the front sound inlet 4 of internal cylinder body side wall 1 and vibration diaphragm 12. It can also be not used. FIG. 13 shows the sectional view of a noise canceling pickup in this invention and FIGS. 13A and 13C are the A—A line, B—B line and C—C line sectional views as shown in FIG. 13. From the comparison between FIG. 13 and FIG. 11, and FIGS. 11A to 11D and FIG. 1 and FIGS. 1A to 1C we can see that their difference lies in: External main cylinder body 33 and external rear cylinder body 34 are used and various types of noise canceling sound sensors in this inventor's above-mentioned patents and patent applications are installed and used in the carriage.

The internal rear cylinder body 20 of high noise canceling sound sensor is inserted into hole 35 of the external rear cylinder body 34, the internal main cylinder bodies of various noise canceling sound sensors are placed in the external main cylinder body 33 (such as the internal main cylinder body of upper electret sound sensor 29*a* and the internal main cylinder body of lower electret sound sensor 30*a*) and sound wave guiding modules 7 and 7*a* and sound channels 27 and 27*a* in sound wave guiding modules 7 and 7*a* are placed outside the front sound inlet 4 and rear sound inlet 4*a* of internal cylinder body side wall 1.

Shockproof spacer 36 and shockproof cushion 37 can be provided between external main cylinder body 33, sound wave guiding modules 7 and 7*a* and the internal main cylinder body of upper electret sound sensor 29*a* and the internal main cylinder body of lower electret sound sensor 30*a* for shockproof isolation. They can also not be used.

Internal main cylinder body support 31 can be placed between two internal main cylinder bodies. Sound gathering cover 19 can be installed on the external side wall of external main cylinder body 33 and at the openings of the front and rear sound inlets 4 and 4*a* of the various noise canceling sound sensors inside a carriage cylinder body. Front sound wave guiding module 7 and the front sound channel 27 in sound wave guiding module 7 are placed between the front sound inlet and rear sound inlet of external main cylinder body 33, the front cover front wall and rear cover and rear wall of the various noise canceling sound sensors in external main cylinder body and the front cover front wall and rear cover rear wall of high noise canceling sound sensor. Based on needs, shockproof cushion can be used between the front cover front wall and rear cover rear wall and front sound wave guiding module 7 of high noise canceling sound sensor. A sound pass hole is provided on the shockproof cushion.

Shockproof spacer 36 can be used between the internal rear cylinder body 20 of electret sound sensor and the internal wall of internal rear cylinder body insertion hole 35 based on needs.

Figure 14C:
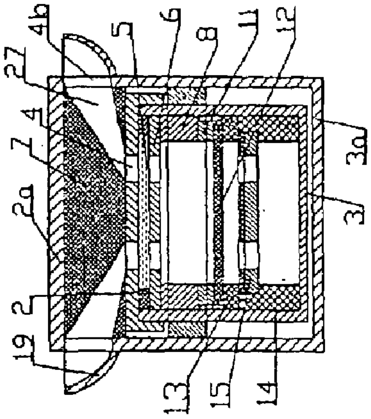
FIG. 14A~14C are the cross section views in lines A—A and B—B and C—C as shown in FIG. 14, respectively.
Figure 14A:
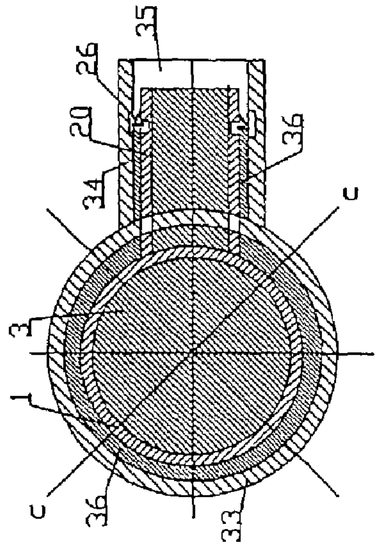
Figure 14B:
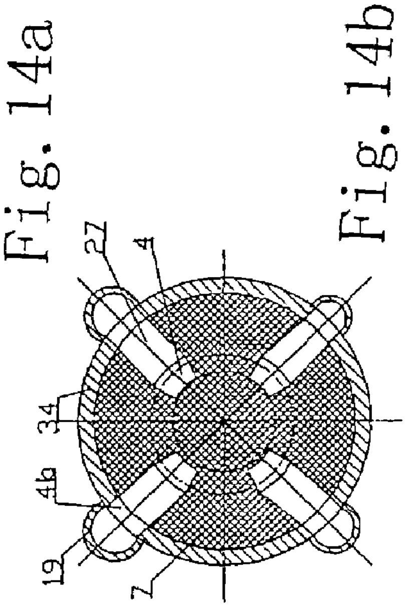
Figure 14:
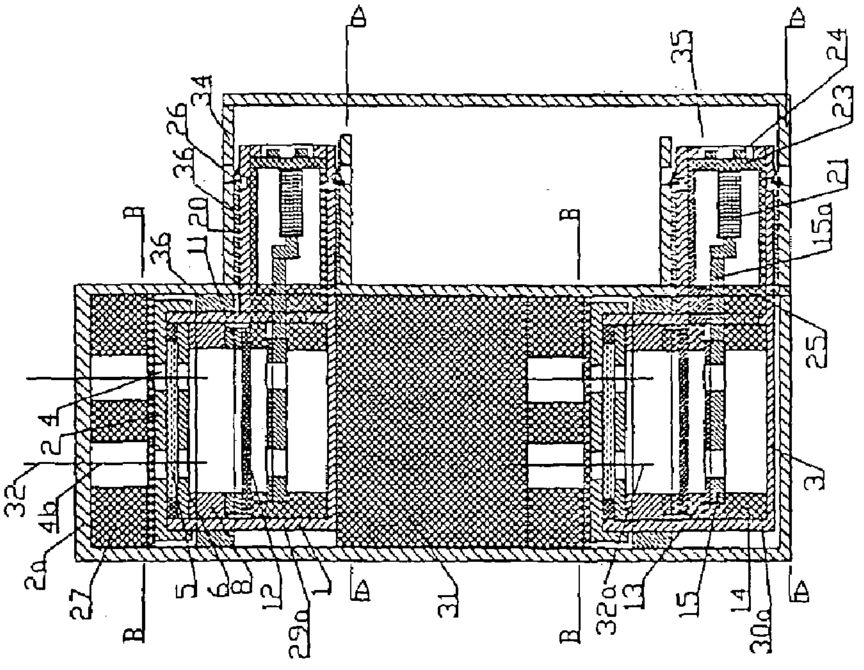
FIG. 14 is a cross section view of a noise-canceling pickup of present invention.

FIG. 14 shows the sectional view of a noise canceling pickup in this invention and FIGS. 14A and 14D are the A—A line, B—B line and C—C line sectional views as shown in FIG. 12. From the comparison between FIG. 14 and FIG. 11, and FIGS. 11A to 11D and FIG. 13 and FIGS.

13A to 13D we can see that their difference lies in: In the sound sensor used in this embodiment, the rear sound inlet 4*c*, rear sound inlet 4, rear damping film fixing sheet 6 and rear damping film 5 on the internal main cylinder body of upper electret sound sensor 29*a* and lower electret sound sensor 30*a* in main cylinder body are removed. The rear sound wave guiding module 7*a* inside external main cylinder body 33 and the rear sound channel 27*a* in rear sound wave guiding module 7*a* and sound gathering cover 19 are also removed. The front sound inlet 4, front damping film fixing sheet 6 and front damping film 5 in the internal cylinder body side wall I of upper electret sound sensor 29 and the internal cylinder body side wall 1 of lower electret sound sensor 30 are kept. The sound inlet 4*b* in front of the main cylinder body of external main cylinder body 33, the front sound wave guiding module 7 placed at front wall of the front cover of the various sound sensors inside external main cylinder body, the front sound channel 27 in the front sound wave guiding module 7 and the sound gathering cover are also kept to get an assembled high noise canceling pickup including an external main cylinder body 33 and external rear cylinder body 34 of the internal cylinder body of non-noise canceling sound sensor, whose front and rear sound inlets are of the same direction approximately or perpendicular approximately.

Figures 15, 15A, 15B:
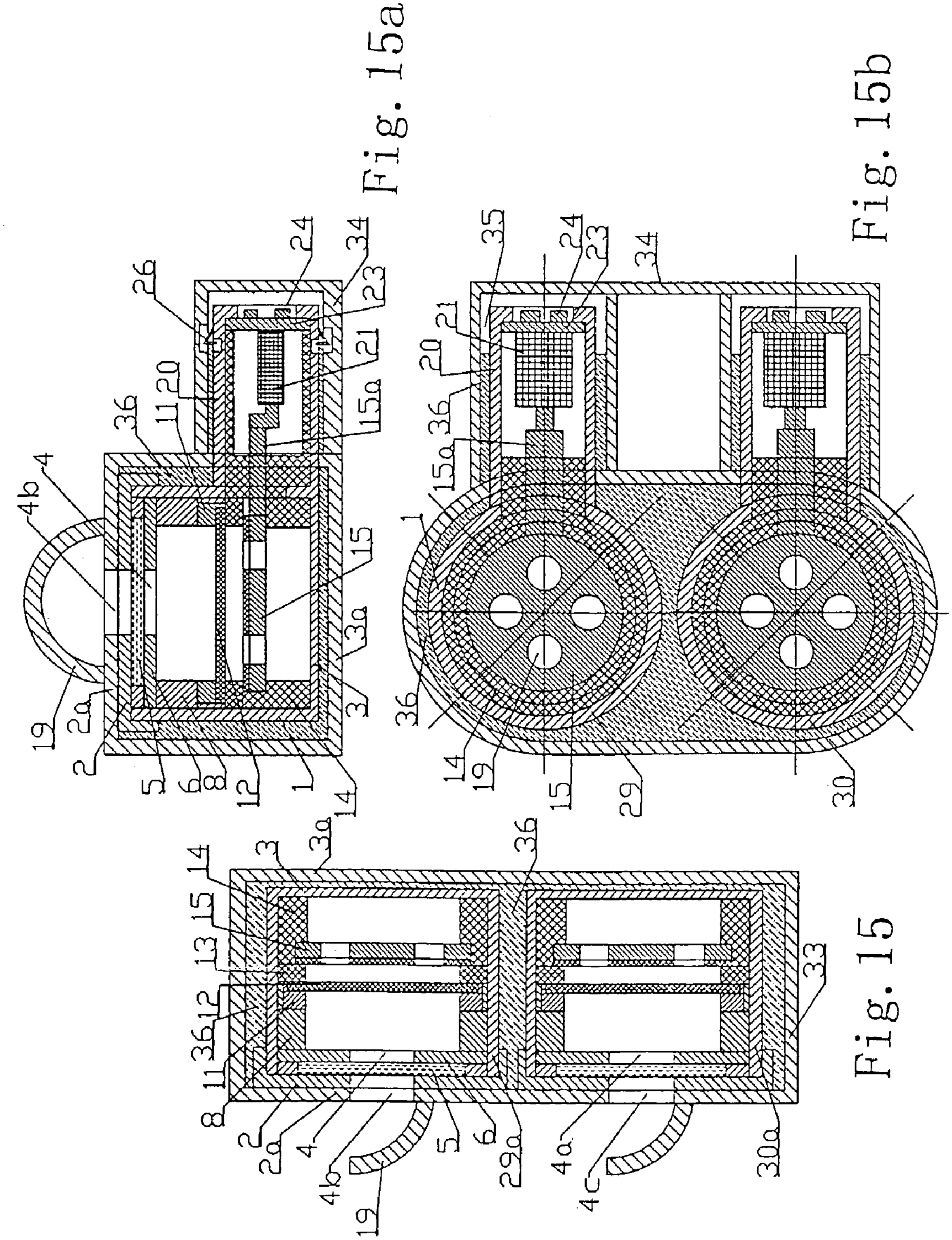
FIG. 15 is a cross section view of a noise-canceling pickup of present invention.
FIG. 15A~15B are the cross section views in lines A—A and B—B as shown in FIG. 15, respectively.

FIG. 15 shows the sectional view of a noise canceling pickup in this invention and FIGS. 15A and 15B are the top view and A—A line of FIG. 15.

From the comparison between FIG. 15 and FIG. 14, and FIGS. 14A and 11B we can see that their difference lies in: The internal main cylinder body of the upper electret sound sensor 29*a* and the internal main cylinder body of the lower electret sound sensor 30*a* in the main cylinder body of a non-noise sound sensor are placed side by side, inlet 4*b* is provided on the front cover and front wall 2*a* at the sidewall of external main cylinder body 33 and sound gathering cover 19 is provided outside the inlet 4*b*, with openings facing the same direction. Based on design, internal main cylinder body support 31 or shockproof spacer 36 can be placed between upper electret sound sensor 29*a* and lower electret sound sensor 30*a*.

The pickup section and electric circuit section which are commonly-used today can also be placed into the non-noise canceling sound sensor in a main cylinder body to get a assembled high noise canceling pickup with internal barrel bodies placed one in front and the other behind, rather than the pickup consisting of main cylinder body and rear cylinder body as shown in the Figure.

Figure 16A:
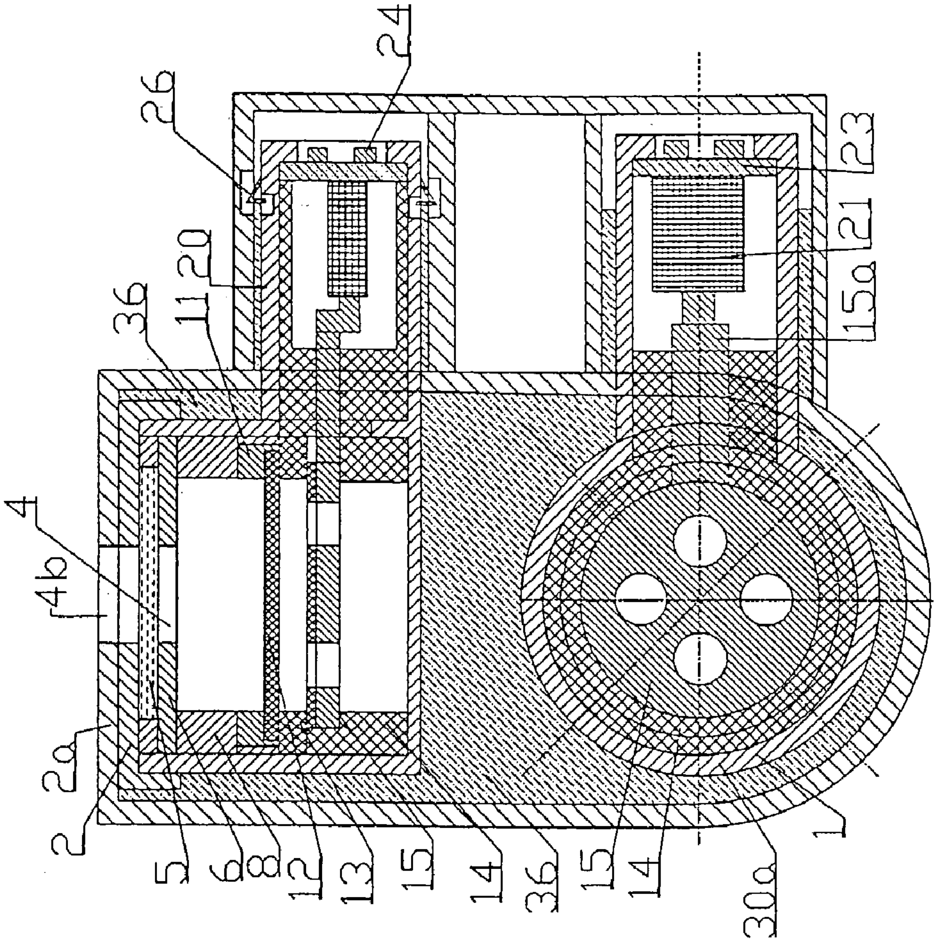
FIG. 16A is the cross section views in line A—A as shown in FIG. 16.
Figure 16:
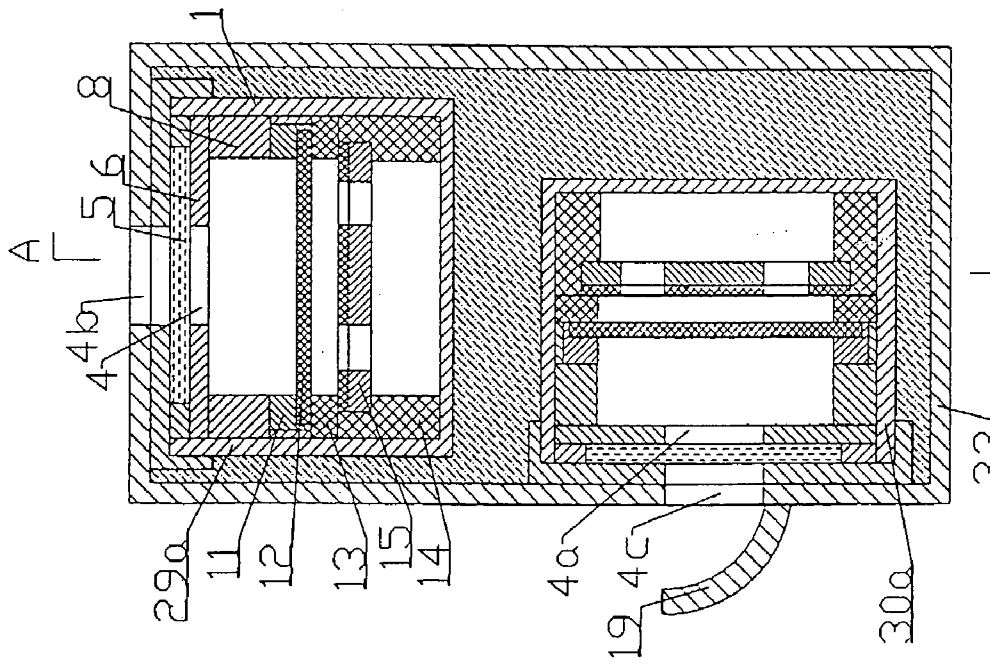
FIG. 16 is a cross section view of a noise-canceling pickup of present invention.

FIG. 16 shows the sectional view of a noise canceling pickup in this invention and FIGS. 16A is the A—A line sectional view as shown in FIG. 16. From the comparison between FIG. 16 and FIG. 15, and FIGS. 15A and 15B we can see that their difference lies in: The internal main cylinder body of the upper electret sound sensor 29*a* in the main cylinder body of a non-noise sound sensor is placed facing the front, inlet 4 is on the front cover and front wall 2 facing the front and sound gathering cover 19 is outside the inlet 4*a* on the side wall of external main cylinder body 33 corresponding to the inlet 4 of lower electret sound sensor 30, with the openings of upper electret sound sensor 29*a* and upper electret sound sensor 30*a* facing the same direction. Based on design, internal main cylinder body support 31 can be placed between upper electret sound sensor 29*a* and lower electret sound sensor 30*a*. The pickup section and electric circuit section which are commonly-used today can also be placed into the non-noise canceling sound sensor (the sound sensor as shown in FIG. 18) in a main cylinder body to get a assembled high noise canceling pickup with internal barrel bodies placed one in front and the other behind, rather than the pickup consisting of main cylinder body and rear cylinder body as shown in the Figure.

Figure 17:
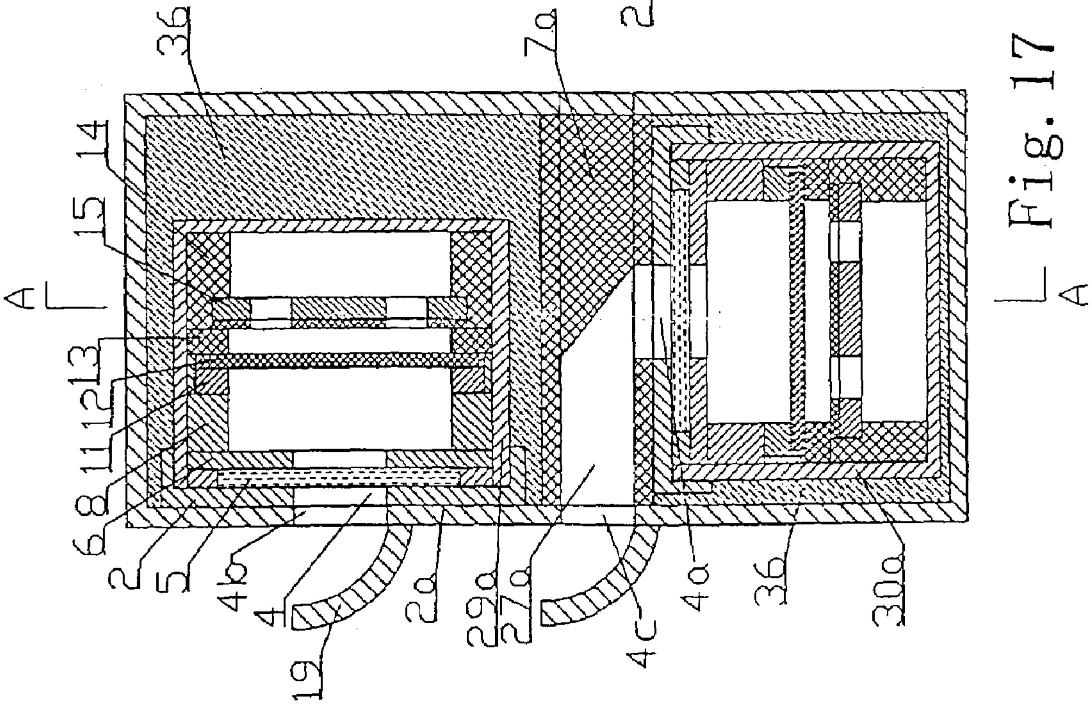
FIG. 17 is a cross section view of a noise-canceling pickup of present invention.
Figure 17A:
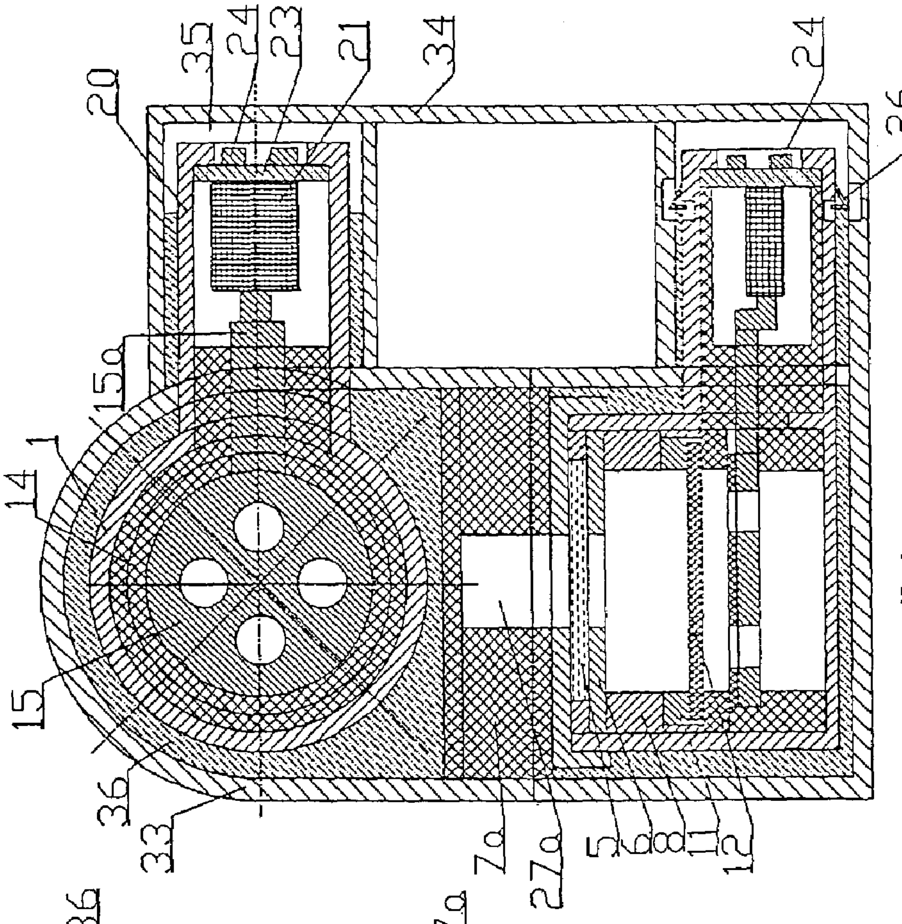
FIG. 17A is the cross section views in line A—A as shown in FIG. 17.

FIG. 17 shows the sectional view of a noise canceling pickup in this invention and FIG. 17A is the A—A line sectional view as shown in FIG. 17. From the comparison between FIG. 17 and FIG. 15, and FIGS. 15A and 15B and FIG. 16 we can see that their difference lies in: The internal main cylinder body of the lower electret sound sensor 30*a* in a main cylinder body is placed facing the front, inlet 4 is on the front cover and front wall 2 facing the front and sound gathering cover 19 is outside the inlet 4*a* on the side wall of corresponding external main cylinder body 33. Rear sound wave guiding module 7*a* is placed in front of the inlet 4 of the lower electret sound sensor 30 in external main cylinder body 33 and rear sound channel 27*a* of the rear sound wave guiding module 7*a* is available between inlet 4*a* and inlet 4. The openings of the sound gathering covers 19 of upper electret sound sensor 29 and lower electret sound sensor 30 face the same direction. Based on design, internal main cylinder body support 31 can be placed between upper electret sound sensor 29*a* and lower electret sound sensor 30*a*.

The pickup section and electric circuit section which are commonly-used today can also be placed into the non-noise canceling sound sensor (the sound sensor as shown in FIG. 18) in a main cylinder body to get a assembled high noise canceling pickup with internal barrel bodies placed one in front and the other behind, rather than the pickup consisting of main cylinder body and rear cylinder body as shown in the Figure. Likewise, the upper electret sound sensor 29*a* and lower electret sound sensor 30*a* can also be reversed to get a new application.

Figure 18A:
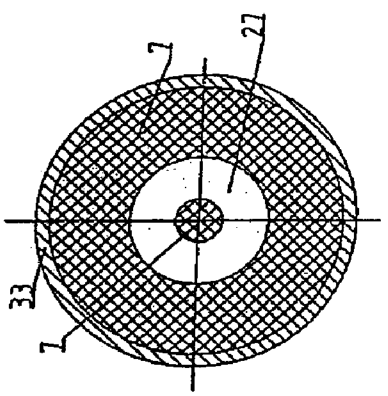
FIG. 18A, FIG. 18B are the cross section views in lines A—A and B—B as shown in FIG. 18, respectively.
Figure 18B:
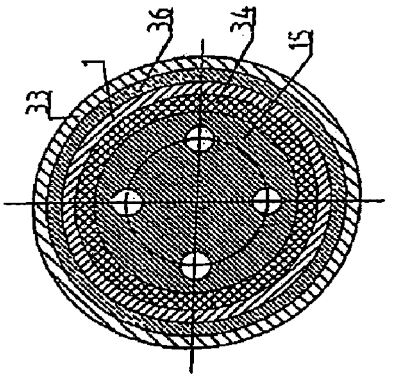
Figure 18:
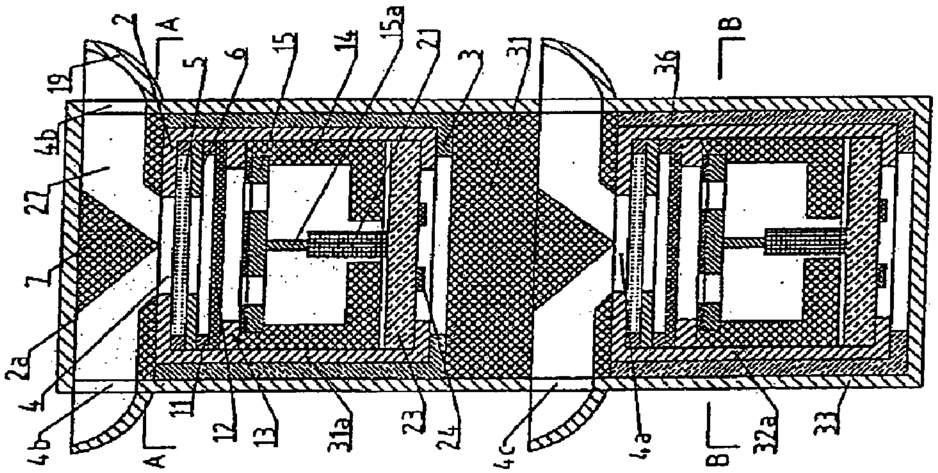
FIG. 18 is a cross section view of a noise-canceling pickup of present invention.

FIG. 18 shows the sectional view of a noise canceling pickup in this invention and FIGS. 17 and 18B are the A—A line and B—B line sectional views as shown in FIG. 18. From the comparison between FIG. 18 and FIG. 14, and FIGS. 14A to 14C and FIG. 11 and FIGS. 11A to 11C we can see that their difference lies in: In the sound sensor used in this embodiment, the back electrode electrodes 15*a* in the internal main cylinder body of upper electret sound sensor 29 and that of lower electret sound sensor 30 do not enter the back electrode pass hole 28 on back electrode seat 14 to enter internal rear cylinder body along the side of internal cylinder body, rather they directly enter the rear of the pickup to connect with impedance conversion electric circuit 21. Printed electric circuit board 23 is also in internal cylinder body 1 to form front sound sensor 31*a* and rear sound sensor 32*a*. This in fact means the use of noise canceling sound sensor assembled high noise canceling pickup whose front and rear sound inlets face approximately the same direction or perpendicular to each other approximately made of various commonly-used non-noise canceling electret sound sensors.

Figures 19, 19A, 19B, 19C:
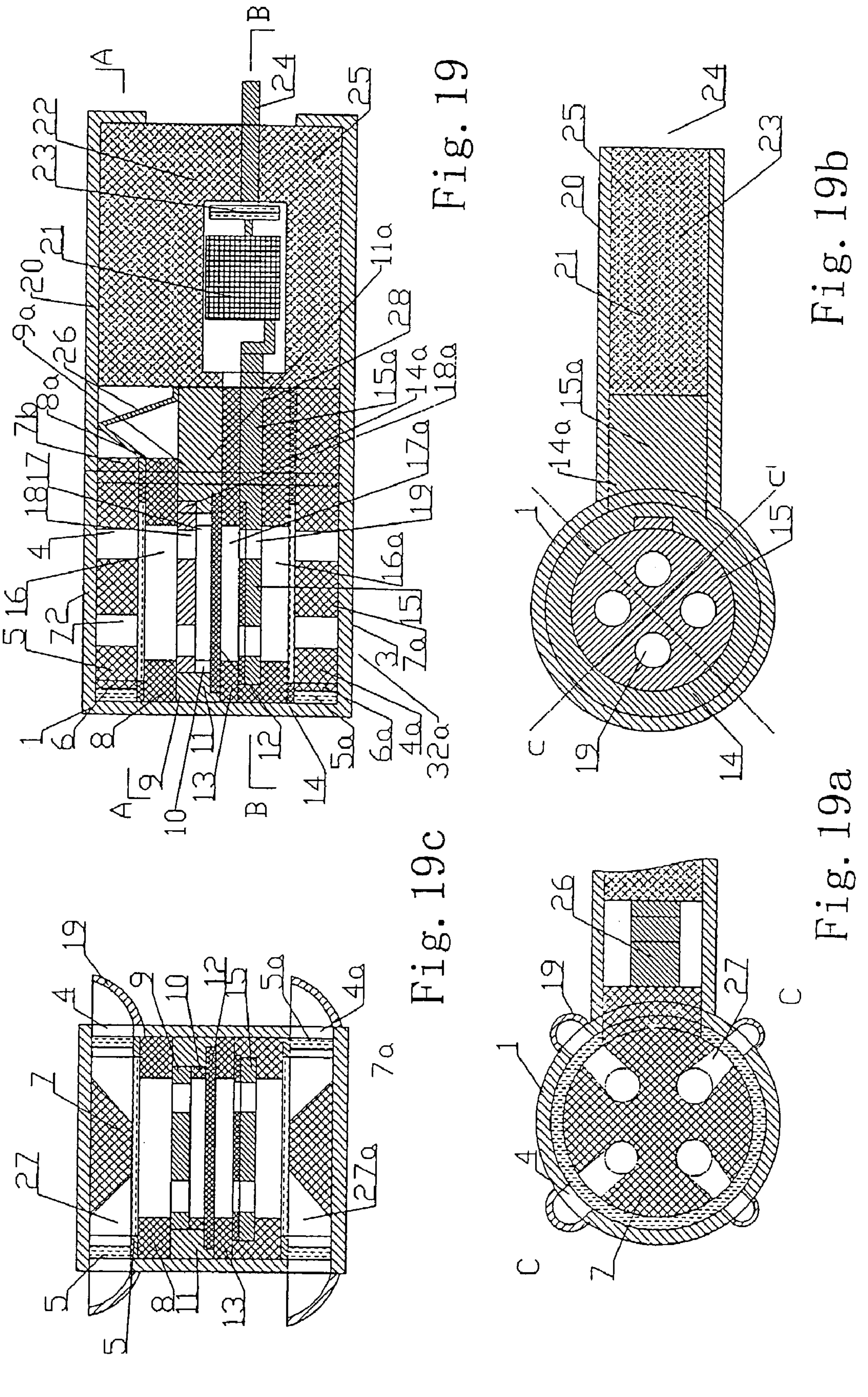
FIG. 19 is a cross section view of a noise-canceling pickup of present invention.
FIG. 19A and FIG. 19B are the cross section views in lines A—A and B—B as shown in FIG. 19, respectively.
FIG. 19C is the cross section view in lines C—C' as shown in FIG. 19B.

FIG. 19 shows the sectional view of a noise canceling pickup in this invention and FIGS. 19A to 19C are the A—A line, B—B line and C—C line sectional views as shown in FIG. 19. From the comparison between FIG. 19 and FIG. 1 and FIGS. 1A to 1C we can see that their difference lies in: Division plate 9 is placed inside the internal edge of diaphragm binding ring. Division plate spacer 10 is placed between vibration diaphragm 12 and division plate 9. In this way, there will be a cavity between vibration diaphragm 12, division plate 9 and division plate spacer 10 placed in between. Division plate spacer 10 can also be place at other places based on design, so long as it can separate 12 and 10 at a certain distance. The distance between 12 and 10 will be decided by the thickness of 9. Accordingly, the internal edge of back electrode spacer 13 can also be extended inwardly to a place corresponding to the internal edge of 9.

The extruding part of sound wave guiding module 7*b*, the extruding part of front spacer 8*a*, extruding part of diaphragm binding ring 11*a*, extruding part of back electrode seat 14*a* and extruding part of back electrode 15*a* can be used as marks for positioning, so that the components of the front and rear acoustic channels of vibration diaphragm can be installed corresponding to each other based on design. Other marks serving as placement reference can also be used. Positioning mark for a component can be decided based on needs. The conducting contacts between the diaphragm binding ring and the casing of the cylinder body of sound sensor can also be moved from front cylinder body to the casing of rear cylinder body. Its connection with the casing can either be hard connection through conductive piece or elastic connection through such elastic conductor as conductive spring lamination 26. This makes the acoustic structures between the front and rear sound inlets at the sides of vibration diaphragm in noise canceling sound sensor even the same and symmetrical approximately.

Figures 20, 20A, 20B, 20C:
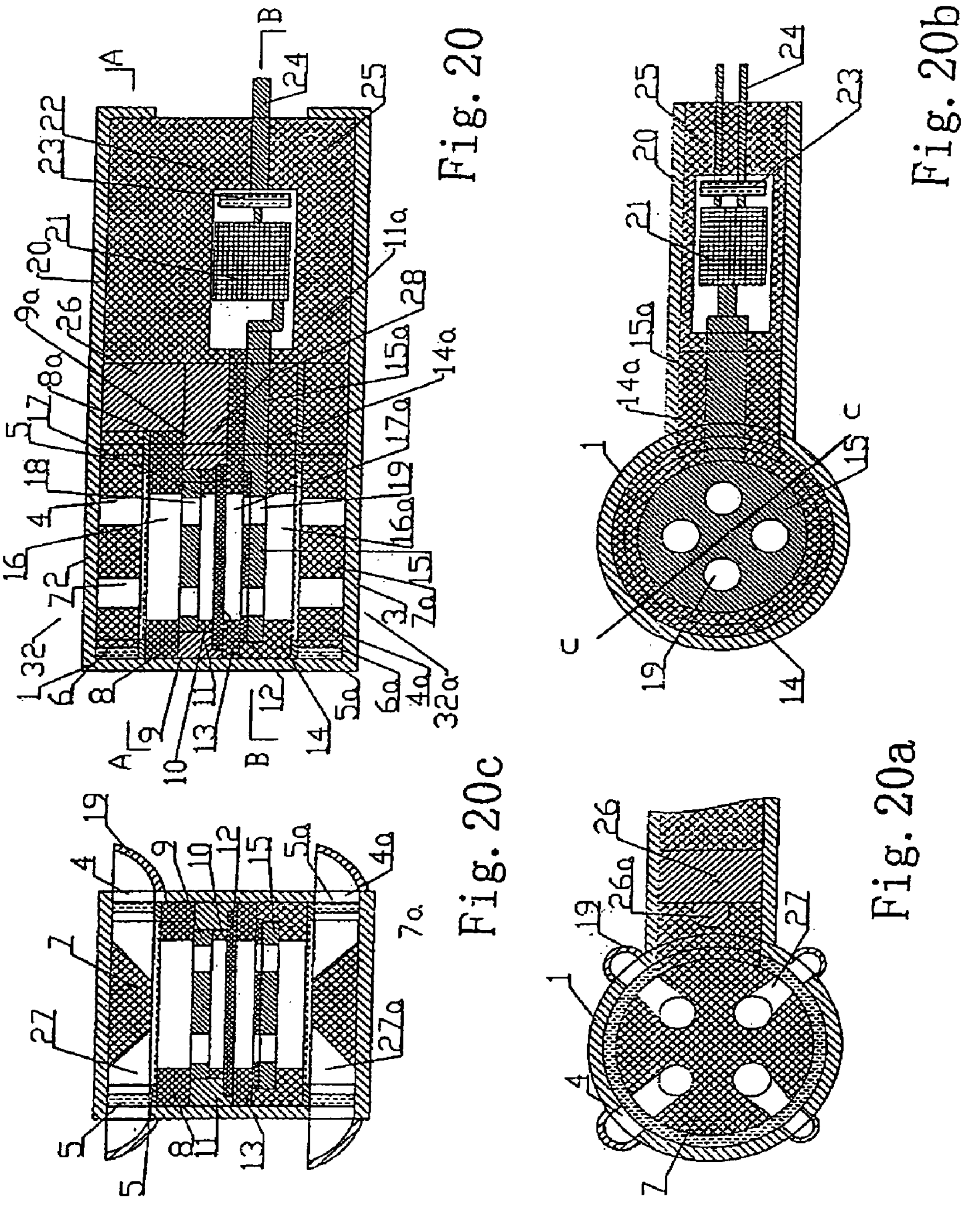
FIG. 20 is a cross section view of a noise-canceling pickup of present invention.
FIG. 20A and FIG. 20B are the cross section views in line A—A and line B—B as shown in FIG. 20.
FIG. 20C is the cross section view in lines C—C as shown in FIG. 20B.
Figure 21:
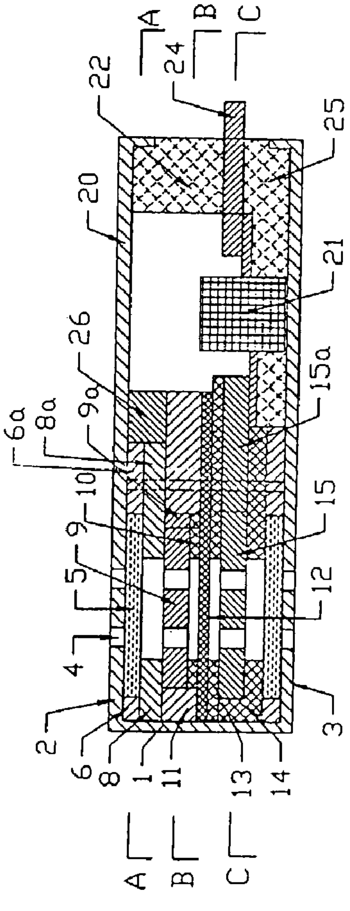
FIG. 21 is a cross section view of a noise-canceling pickup of present invention.
Figure 21A:
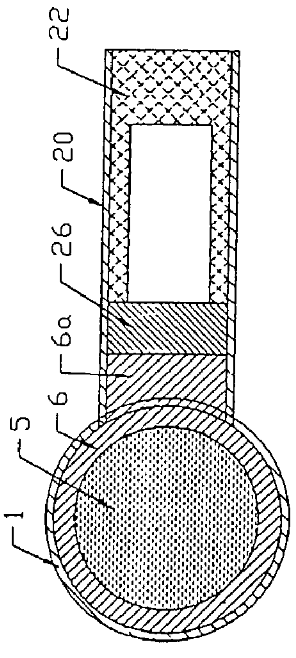
FIG. 21A, FIG. 21B and FIG. 21C are the cross section views in line A—A, line B—B, and line C—C as shown in FIG. 21.
Figure 21B:
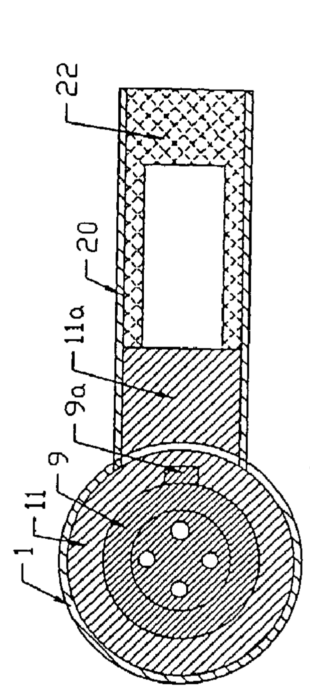
Figure 21C:
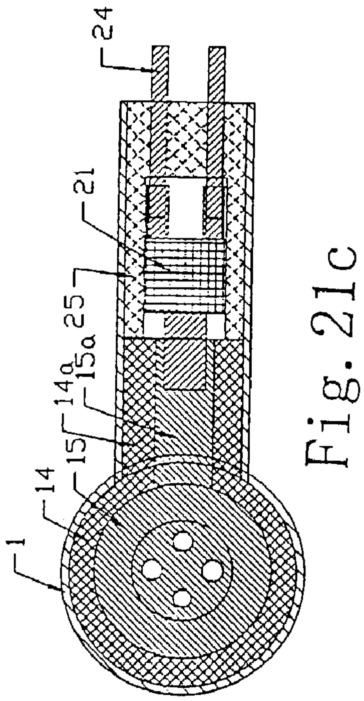

FIG. 20 shows the sectional view of a noise canceling pickup in this invention and FIGS. 20A to 20C are the A—A line, B—B line and C—C line sectional views as shown in FIG. 20. From the comparison between FIG. 20 and FIG. 1, and FIGS. 1A to 1C we can see that their difference lies in:

FIG. 21 shows the sectional view of a noise canceling pickup in this invention and FIGS. 21A to 21C are the A—A line, B—B line and C—C line sectional views as shown in FIG. 21. From the comparison between FIG. 21 and FIG. 1, and FIGS. 1A to 1C we can see that their difference lies in: From the comparison between FIGS. 21 and 20 and FIGS. 20A and 20C we can see that: Front and rear sound inlets are not on the side wall of internal cylinder body side wall 1, rather they are on front cover front wall 2 and rear cover rear wall 3. In this way, there is no need to use the front and rear sound wave guiding modules 7 and 7*a* and the front and rear sound channels 27 and 27*a* in 7 and 7*a*. This application can also be used as the modified type for actual production of various noise canceling pickups in this inventor's patents and patent applications mentioned above.

Figure 22:
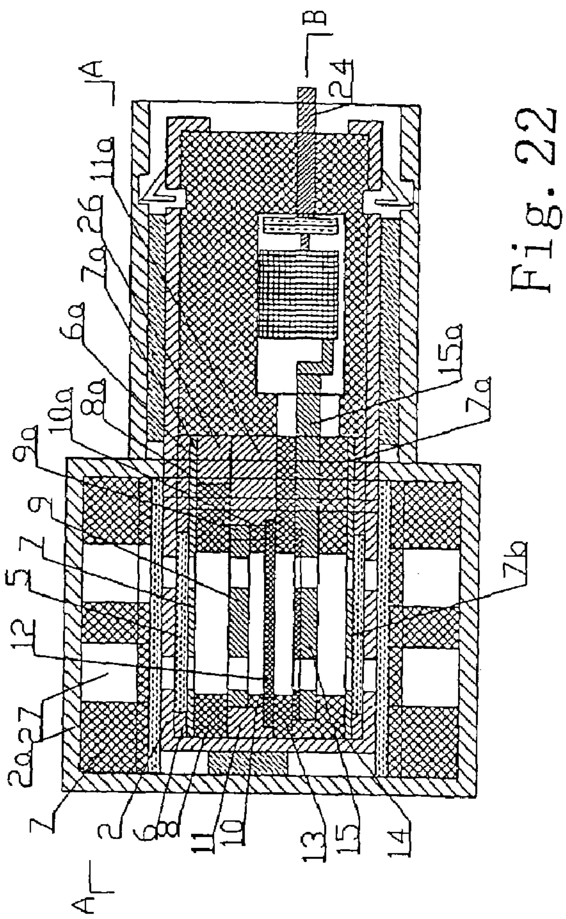
FIG. 22 is a cross section view of a noise-canceling pickup of present invention.
Figure 22B:
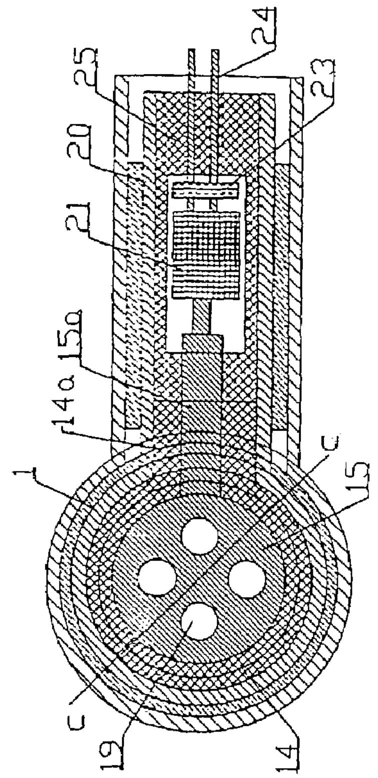
FIG. 22A, FIG. 22B are the cross section views in lines A—A and B—B as shown in FIG. 22, respectively.
Figure 22C:
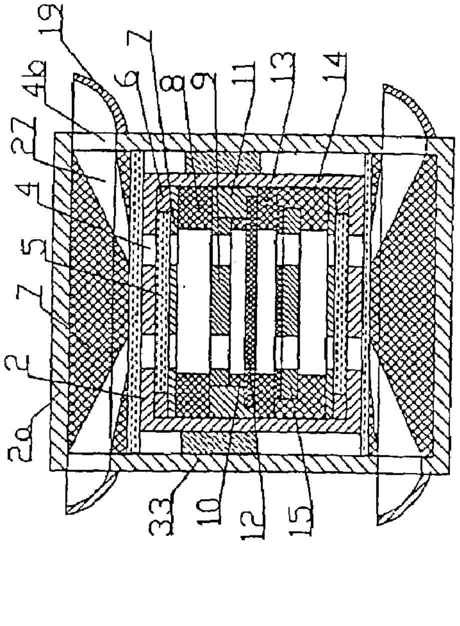
FIG. 22C is the cross section view in lines C—C as shown in FIG. 22B.
Figure 22A:
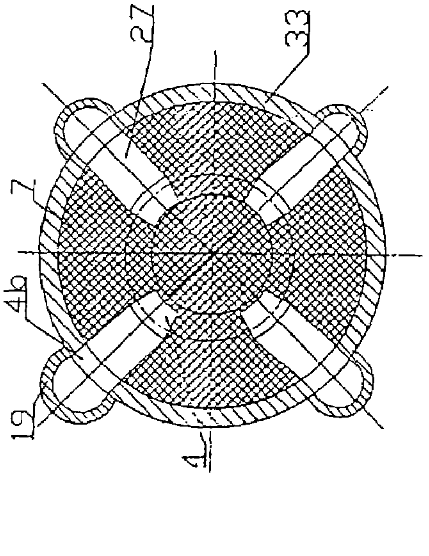

FIG. 22 shows the sectional view of a noise canceling pickup in this invention and FIGS. 22A to 22C are the A—A line, B—B line and C—C line sectional views as shown in FIG. 22. From the comparison between FIG. 22 and FIG. 21, and FIGS. 21A to 22C we can see that their difference lies in:

Place application No. 21 in external cylinder body 33 and external rear cylinder body 34. The various noise canceling sound sensors and various noise canceling sound sensors in this inventor's patents and patent applications mentioned above can also be placed in external cylinder body 33 and external rear cylinder body 34 to get the noise canceling pickup of this invention.

Figure 23B:
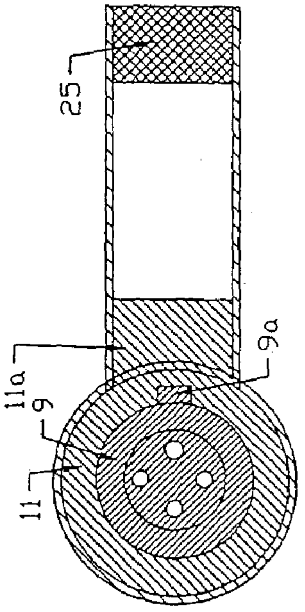
FIG. 23A, FIG. 23B, and FIG. 23C are the cross section views in line A—A, line B—B, and line C—C as shown in FIG. 23, respectively.
Figure 23C:
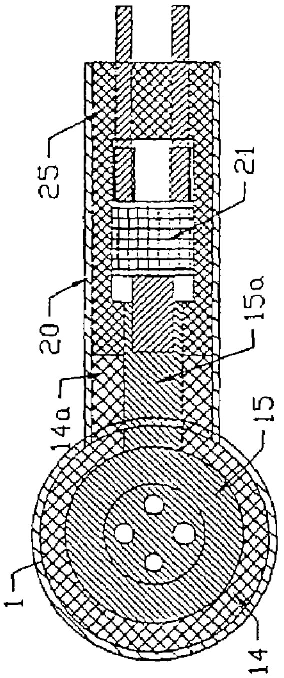
Figure 23:
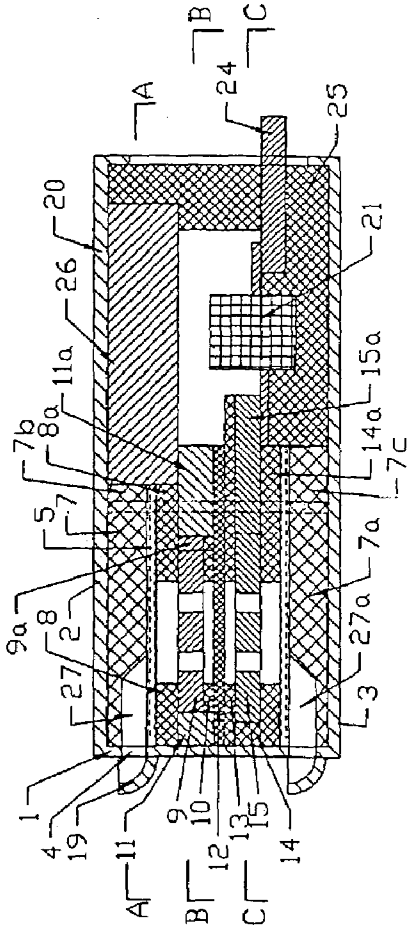
FIG. 23 is a cross section view of a noise-canceling pickup of present invention.
Figure 23A:
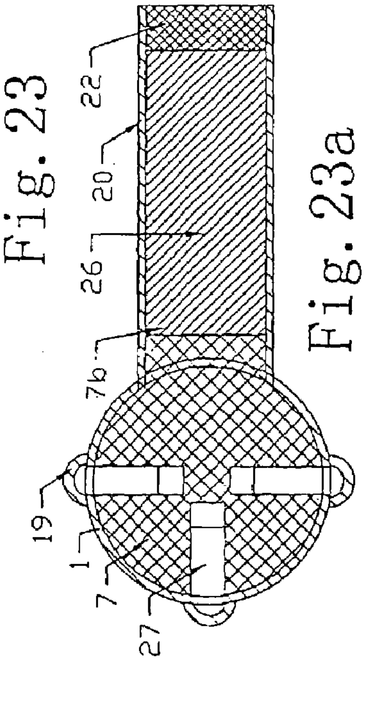

FIG. 23 shows the sectional view of a noise canceling pickup in this invention and FIGS. 23A to 23C are the A—A line, B—B line and C—C line sectional views as shown in FIG. 23. From the comparison between FIG. 23 and FIG. 19, and FIGS. 19A to 19C we can see that their difference lies in: This is mainly a modified one for actual production in the applications of this invention. This application can also be used as a modified type for actual production of the various noise canceling pickups in this inventor's patents and patent applications.

Figure 24A:
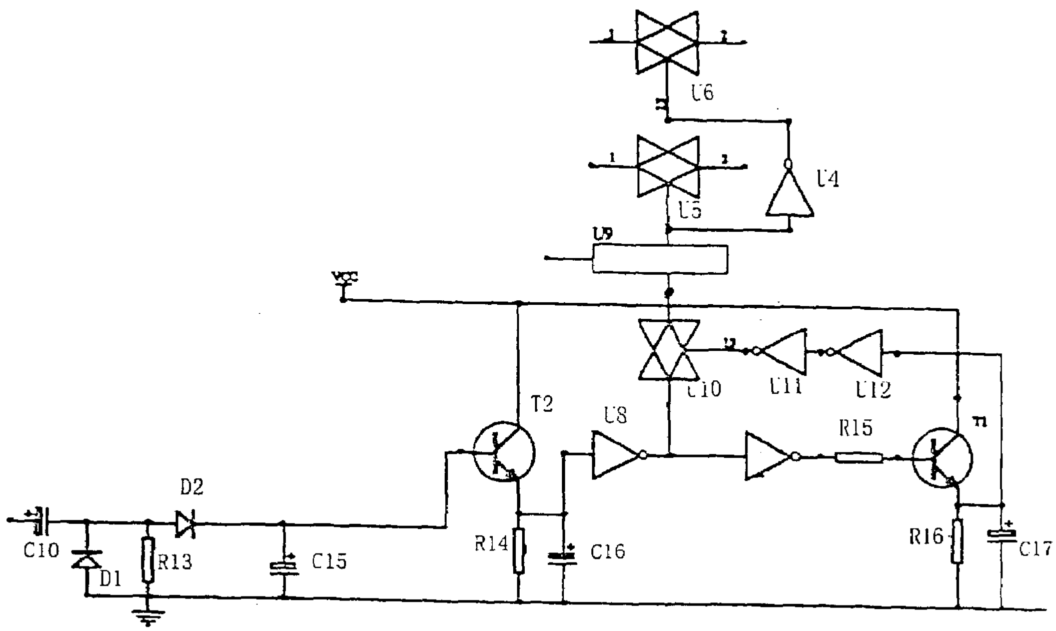
FIG. 24*a* is a circuit diagram illustrating a sound controlled switch used in a noise canceling pickup according to the present invention.

FIG. 24*a* shows the circuit diagram of the sound signal control switch of a noise canceling pickup in this invention.

A sound controlled switch electric circuit as shown in FIG. 24*a* is arranged between capacitor C10 and NOT gate, analog switches U6 and U5. The low deformation and low noise sound signals outputted from common mode signal inhibition electric circuit pass through C10 and the detecting circuit consisting of diodes D1, D2 and resistance R9, the sound controlled switch electric circuit consisting of triode T2, capacitors C15, C16 and C17, resistances R14, R15 and R16, NOT gates U8, U13, U11 and U12, analog switch U10 and R-J trigger U9 to control the control end 13 of U5 so that it opens. Sound signals inputted from input end 1 are outputted from output end 2 and then pass through NOT gate U4 which is reverse to control the control end 13 of analog switch U6 so that it closes. Sound signals inputted from input end 1 cannot be outputted from output end 2. In U5 and U6, one is open and another is closed. On the contrary, when there are no input of sound signals sent out by main sound source, opening and close are reversed. U5 and U6 opening and closing time can be decided by capacitor C17 and R16 after a speech is finished (say 10 s) to avoid error opening and closing due to short interruptions during a speech. In this electric circuit, all electric circuits can use integrated circuits or discrete electric component circuits. Analog switch electric circuit, digital logic switch electric circuit and other types of electric circuits which can carry out the functions of the electric circuit can also be used based on needs.

Figure 24B:
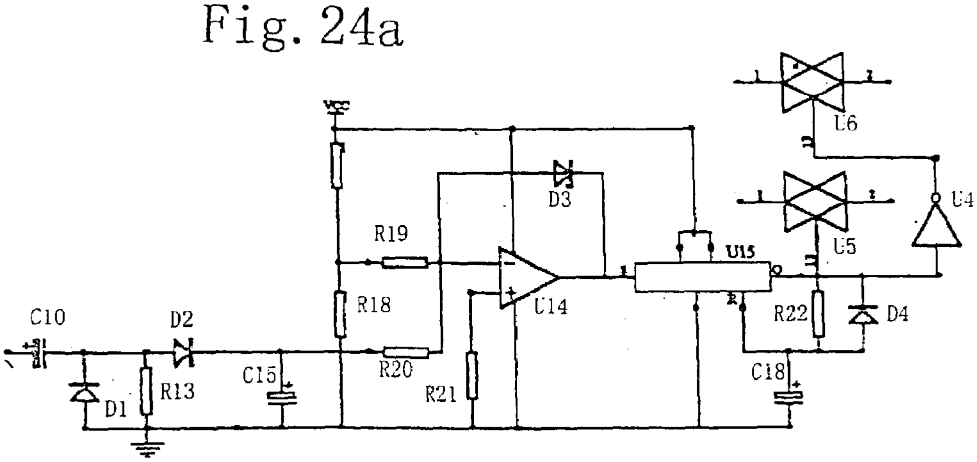
FIG. 24*b* is a circuit diagram illustrating a sound controlled switch used in a noise canceling pickup according to the present invention.

FIG. 24*b* shows the circuit diagram of the sound signal control switch of a noise canceling pickup in this invention.

A sound controlled switch electric circuit as shown in FIG. 24*b* is provided between capacitor C10 and U4, U6 and U5. Its theory is the same as that of application 24*a*, only that the sound controlled electric circuit for controlling analog switch adopts comparator electric circuit. We now make a description of the comparator electric circuit: The low deformation and low noise sound signals outputted from common mode signal inhibition electric circuit pass through C10 and the detecting circuit consisting of diodes D1, D2 and resistance R9, the sound controlled switch electric circuit consisting of resistances R17, R18, R19 and R120, voltage-regulator diode D3, diode D4, capacitors C15 and C18, arbitrary electrical level comparator U14 and R-J trigger U15 to control the control end 13 of analog switch U5 so that it opens. Sound signals inputted from input end 1 are outputted from output end 2 and then pass through NOT gate U4 which is reverse to control the control end 13 of analog switch U6 so that it closes. Sound signals inputted from input end I cannot be outputted from output end 2. In U5 and U6, one is open and another is closed. On the contrary, when there are no input of sound signals sent out by main sound source, opening and close are reversed. U5 and U6 opening and closing time can be decided by capacitor C18 and R22 after a speech is finished (say 10 s) to avoid error opening and closing of U5 and U6 due to short interruptions during a speech.

Figure 24C:
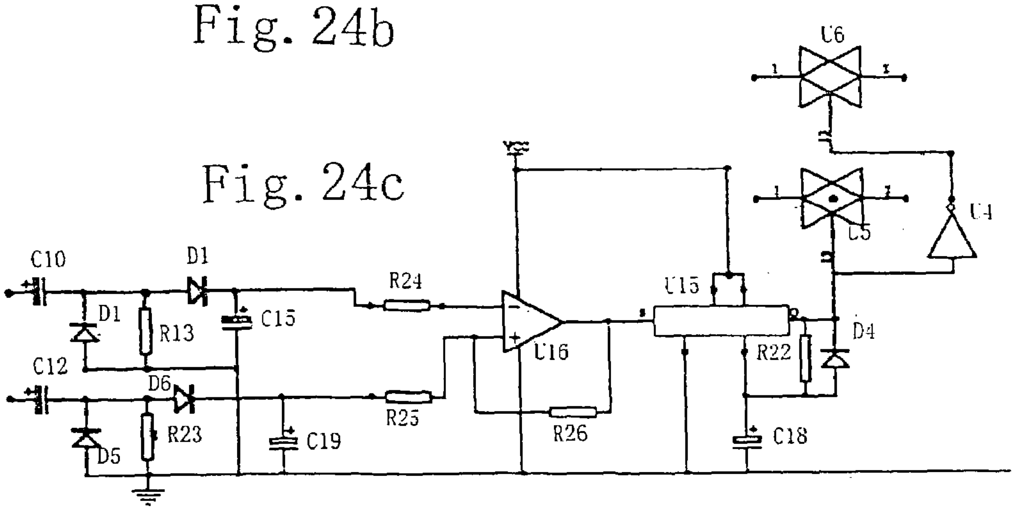
FIG. 24*c* is a circuit diagram illustrating a sound controlled switch used in a noise canceling pickup according to the present invention.

FIG. 24*c* shows the circuit diagram of the sound signal control switch of a noise canceling pickup in this invention.

And a sound signal controlled switch electric circuit as shown in FIG. 24*c* is provided between the above capacitor C10 and C12 and U4, U6 and U5. Its theory is the same as that of application 24*a*, only that the sound controlled electric circuit for controlling analog switch uses the sound signals which have not bee treated for reduction of environmental noises received by sound sensor and compares with the sound signals with low environmental noises out putted from common mode signal inhibition electric circuit before controlling sound controlled switch electric circuit. Its theory is the same as that of application 13*b*, only that it adopts lagging comparator. The low deformation and low noise sound signals outputted from common mode signal inhibition electric circuit pass through C10 and the detecting circuit consisting of diodes D1, D2 and resistance R13 and the sound signals from one of the two sound sensors which have not been treated for reduction of environmental noises pass through capacitor C12 and the detecting electric circuit consisting of diodes D5 and D6 and resistance R23 and sound controlled switch electric circuit consisting of resistances R24, R26, R26 and R22, diode D4, capacitors C15, C19 and C18, lagging comparator U16 and R-J trigger U15 to control the control end 13 of analog switch U5 so that it opens. Sound signals inputted from input end 1 are outputted from output end 2 and then pass through NOT gate U4 which is reverse to control the control end 13 of analog switch U6 so that it closes. Sound signals inputted from input end 1 cannot be outputted from output end 2. In U5 and U6, one is open and another is closed. On the contrary, when there are no input of sound signals sent out by main sound source, opening and close are reversed. U5 and U6 opening and closing time can be decided by capacitor C18 and R22 after a speech is finished (say 10 s) to avoid error opening and closing of U5 and U6 due to short interruptions during a speech.

Figure 25:
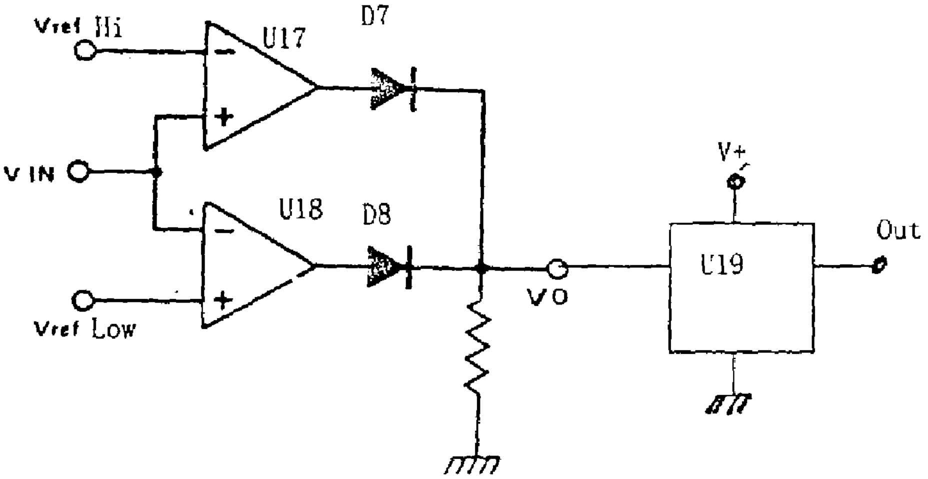
FIG. 25 is a circuit diagram illustrating a distance alarm circuit used in a noise canceling pickup according to the present invention.

The electric circuits in the signal controlled switch electric circuit used in 24*a* to 24*c* can use either integrated electric circuits or discrete component electric circuits and use different comparator electric circuits and trigger electric circuits. Analog electric circuits, digital electric circuits, operational procedures needed or analog digital composite electric circuits can be used based on needs, as well as various electric circuits which can carry out the functions of the entire electric circuit. FIG. 25 shows the electric circuit of a noise canceling pickup for giving off alarms when receiving distance is exceeded.

When the distance between the noise canceling pickup of this invention and main sound source exceeds a certain range, signals will be greatly attenuated, which may even affect effective reception. To remind users that the distance between noise canceling pickup and main sound source exceeds applicable range, this invention designs an electric circuit of a noise canceling pickup for giving off alarms when receiving distance is exceeded.

When the distance between a noise canceling pickup and main sound source exceeds an applicable range, the sound wave signals received by noise canceling sound sensor (different mode signal) will be greatly attenuated and the power of received sound wave signals will be too low. And it is made based on this theory.

This electric circuit is in reality a window comparator electric circuit. If the voltage of the sound wave signals (single loop different mode signals) received by input single loop noise canceling sound sensor is between two designated voltages (Upper limit is the lower limit of designed distance range and lower limit is the upper limit when distance exceeds designed distance by a certain range), then electric circuit has output (0V in this example). If output is positive outside this window, two comparators, namely, U17 and U18, can be used as window voltage comparator. If Vin is more positive than Vref (high side), U17 output will be positive and is forward bias. Otherwise, output is negative and U17 is negative bias, thus Vout is 0V. Likewise, if Vin is more negative than Vref (low side), U18 output will be positive and U18 is positive bias, then output is positive. Otherwise, Vout is 0V. If Vin is located in the window established by reference voltage, Vout will be 0V When window comparator detects that input voltage is between two designated voltages, it will give off starting signals to alarming electric circuit U19 and output alarming signal will remind users that the applicable range of the distance between noise canceling pickup and main sound source has been exceeded.

The single interval electric circuit in the middle of single interval window comparator electric circuits U17 and U18 can be changed into the window comparator electric circuit with multiple-interval electric circuits. Some of the intervals can adjust the amplification coefficient of amplifier based on the intensity of sound signals received to constitute an automatic gain control electric circuit using comparator electric circuit, and/or some other intervals can adjust alarming electric circuit (either single step alarming electric circuit or multiple-step one) based on reception distance. Other automatic gain control electric circuits and alarming electric circuits can also be used.

In this application, comparator electric circuit can be MC14574 comparator or comparators of other models and types. And the comparator electric circuit can use window comparator, other types of comparator electric circuits or others consisting of transistor, operational amplifier, comparator or digital electric circuit. It can use integrated electric circuit, discrete component electric circuit, various types of comparator electric circuit and trigger electric circuit. Analog electric circuits, digital electric circuits, operational procedures needed or analog digital composite electric circuits can be used based on needs, as well as various electric circuits which can carry out the functions of the entire electric circuit.

FIG. 10 shows the sectional view of a noise canceling pickup in this invention and FIG. 10A is the A—A line sectional view as shown in FIG. 10. From the comparison between FIG. 10, FIG. 7 and FIGS. 7A to 7B and FIG. 9 we can see that their difference lies in: The direction of the internal main cylinder body of the lower electret sound sensor 30 of the main cylinder body of non-noise sound sensor is changed to facing the front, inlet 4 is on the front cover and front wall 2 facing the front and sound gathering cover 19 is outside the inlet 4*a* at the side of the internal main cylinder body of lower electret sound sensor 30, with opening facing the same direction as the sound gathering cover 19 of upper eletret sound sensor 29. Based on design, internal main cylinder body support 31 can be placed between upper electret sound sensor 29 and lower electret sound sensor 30, rear sound wave guiding module 7*a* can be placed in front of the inlet 4 of lower electret sound sensor 30 and rear sound channel 27*a* of rear sound wave guiding module 7*a* is available between inlets 4*a* and 4. It can be made into one single main cylinder body or two main cylinder bodies separately. The pickup section and electric circuit section which are commonly-used today can also be placed into the non-noise canceling sound sensor structure (the sound sensor structure as shown in FIG. 18) of a main cylinder body to form a assembled high noise canceling pickup with internal barrel bodies placed one in front and the other behind, rather than the pickup consisting of main cylinder body and internal rear cylinder body as shown in the Figure. Likewise, the upper electret sound sensor 29 and lower electret sound sensor 30 can also b reversed to get a new application.

Based on design, the internal main cylinder bodies of the upper electret sound sensor 29 and lower electret sound sensor 30 as shown from FIGS. 5 to 10 can also be designed into two separate main cylinder body casings or a shared internal main cylinder body casing. The internal main cylinder body of the original upper electret sound sensor 29 and the components inside lower electret sound sensor 30 are placed at the front and back inside the shared internal main cylinder body casing, between which internal main cylinder body support 31 inside the shared internal main cylinder body casing is placed for isolation, which can both have the effect of isolating sound waves and keeping the front and rear sound reception sections at a certain distance, as well as connection and supporting functions. Subject to needs, the internal main cylinder body support 31, the rear sound wave guiding module of front sound sensor 7*a* and the front sound wave guiding module of rear sound sensor 7 can be integrated or separated. The internal main cylinder body support 31 can either use materials with sound wave impedance or other materials and can be designed into various appropriate shapes based on needs.

FIG. 11 shows the sectional view of a noise canceling pickup in this invention and FIGS. 11A and 11C are the A—A line, B—B line and C—C line sectional views as shown in FIG. 11. From the comparison between FIG. 11, FIG. 1 and FIGS. 1A to 1C we can see that their difference lies in: External main cylinder body 33 and external rear cylinder body 34 are used and various types of noise canceling sound sensors in this inventor's above-mentioned patents and patent applications are installed and used in the carriage.

The internal rear cylinder body 20 of high noise canceling sound sensor and the internal rear cylinder body inserted into external rear cylinder body 34 are inserted into hole 35, the internal main cylinder bodies of various noise canceling sound sensors are placed in the front and at the back of external main cylinder body 33 and sound wave guiding modules 7 and 7*a* and sound channels 27 and 27*a* in sound wave guiding modules 7 and 7*a* are placed outside the front sound inlet 4 and rear sound inlet 4*a* of internal cylinder body side wall 1.

Shockproof spacer 36 and shockproof cushion 37 can be provided between external main cylinder body 33, internal main cylinder body support 31, sound wave guiding modules 7 and 7*a*, internal cylinder body side wall 1, front cover front wall 2 and rear cover rear wall 3 for shockproof isolation. Subject to needs, shockproof spacer 36 can either be used or not used between the internal rear cylinder body of electret sound sensor 20 and the internal wall of internal rear cylinder body insertion hole 35. At the front end and rear end of noise canceling sound sensor inside external main cylinder body are available front sound inlet 4 and rear sound inlet 4*a* and front sound wave guiding module 7 and rear sound wave guiding module 7*a* are placed between the front wall of the external front cover and rear wall of the external rear cover of external main cylinder body and the front cover front wall and rear cover rear wall of high noise canceling sound sensor inside. The inward openings of the front sound channel 27 and rear sound channel 27*a* among them should correspond to the front and rear sound inlets 4 and 4*a* on the front cover front wall and rear cover rear wall. Based on needs, shockproof cushion 37 can be used between the front cover front wall and rear cover rear wall and front sound wave guiding module 7 and rear sound wave guiding module 7*a* of high noise canceling sound sensor. A sound pass hole should be available on the shockproof cushion.

Sound gathering cover 19 can be provided at the front and rear sound inlets of the external wall of external main cylinder body 33.

FIG. 12 shows the sectional view of a noise canceling pickup in this invention and FIGS. 12A and 12B are the A—A line and B—B line sectional views as shown in FIG. 12. From the comparison between FIG. 12, FIG. 11 and FIGS. 1A to 1D we can see that their difference lies in: The internal main cylinder body and internal rear cylinder body 20 used from FIGS. 11A to 11D are changed into a common noise canceling pickup whose all component are placed in a single cylinder body. Outside it is provided external main cylinder body 33. Sound gathering cover 19 can be installed at the rear sound inlet at the external side wall of external main cylinder body 33. The front sound inlet of external main cylinder body is not on side wall but on front cover front wall. Rear sound wave guiding modules 7*a* are available behind external main cylinder body 33 and the inward opening of their rear sound channel 27*a* corresponds to the rear sound inlet 4*a* on rear cover rear wall 3. Front damping film 5 can be placed between the front sound inlet of external main cylinder body 33 and the front sound inlet 4 of internal cylinder body side wall 1, or between the front sound inlet 4 of internal cylinder body side wall 1 and vibration diaphragm 12. It can also be not used. FIG. 13 shows the sectional view of a noise canceling pickup in this invention and FIGS. 13A and 13C are the A—A line, B—B line and C—C line sectional views as shown in FIG. 13. From the comparison between FIG. 13 and FIG. 11, and FIGS. 11A to 11D and FIG. 1 and FIGS. 1A to 1C we can see that their difference lies in: External main cylinder body 33 and external rear cylinder body 34 are used and various types of noise canceling sound sensors in this inventor's above-mentioned patents and patent applications are installed and used in the carriage.

The internal rear cylinder body 20 of high noise canceling sound sensor and the internal rear cylinder body inserted into external rear cylinder body 34 are inserted into hole 35, the internal main cylinder bodies of various noise canceling sound sensors are placed in the front and at the back of external main cylinder body 33 (such as the internal main cylinder body of upper electret sound sensor 29*a* and the internal main cylinder body of lower electret sound sensor 30*a*) and sound wave guiding modules 7 and 7*a* and sound channels 27 and 27*a* in sound wave guiding modules 7 and 7*a* are placed outside the front sound inlet 4 and rear sound inlet 4*a* of internal cylinder body side wall 1.

Shockproof spacer 36 and shockproof cushion 37 can be provided between external main cylinder body 33, sound wave guiding modules 7 and 7*a* and the internal main cylinder body of upper electret sound sensor 29*a* and the internal main cylinder body of lower electret sound sensor 30*a* for shockproof isolation. They can also not be used.

Internal main cylinder body support 31 can be placed between two internal main cylinder body. Sound gathering cover 19 can be installed on the external side wall of external main cylinder body 33 and at the openings of the front and rear sound inlets 4 and 4*a* of the various noise canceling sound sensors inside carriage cylinder body. Front sound wave guiding module 7 and the front sound channel 27 in sound wave guiding module 7 are placed between the front sound inlet and rear sound inlet of external main cylinder body 33, the front cover front wall and rear cover and rear wall of the various noise canceling sound sensors in external main cylinder body and the front cover front wall and rear cover rear wall of high noise canceling sound sensor. Based on needs, shockproof cushion can be used between the front cover front wall and rear cover rear wall and front sound wave guiding module 7 of high noise canceling sound sensor. A sound pass hole should be available on the shockproof cushion.

Shockproof spacer 36 can be used between the internal rear cylinder body 20 of electret sound sensor and the internal wall of internal rear cylinder body insertion hole 35 based on needs.

FIG. 14 shows the sectional view of a noise canceling pickup in this invention and FIGS. 14A and 14D are the A—A line, B—B line and C—C line sectional views as shown in FIG. 12. From the comparison between FIG. 14 and FIG. 11, and FIGS. 11A to 11D and FIG. 13 and FIGS. 13A to 13D we can see that their difference lies in: In the sound sensor used, the rear sound inlet 4*c*, rear sound inlet 4, rear damping film fixing sheet 6 and rear damping film 5 on the internal main cylinder body of upper electret sound sensor 29*a* and that of lower electret sound sensor 30*a* in main cylinder body are removed. The rear sound wave guiding module 7*a* inside external main cylinder body 33 and the rear sound channel 27*a* in rear sound wave guiding module 7*a* and sound gathering cover 19 are also removed. The front sound inlet 4, front damping film fixing sheet 6 and front damping film 5 in the internal cylinder body side wall 1 of upper electret sound sensor 29 and the internal cylinder body side wall 1 of lower electret sound sensor 30 are kept. The inlet 4*b* in front of the main cylinder body of external main cylinder body 33, the front sound wave guiding module 7 placed at the front cover and front wall of the various sound sensors inside external main cylinder body, the front sound channel 27 and sound gathering cover in the front sound wave guiding module 7 are also kept to get a noise canceling pickup assembled high noise canceling pickup consisting of an external main cylinder body 33 and external rear cylinder body 34 of the internal cylinder body of non-noise canceling sound sensor, whose front and rear sound inlets are of the same direction approximately or perpendicular approximately.

FIG. 15 shows the sectional view of a noise canceling pickup in this invention and FIGS. 15A and 15B are the top view and A—A line of FIG. 15.

From the comparison between FIG. 15 and FIG. 14, and FIGS. 14A and 11B we can see that their difference lies in: The internal main cylinder body of the upper electret sound sensor 29*a* and the internal main cylinder body of the lower electret sound sensor 30*a* of the main cylinder body of non-noise sound sensor are placed at side direction, inlet 4*b* is on the front cover and front wall 2*a* at the side of external main cylinder body 33 and sound gathering cover 19 is outside the inlet 4*b*, with opening facing the same direction. Based on design, internal main cylinder body support 31 or shockproof spacer 36 can be placed between upper electret sound sensor 29*a* and lower electret sound sensor 30*a*.

The pickup section and electric circuit section which are commonly-used today can also be placed into the non-noise canceling sound sensor in a main cylinder body to get a assembled high noise canceling pickup with internal barrel bodies placed one in front and the other behind, rather than the pickup consisting of main cylinder body and rear cylinder body as shown in the Figure.

FIG. 16 shows the sectional view of a noise canceling pickup in this invention and FIGS. 16A is the A—A line sectional view as shown in FIG. 16. From the comparison between FIG. 16 and FIG. 15, and FIGS. 15A and 15B we can see that their difference lies in: The internal main cylinder body of the upper electret sound sensor 29*a* of the main cylinder body of non-noise sound sensor is placed facing the front, inlet 4 is on the front cover and front wall 2 facing the front and sound gathering cover 19 is outside the inlet 4*a* on the side wall of external main cylinder body 33 corresponding to the inlet 4 of lower electret sound sensor 30, with the openings of upper electret sound sensor 29*a* and upper electret sound sensor 30*a* facing the same direction. Based on design, internal main cylinder body support 31 can be placed between upper electret sound sensor 29*a* and lower electret sound sensor 30*a*. The pickup section and electric circuit section which are commonly-used today can also be placed into the non-noise canceling sound sensor (the sound sensor as shown in FIG. 18) in a main cylinder body to get a assembled high noise canceling pickup with internal barrel bodies placed one in front and the other behind, rather than the pickup consisting of main cylinder body and rear cylinder body as shown in the Figure.

FIG. 17 shows the sectional view of a noise canceling pickup in this invention and FIG. 17A is the A—A line sectional view as shown in FIG. 17. From the comparison between FIG. 17 and FIG. 15, and FIGS. 15A and 15B and FIG. 16 we can see that their difference lies in: The internal main cylinder body of the lower electret sound sensor 30*a* of the main cylinder body of non-noise sound sensor is placed facing the front, inlet 4 is on the front cover and front wall 2 facing the front and sound gathering cover 19 is outside the inlet 4*a* on the side wall of corresponding external main cylinder body 33. Rear sound wave guiding module 7*a* is placed in front of the inlet 4 of the lower electret sound sensor 30 in external main cylinder body 33 and rear sound channel 27*a* of the rear sound wave guiding module 7*a* is available between inlet 4*a* and inlet 4. The openings of the sound gathering covers 19 of upper electret sound sensor 29 and lower electret sound sensor 30 face the same direction. Based on design, internal main cylinder body support 31 can be placed between upper electret sound sensor 29*a* and lower electret sound sensor 30*a*.

The pickup section and electric circuit section which are commonly-used today can also be placed into the non-noise canceling sound sensor (the sound sensor as shown in FIG. 18) in a main cylinder body to get a assembled high noise canceling pickup with internal barrel bodies placed one in front and the other behind, rather than the pickup consisting of main cylinder body and rear cylinder body as shown in the Figure. Likewise, the upper electret sound sensor 29*a* and lower electret sound sensor 30*a* can also be reversed to get a new application.

FIG. 18 shows the sectional view of a noise canceling pickup in this invention and FIGS. 17 and 18B are the A—A line and B—B line sectional views as shown in FIG. 18. From the comparison between FIG. 18 and FIG. 14, and FIGS. 14A to 14C and FIG. 11 and FIGS. 11A to 11C we can see that their difference lies in: In the sound sensor used, the back electrode electrodes 15*a* in the internal main cylinder body of upper electret sound sensor 29 and that of lower electret sound sensor 30 do not enter the back electrode pass hole 28 on back electrode seat 14 to enter internal rear cylinder body along the side of internal cylinder body, rather they directly enter the rear of pickup to connect with impedance conversion electric circuit 21. Printed electric circuit board 23 is also Internal cylinder body 1 to form front sound sensor 31*a* and rear sound sensor 32*a*. This in fact means the use of noise canceling sound sensor assembled high noise canceling pickup whose front and rear sound inlets face approximately the same direction or perpendicular to each other approximately made of various commonly-used non-noise canceling electret sound sensors.

FIG. 19 shows the sectional view of a noise canceling pickup in this invention and FIGS. 19A to 19C are the A—A line, B—B line and C—C line sectional views as shown in FIG. 19. From the comparison between FIG. 19 and FIG. 1 and FIGS. 1A to 1C we can see that their difference lies in: Division plate 9 is placed inside the internal edge of diaphragm binding ring. Division plate spacer 10 is placed between vibration diaphragm 12 and division plate 9. In this way, there will be a cavity between vibration diaphragm 12, division plate 9 and division plate spacer 10 placed in between. Division plate spacer 10 can also be place at other places based on design, so long as it can separate vibration diaphragm 12 and division plate 9 at a certain distance. The distance between vibration diaphragm 12 and division plate 9 will be decided by the thickness of division plate spacer 10. Accordingly, the internal edge of back electrode spacer 13 can also be extended inwardly to a place corresponding to the internal edge of division plate spacer 10.

The extruding part of sound wave guiding module 7*b*, the extruding part of front spacer 8*a*, extruding part of diaphragm binding ring 11*a*, extruding part of back electrode seat 14*a* and extruding part of back electrode 15*a* can be used as marks for positioning, so that the components of the front and rear acoustic channels of the vibration diaphragm can be installed corresponding to each other based on design. Other marks serving as positioning reference can also be used. Positioning mark for a component can be decided based on needs. The conducting contact between the diaphragm binding ring and the casing of the cylinder body of a sound sensor can also be moved from front cylinder body to the shell of rear cylinder body. The connection with the shell can be hard connection through conductive piece or elastic connection through an elastic conductor such as conductive spring lamination 26. This makes the acoustic structures between the front and rear sound inlets at the sides of vibration diaphragm in noise canceling sound sensor roughly the same and symmetrical.

FIG. 20 shows the sectional view of a noise canceling pickup in this invention and FIGS. 20A to 20C are the A—A line, B—B line and C—C line sectional views as shown in FIG. 20. From the comparison between FIG. 20 and FIG. 1, and FIGS. 1A to 1C we can see the differences.

FIG. 21 shows the sectional view of a noise canceling pickup in this invention and FIGS. 21A to 21C are the A—A line, B—B line and C—C line sectional views as shown in FIG. 21. From the comparison between FIG. 21 and FIG. 1, and FIGS. 1A to 1C we can see that their difference lies in: From the comparison between FIGS. 21 and 20 and FIGS. 20A and 20C we can see that: Front and rear sound inlets are not on the side wall of internal cylinder body side wall 1, rather they are on front cover 2 and rear cover 3. In this way, there is no need to use the front and rear sound wave guiding modules 7 and 7*a* and the front and rear sound channels 27 and 27*a* in 7 and 7*a*. This application can also be used as the modified type for actual production of various noise canceling pickups in this inventor's patents and patent applications mentioned above.

FIG. 22 shows the sectional view of a noise canceling pickup in this invention and FIGS. 22A to 22C are the A—A line, B—B line and C—C line sectional views as shown in FIG. 22. From the comparison between FIG. 22 and FIG. 21, and FIGS. 21A to 22C we can see that their difference lies in:

The structure of embodiment 21 is placed in external cylinder body 33 and external rear cylinder body 34. The various noise canceling sound sensors and various noise canceling sound sensors in this inventor's patents and patent applications mentioned above can also be placed in external cylinder body 33 and external rear cylinder body 34 to get the noise canceling pickup of this invention.

FIG. 23 shows the sectional view of a noise canceling pickup in this invention and FIGS. 23A to 23C are the A—A line, B—B line and C—C line sectional views as shown in FIG. 23. From the comparison between FIG. 23 and FIG. 19, and FIGS. 19A to 19C we can see that their difference lies in: This is mainly a modified version of various embodiments of this invention for large scale production. This application can also be used as a modified type for the production of the various noise canceling pickups in this inventor's patents and patent applications.

FIG. 24*a* shows the circuit diagram of the sound signal control switch of a noise canceling pickup in this invention.

A sound controlled switch electric circuit as shown in FIG. 24*a* is arranged between capacitor C10 and NOT gate U4, analog switches U6 and U5. The low deformation and low noise sound signals outputted from a common mode signal inhibition electric circuit pass through C10 and the detecting circuit having diodes D1 and D2, and the sound controlled switch electric circuit which comprises triode T2, capacitors C15, C16 and C17, resistances R14, R15 and R16, NOT gates U8, U13, U11 and U12, analog switch U10 and R-J trigger U9 to control the control end 13 of U5 so that it opens. Sound signals inputted from input end 1 are outputted from output end 2 and then pass through NOT gate U4 which is reversed to control the control end 13 of analog switch U6 so that it closes. Sound signals inputted from input end 1 cannot be outputted from output end 2. In U5 and U6, one is open and another is closed. On the contrary, when there are no input of sound signals sent out by main sound source, opening and close are reversed. U5 and U6 opening and closing time can be decided by capacitor C17 and R16 after a speech is finished (say 10 s) to avoid error opening and closing due to short interruptions during a speech. In this electric circuit, all electric circuits can use integrated circuits or discrete electric component circuits. Analog switch electric circuit, digital logic switch electric circuit and other types of electric circuits which can carry out the functions of the electric circuit can also be used based on needs.

FIG. 24*b* shows the circuit diagram of the sound signal control switch of a noise canceling pickup in this invention.

A sound controlled switch electric circuit as shown in FIG. 24*b* is provided between capacitor C10 and U4, U6 and U5. Its theory is the same as that of the embodiment shown in FIG. 24*a*, only that the sound controlled electric circuit for controlling analog switch adopts comparator electric circuit. We now make a description of the comparator electric circuit: The low deformation and low noise sound signals outputted from a common mode signal inhibition electric circuit pass through C10 and the detecting circuit having diodes D1 and D2, and the sound controlled switch electric circuit which comprises resistances R17, R18, R19 and R20, voltage-regulator diode D3, diode D4, capacitors C15 and C18, arbitrary electrical level comparator U14 and R-J trigger U15, and control the control end 13 of analog switch U5 so that it opens. Sound signals inputted from input end 1 are outputted from output end 2 and then pass through NOT gate U4 which is reversed to control the control end 13 of analog switch U6 so that it closes. Sound signals inputted from input end 1 cannot be outputted from output end 2. In U5 and U6, one is open and another is closed. On the contrary, when there are no input of sound signals sent out by main sound source, opening and close are reversed. U5 and U6 opening and closing time can be decided by capacitor C18 and R22 after a speech is finished (say 10 s) to avoid error opening and closing of U5 and U6 due to short interruptions during a speech. FIG. 24*c* shows the circuit diagram of the sound signal control switch of a noise canceling pickup in this invention.

And a sound signal controlled switch electric circuit as shown in FIG. 24*c* is provided between the above capacitor C10 and C12 and U4, U6 and U5. Its theory is the same as that of the embodiment shown in FIG. 24*a*, only that the sound controlled electric circuit for controlling analog switch uses the sound signals which have not been treated for reduction of environmental noises received by sound sensor and compares with the sound signals with low environmental noises outputted from common mode signal inhibition electric circuit before controlling sound controlled switch electric circuit. Its theory is the same as that of embodiment 13*b*, only that it adopts lagging comparator. The low deformation and low noise sound signals outputted from common mode signal inhibition electric circuit pass through C10 and the detecting circuit comprising diodes D1, D2 and resistance R13 and the sound signals from one of the two sound sensors which have not been treated for reduction of environmental noises pass through capacitor C12 and the detecting electric circuit comprising diodes D5 and D6 and resistance R23 and sound controlled switch electric circuit comprising resistances R24, R26, R26 and R22, diode D4, capacitors C15, C19 and C18, lagging comparator U16 and R-J trigger U15 to control the control end 13 of analog switch U5 so that it opens. Sound signals inputted from input end 1 are outputted from output end 2 and then pass through NOT gate U4 which is reversed to control the control end 13 of analog switch U6 so that it closes. Sound signals inputted from input end 1 cannot be outputted from output end 2. In U5 and U6, one is open and another is closed. On the contrary, when there are no input of sound signals sent out by main sound source, opening and close are reversed. U5 and U6 opening and closing time can be decided by capacitor C18 and R22 after a speech is finished (say 10 s) to avoid error opening and closing of U5 and U6 due to short interruptions during a speech.

The electric circuits in the signal controlled switch electric circuit used in 24*a* to 24*c* can use either integrated electric circuits or discrete component electric circuits and use different comparator electric circuits and trigger electric circuits. Analog electric circuits, digital electric circuits, operational procedures needed or analog digital composite electric circuits can be used based on needs, as well as various electric circuits which can carry out the functions of the entire electric circuit.

FIG. 25 shows the electric circuit of a noise canceling pickup for giving off alarms when receiving distance is exceeded.

When the distance between the noise canceling pickup of this invention and main sound source exceeds a certain range, signals will be greatly attenuated, which may affect effective reception. To remind users that the distance between the noise canceling pickup and the main sound source exceeds applicable range, this invention designs an electric circuit of a noise canceling pickup for giving off alarms when receiving distance is exceeded.

When the distance between a noise canceling pickup and a main sound source exceeds an applicable range, the sound wave signals received by noise canceling sound sensor (different mode signal) will be greatly attenuated and the power of received sound wave signals will be too low.

This electric circuit is a window comparator electric circuit. If the voltage of the sound wave signals (single loop different mode signals) received by input single loop noise canceling sound sensor is between two designated voltages (Upper limit is the lower limit of designed distance range and lower limit is the upper limit when distance exceeds designed distance by a certain range), then electric circuit has output (0V in this example). If output is positive outside this window, two comparators, namely, U17 and U18, can be used as window voltage comparator. If Vin is more positive than Vref (high side), U17 output will be positive and is forward bias. Otherwise, output is negative and U17 is negative bias, thus Vout is 0V. Likewise, if Vin is more negative than Vref (low side), U18 output will be positive and U18 is positive bias, then output is positive. Otherwise, Vout is 0V. If Vin is located in the window established by reference voltage, Vout will be 0V When window comparator detects that input voltage is between two designated voltages, it will give off starting signals to alarming electric circuit U19 and output alarming signal will remind users that the applicable range of the distance between noise canceling pickup and main sound source has been exceeded.

The single interval electric circuit in the middle of single interval window comparator electric circuits U117 and U18 can be changed into the window comparator electric circuit with multiple-interval electric circuits. Some of the intervals can adjust the amplification coefficient of amplifier based on the intensity of sound signals received to constitute an automatic gain control electric circuit using comparator electric circuit, and/or some other intervals can adjust alarming electric circuit (either single step alarming electric circuit or multiple-step one) based on reception distance. Other automatic gain control electric circuits and alarming electric circuits can also be used.

In this embodiment, comparator electric circuit can be MC14574 comparator or comparators of other models and types. And the comparator electric circuit can use window comparator, other types of comparator electric circuits or others having transistor, operational amplifier, comparator or digital electric circuit. It can use integrated electric circuit, discrete component electric circuit, various types of comparator electric circuit and trigger electric circuit. Analog electric circuits, digital electric circuits, operational procedures needed or analog digital composite electric circuits can be used based on needs, as well as various electric circuits which can carry out the functions of the entire electric circuit.

FIG. 26 shows the sectional view of a noise canceling pickup in this invention and FIGS. 26A to 26C are the A—A line, B—B line and C—C line sectional views as shown in FIG. 26.

From the comparison between FIG. 26 and FIG. 20, and FIGS. 20A to 20C and FIG. 14 and FIGS. 14A to 14C we can see that their difference lies in: The non-noise canceling sound sensor used is the same as the noise canceling sound sensor in FIG. 20 except that the later's division plate spacer 10, front washer 8, division plate 9, rear sound inlet 4*a*, rear sound wave guide 7*a* and rear sound channel 27*a* are removed. This in reality means that the sound inlet on the front cover front wall of non-noise canceling sound sensor is moved to the side wall of main cylinder body. Of course, this sound inlet 4 can also be on the side wall of main cylinder body and front cover front wall at the same time based on design requirements. In this case, there is no need to leave space for sound inlet 4*a* and corresponding inlet passages between the internal main cylinder body of the upper electret sound sensor 29*a* inside the external main cylinder body in FIG. 14 and the sound inlet 4 on the front cover and front wall 2 of the internal main cylinder body of lower electret sound sensor 30*a*. Based on design requirements, main cylinder body carriage 31 can connect and fix the main barrel bodies of various electret non-noise sound sensors (such as the main cylinder body of upper electret sound sensor 29 and the main cylinder body of lower electret sound sensor 30). In this figure, a noise canceling pickup consisting of these two non-noise sound sensors 29 and 30. One or more of these non-noise sound sensors can be used. The non-noise pickups used by the various noise canceling sound sensors in this invention can b replaced by non-noise sound sensor whose sound inlet is moved to the side wall of main cylinder body.

FIG. 27 shows the sectional view of a noise canceling pickup in this invention and FIGS. 22A to 22C are the A—A line, B—B line and C—C line sectional views as shown in FIG. 22.

From the comparison between FIG. 22 and FIG. 21, and FIGS. 21A to 21C we can see that their difference lies in: The non-noise canceling sound sensor used is the same as the non-noise canceling sound sensor in FIG. 26 only that the latter's sound wave guide 7 and sound channel 27 are taken out. In this figure, a noise canceling pickup consisting of these three non-noise sound sensors 29, 30 and 30*a*. One or more of these non-noise sound sensors can be used. When diaphragm binding ring and the casing of front cylinder body come into direct contact, conductive piece 26 can also not be used.

Figure 28A:
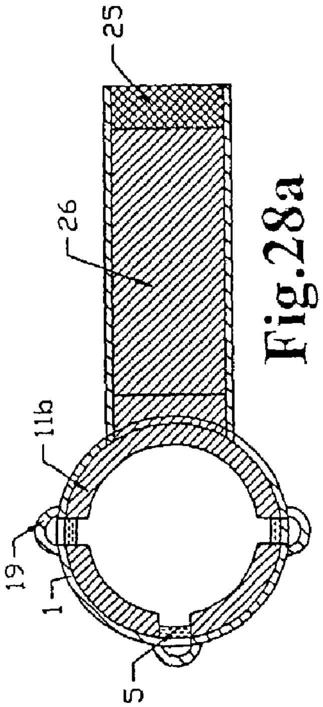
FIG. 28A–FIG. 28C are the cross section views in lines A—A, B—B and C—C as shown in FIG. 28 respectively.
Figure 28B:
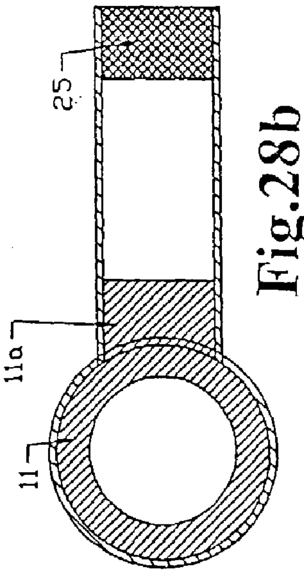
Figure 28C:
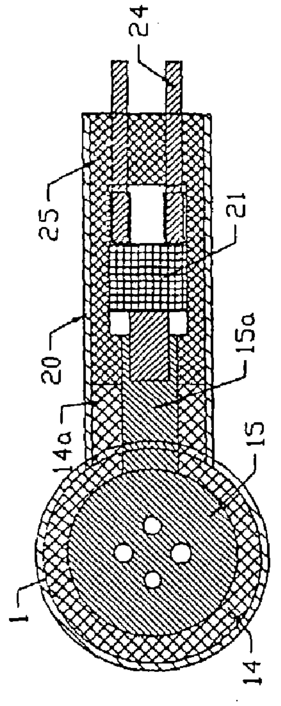
Figure 28:
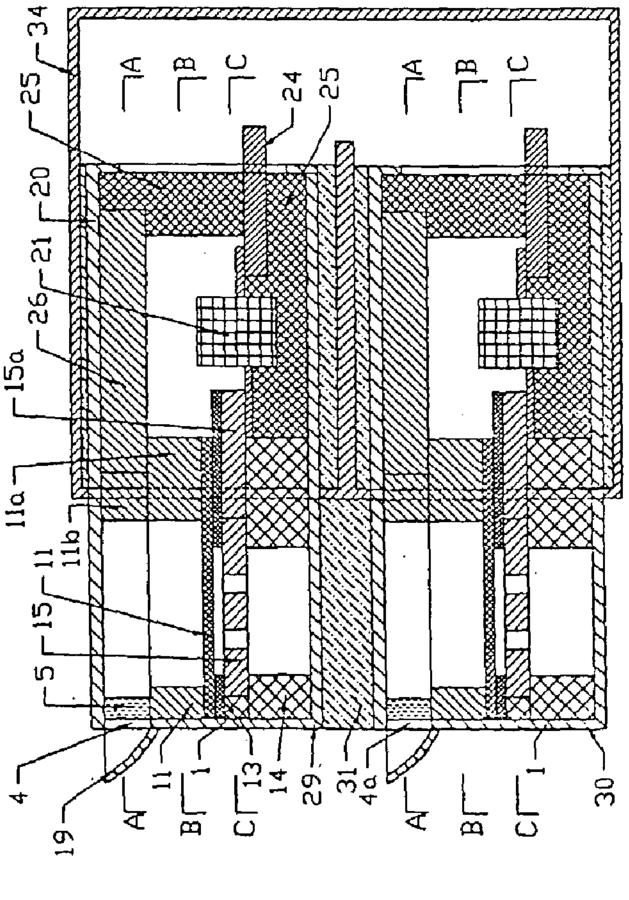
FIG. 28 is a cross section view of a noise-canceling pickup of present invention.

FIG. 28 shows the sectional view of a noise canceling pickup in this invention and FIGS. 28A to 28C are the A—A line, B—B line and C—C line sectional views as shown in FIG. 28.

From the comparison between FIG. 28 and FIG. 28, and FIGS. 26A to 26C we can see that their difference lies in: The several non-noise canceling sound sensors in this figure are noise canceling sound sensors with their rear cylinder body 20 being inserted into external rear cylinder body 34.

FIG. 28 shows the sectional view of a noise canceling pickup in this invention and FIGS. 28A to 28C are the A—A line, B—B line and C—C line sectional views as shown in FIG. 28.

Figure 29A:
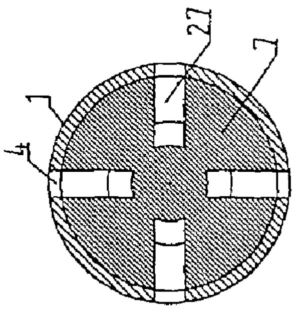
FIG. 29A and FIG. 29B are the cross section views in lines A—A and B—B as shown in FIG. 29 respectively.
Figure 29B:
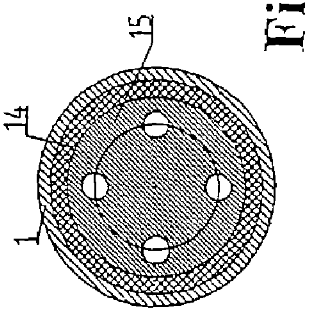
Figure 29:
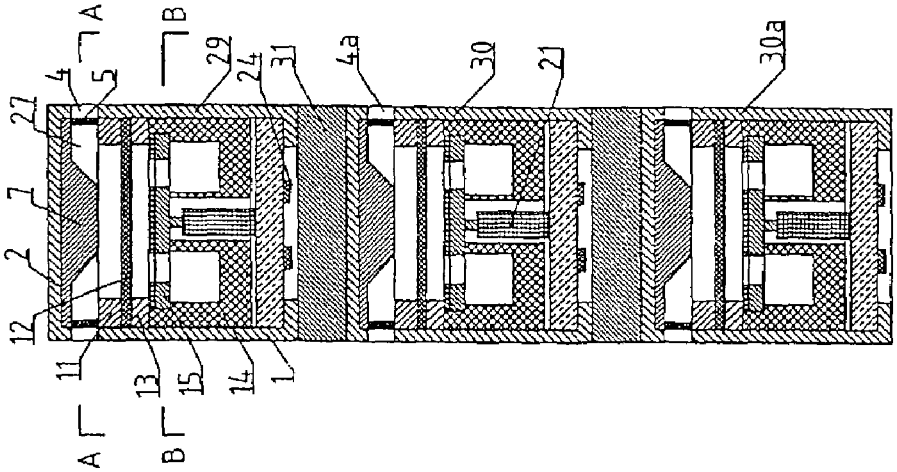
FIG. 29 is a cross section view of a noise-canceling pickup of present invention.

FIG. 29 shows the sectional view of a noise canceling pickup in this invention and FIGS. 29A to 29B are the A—A line and B—B line sectional views as shown in FIG. 29.

From the comparison between FIG. 29 and FIG. 26, and FIGS. 26A to 26C we can see that their difference lies in: And the front cover front wall 2 of the sound sensors inside non-noise canceling sound sensors faces the same direction. One or more of these non-noise sound sensors can be used.

Figure 30A:
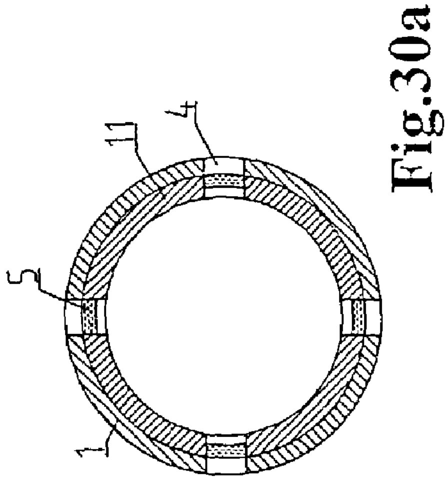
FIG. 30A and FIG. 30B are the cross section views in lines A—A and B—B as shown in FIG. 30 respectively.
Figure 30B:
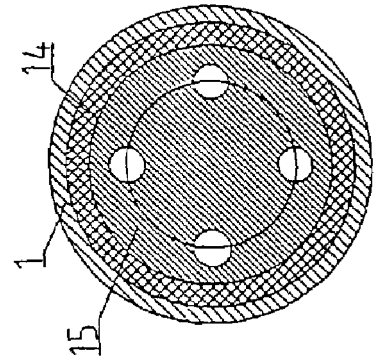
Figure 30:
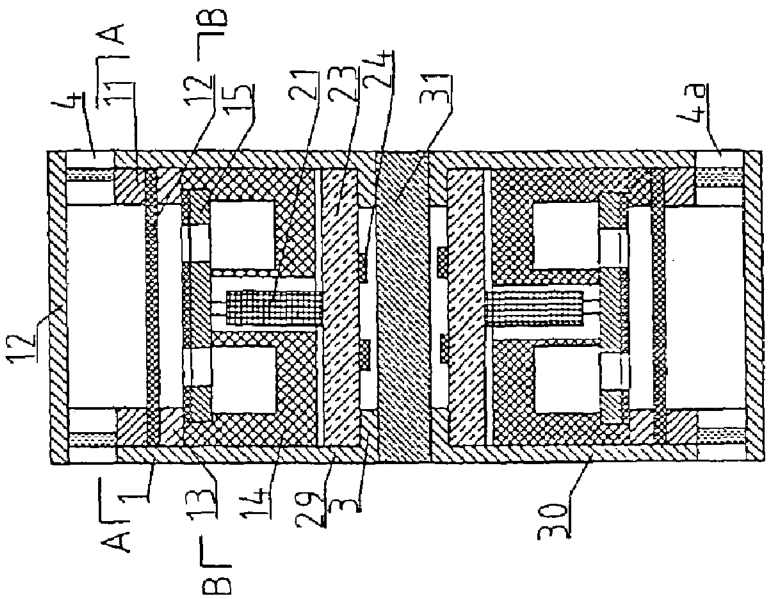
FIG. 30 is a cross section view of a noise-canceling pickup of present invention.

FIG. 30 shows the sectional view of a noise canceling pickup in this invention and FIGS. 30A to 30B are the A—A line and B—B line sectional views as shown in FIG. 30.

From the comparison between FIG. 30 and FIG. 29, and FIGS. 29A to 29B we can see that their difference lies in: The sound wave guide 7 and sound channel 27 inside the non-noise canceling sound sensors in this figure are taken out. And the front cover front wall 2 of the sound sensors inside the non-noise canceling sound sensors is placed backward. One or more of these non-noise sound sensors can be used.

Based on design requirements, the noise canceling sound sensors and non-noise canceling sound sensors in the applications of this invention can be used alone or connected and fixed with each other at a certain interval or space structure to form a two-dimensional or three-dimensional structure.

Figure 31:
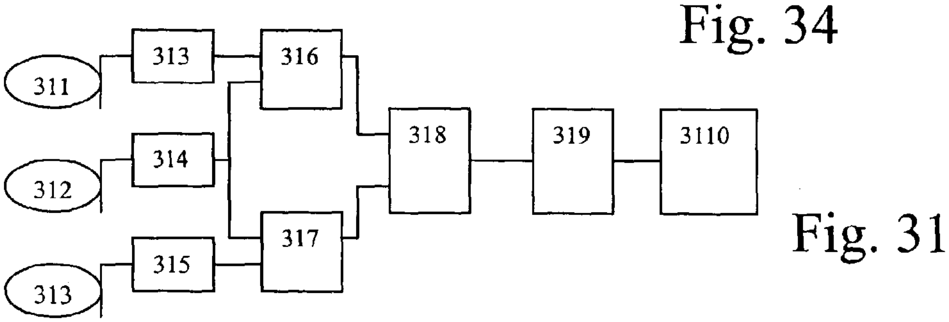
FIG. 31 is a circuit diagram illustrating an over-distance alarm circuit used in a noise canceling pickup according to the present invention.

FIG. 31 shows the electric circuit block diagram of a noise canceling pickup in this invention for giving off alarms when receiving distance is exceeded.

When the distance between the noise canceling pickup of this invention and main sound source exceeds a certain range, signals will be greatly attenuated, which may even affect effective reception. To remind users that the distance between noise canceling pickup and main sound source exceeds applicable range, this invention designs an electric circuit of a noise canceling pickup for giving off alarms when receiving distance is exceeded.

The sound wave difference mode signals received by noise sound sensors having a certain interval (or noise canceling sound sensors formed by the difference mode signals extracted by non-noise canceling sound sensors through common mode rejection electric circuit two by two) are used. A comparison can be made through such parameter as sound wave signal power between the loops of difference mode signals received by noise canceling sound sensors to get the approximate relative distance between microphone and main sound source. When distance is exceeded by a certain degree, electric circuit, such as trigger electric circuit, will give off alarms. Non-noise canceling sound sensors can also be used to directly measure the distance between sound sensor and main sound source to give off alarms. Analog electric circuit, digital electric circuit or analog and digital combined electric circuit can be used.

In this embodiment, non-noise canceling sound sensors are used for measuring distance and giving off alarms. Non-noise canceling sound sensors 311, 312 and 313 receive environmental noises from outside. The sound signal of 312 and eliminates common mode signals together with the electric signals of 311 and 313, through common mode rejection electric circuits 316 and 317 (This in reality means the formation of two loops of noise canceling sound sensors). Two or more loops of difference mode signals extracted (sound wave electric signals sent out by the near main sound source) are compared through window comparator electric circuit 318. Another loop is compared with reference standards. When the two are at a certain ratio (Lower limit of upper limit within designed distance and upper limit of lower limit when designed distance is exceeded by a certain degree), electric circuit has output to alarming electric circuit 319, which will give off alarms through alarming device 3110. In this application, three non-noise canceling sound sensors 311, 312 and 313 are used. Still more can be used. Non-noise canceling sound sensors and noise canceling sound sensors can also be used together.

Figure 32:
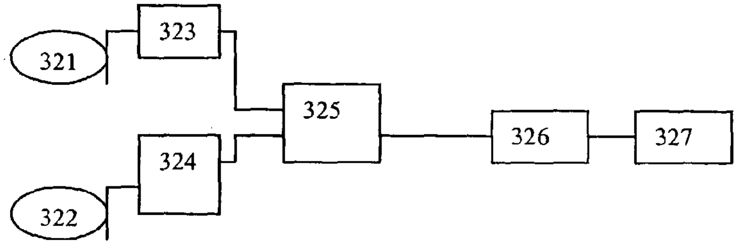
FIG. 32 is a circuit diagram illustrating an over-distance alarm circuit used in a noise canceling pickup according to the present invention.

FIG. 32 shows the electric circuit block diagram of a noise canceling pickup in this invention for giving off alarms when receiving distance is exceeded.

It is based on the following theory, namely, comparison of the ratio between the multi-loop difference mode signals received by noise canceling sound sensors to calculate the approximate distance between pickup and main sound source and when their distance exceeds an appropriate range, alarms will be given off. Analog electric circuit, digital electric circuit or the combination of the two can be used. Noise canceling sound sensors 321 and 322 receive the sound wave electric signals sent out by the near main sound source and make a comparison through window comparator electric circuit 325 together with the electric signals of pre-processing electric circuits 323 and 324, such as vibration compensation electric circuit. Another loop is compared with reference standards. When the two are at a certain ratio (Lower limit of upper limit within designed distance and upper limit of lower limit when designed distance is exceeded by a certain degree), electric circuit has signal output, to actuate alarming electric circuit 326, which will then give off alarms through alarming device 327. In this application, two noise canceling sound sensors 321 and 322 are used. Still more can be used. Besides, non-noise canceling sound sensors and noise canceling sound sensors can also be used together to form an automatic gain control electric circuit using comparator electric circuit and (or) alarming electric circuit (single step alarming electric circuit or multiple step alarming electric circuit), some of whose intervals can be adjusted based on receiving distance. Other comparator electric circuits can also be used.

In this application, comparator electric circuit can be MC14574 comparator or comparators of other models and types. And the comparator electric circuit can use window comparator, other types of comparator electric circuits or others consisting of transistor, operational amplifier, comparator or digital electric circuit. It can use integrated electric circuit, discrete component electric circuit, various types of comparator electric circuit and trigger electric circuit. Analog electric circuits, digital electric circuits, operational procedures needed or analog digital composite electric circuits can be used based on needs, as well as various electric circuits which can carry out the functions of the entire electric circuit.

Figure 33A:
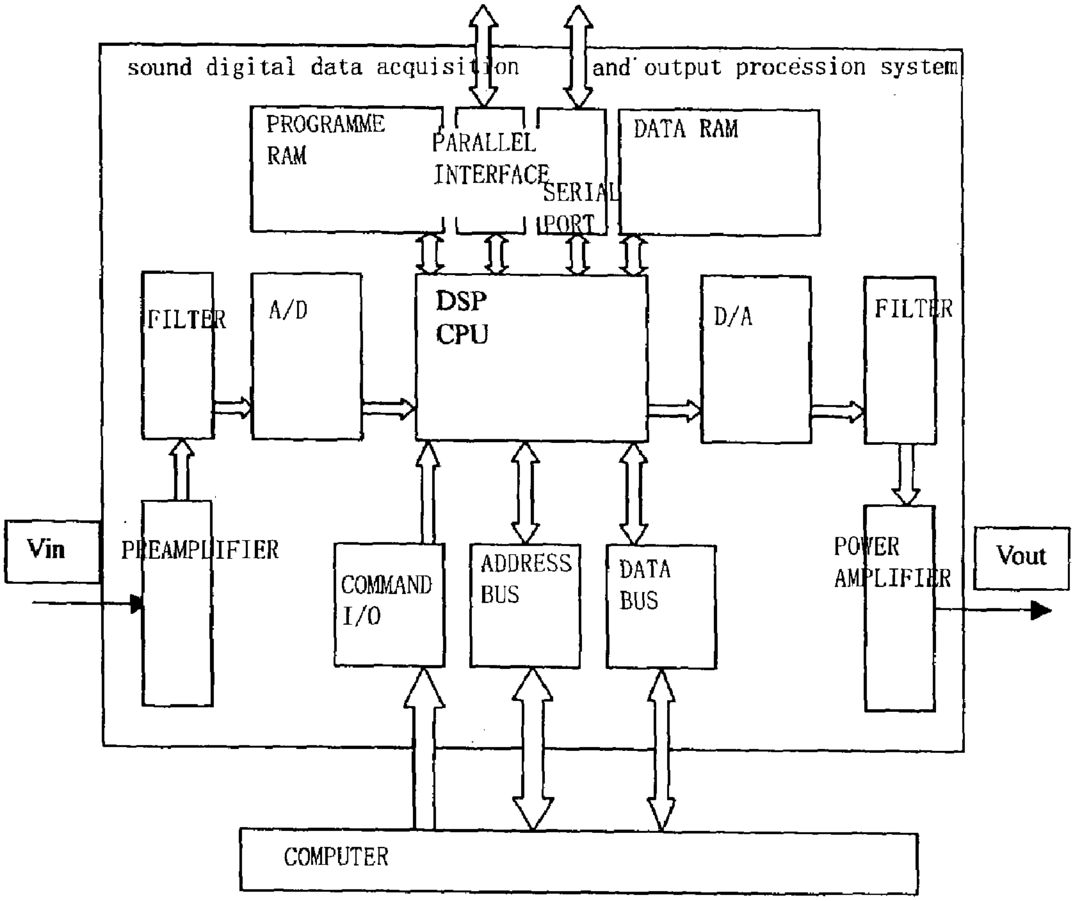
FIG. 33*a* is a digital data acquisition common mode rejection system block diagram.
Figure 33B:
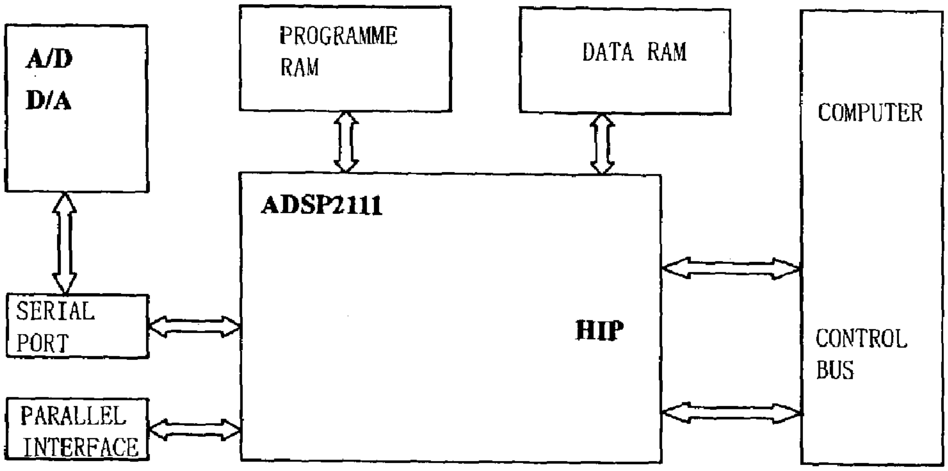
FIG. 33*b* is a digital data acquisition common mode rejection system block diagram.

FIGS. 33*a* and 33*b* are the electric circuit block diagram of a digital data collection common mode rejection system:

Details on FIGS. 33*a* and 33*b* have been fully disclosed in this inventor's patent and patent application documents as mentioned above. They won't be detailed here again.

Figure 34:
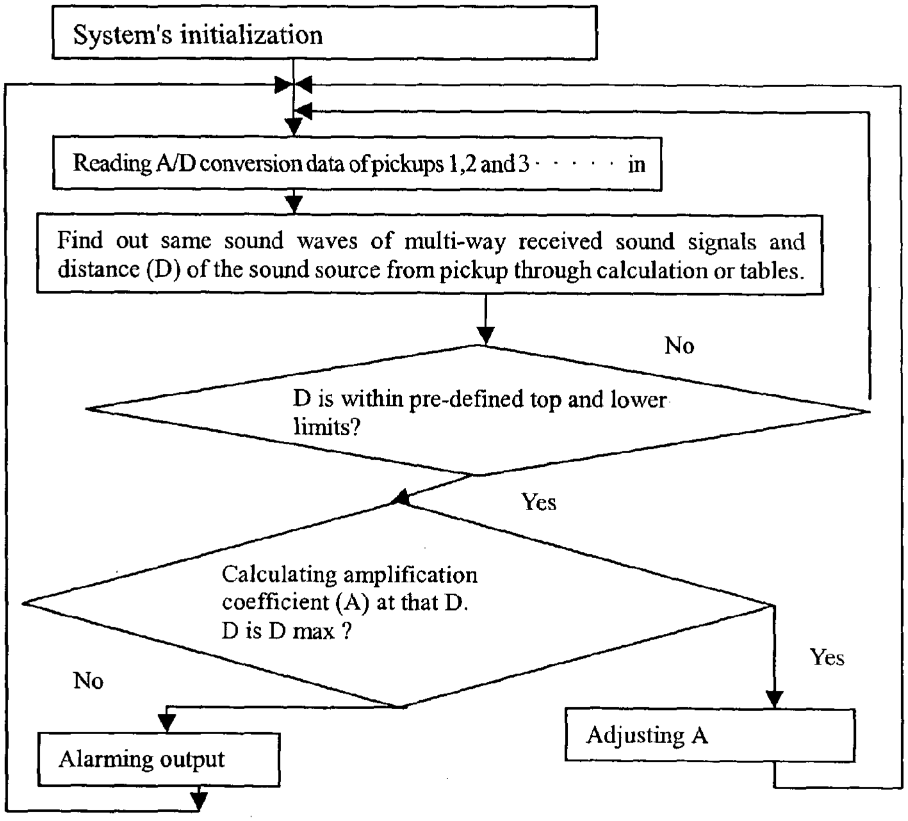
FIG. 34 is a computer flow chart of a noise-canceling pickup on over receiving distance used in the pick up of present invention.

FIG. 34 shows the computer flow chart of a noise canceling pickup used in the pickup of this invention for giving off alarms when receiving distance is exceeded and adjusting the amplification coefficient of amplifier based on receiving distance.

It is based on the following theory, namely, Comparison of the ratio between the sound difference mode signals received by two noise canceling sound sensors to determine whether the distance between pickup and main sound source exceeds the appropriate receiving range of noise canceling pickup. If it is exceeded, alarms will be given off.

When noise canceling sound sensors are used to convert the sound signals received by noise canceling sound sensors 1, 2 . . . through A/D, the same sound wave electric signals in the sound signals received by noise canceling sound sensors 1, 2 . . . are extracted through filter electric circuit. The distance between main sound source and pickup and (or) their location are calculated by means of calculating the power of two loops of sound wave signals which are the same and (or) such parameters as time difference and (or) consultation of tables, which will be compared with the set effective receiving distance of pickup to decide whether the distance between main sound source and microphone is within set upper and lower limits. When it is within set upper and lower limits, the amplification coefficient of amplifier at the distance should be calculated to see whether the amplifier is at the max. amplification capability. If yes, the amplification coefficient of the amplifier should be adjusted. When it is beyond the max. amplification capability of the amplifier, alarms will be actuated and sent out from D/A. When the distance between the main sound source and microphone is outside the upper and lower limits of the set distance, nothing will be done further.

Of course, the computer program flows of other noise canceling pickups for giving off alarms when receiving distance is exceeded and adjusting the amplification coefficient of amplifier based on receiving distance.

Figure 35:
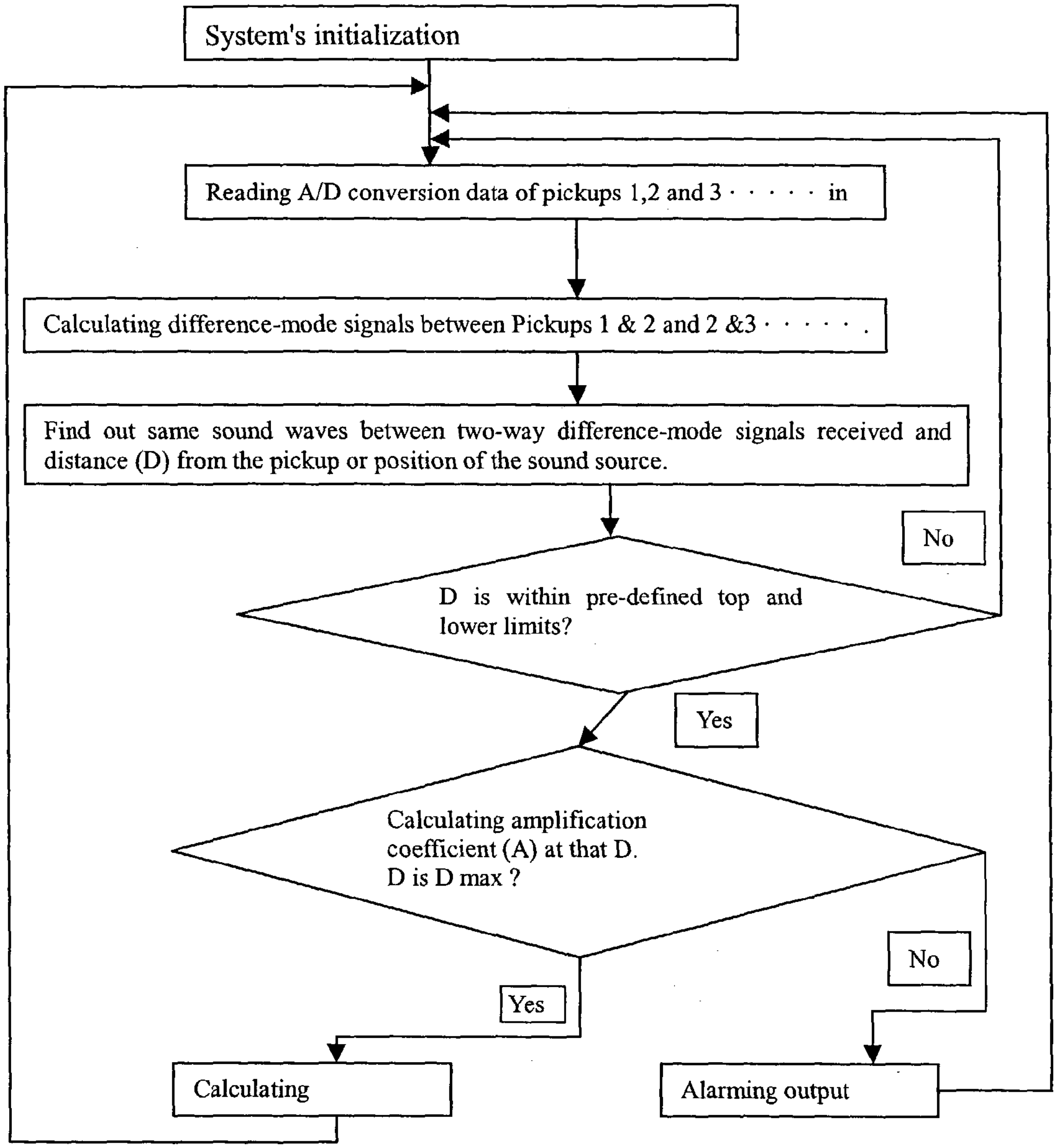
FIG. 35 is a computer flow chart of a noise-canceling pickup on over receiving distance, which is made from a non-anti-noise sound sensor, used in the pickup of present invention.

FIG. 35 shows the computer flow chart of a noise canceling pickup among the pickups of this invention which uses non-noise canceling sound sensor for giving off alarms when receiving distance is exceeded.

When non-noise canceling sound sensors, such as three non-noise canceling sound sensors, are used to convert the sound signals received by non-noise canceling sound sensors 1, 2 and 3 through A/D to calculate the difference mode signals between sound sensors two by two. A comparison can be made among loops of difference mode signals based on the calculation to roughly calculate the approximate distance between main sound source and pickup, or the same sound wave electric signals in the sound signals in two loops of sound sensors can be extracted through filter electric circuit or the same sound wave electric signals in the sound signals directly picked up by pickups through filter electric circuit. The accurate distance between main sound source and pickup and (or) their location are calculated by means of calculating the power of two loops of sound wave signals which are the same picked up by sound sensors and (or) such parameters as difference in the time of reaching two sound sensors and (or) consultation of tables, which will be compared with the set effective receiving distance of pickup to decide whether the distance between main sound source and microphone is within set upper and lower limits. When it is within set upper and lower limits, the amplification coefficient of amplifier at the distance should be calculated to see whether the amplifier is at the max. amplification capability. If yes, the amplification coefficient of the amplifier should be adjusted. When it is beyond the max. amplification capability of the amplifier, alarms will be actuated and sent out from D/A. When the distance between the main sound source and microphone is outside the upper and lower limits of the set distance, nothing will be done further.

Of course, the computer program flows of other noise canceling pickups for giving off alarms when receiving distance is exceeded and adjusting the amplification coefficient of amplifier based on receiving distance.

Figure 36:
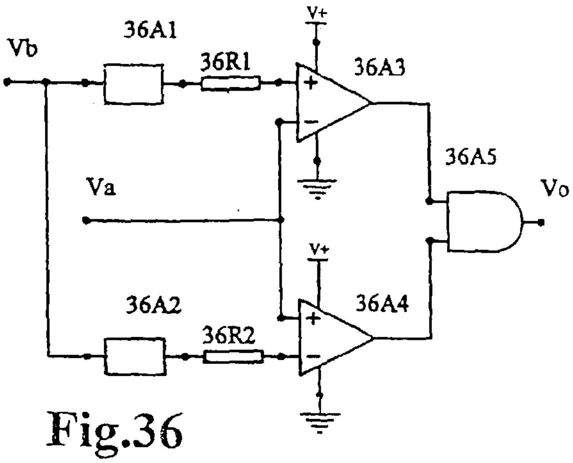
FIG. 36 is an electric circuit of a noise-canceling pickup on over receiving distance used in the pickup of present invention.

FIG. 36 shows the electric circuit of a noise canceling pickup among the pickups of this invention for giving off alarms when receiving distance is exceeded.

It is based on the following theory, namely, the ratio between the sound difference mode signals received by two loops of noise canceling sound sensors is compared to roughly determine whether the distance between pickup and main sound source exceeds the appropriate receiving range of noise canceling pickup.

This electric circuit is in reality a window comparator electric circuit with gating function. The sound source sound difference mode electric signals received by two loops of noise canceling sound sensors can be pretreated by pretreatment electric circuit through filtering, time delay, etc., based on design requirements. Pretreatment electric circuit can also not be used. The sound source sound difference mode electric signals received by two loops of noise canceling sound sensors pass through the sound difference mode electric signals Va and Vb. Assume the main sound source sound electric signal received by the noise canceling sound sensor next to main sound source is Va and the main sound source sound electric signal received by the noise canceling sound sensor far away from main sound source is Vb, Va or Vb can be deemed as reference. Let's assume that Vb is the reference. If the ratio between Va and Vb is within designated ratio M and N (M is the ratio of upper limit when designed distance is exceeded by a certain degree and N the ratio of lower limit within designed distance), then the electric circuit sends out signals to actuate the alarming electric circuit to amplify Vb signal by M and N times (M and N can either be positive or negative or integer or non-integer with decimal.) through amplification electric circuits 36A1 and 36A2. Vb enters one of the input poles of operational amplifiers 36A3 and 36A4 respectively and Va enters the other input pole of operational amplifiers 36A3 and 36A4 respectively to make a comparison. When Va is higher than Vb by M time, the output of 36A3 is positive and that of 36A4 is negative. The output of AND gate 36A5 Vo=0. When Va is lower than Vb by N time, the output of 36A3 is negative and that of 36A4 is positive. The output of AND gate 36A5 Vo=0. When N time of Vb is lower than Va which is higher than M time of Vb, the output of 36A3 and 36A4 is negative. The output of AND gate 36A5 Vo=1.

Figure 37:
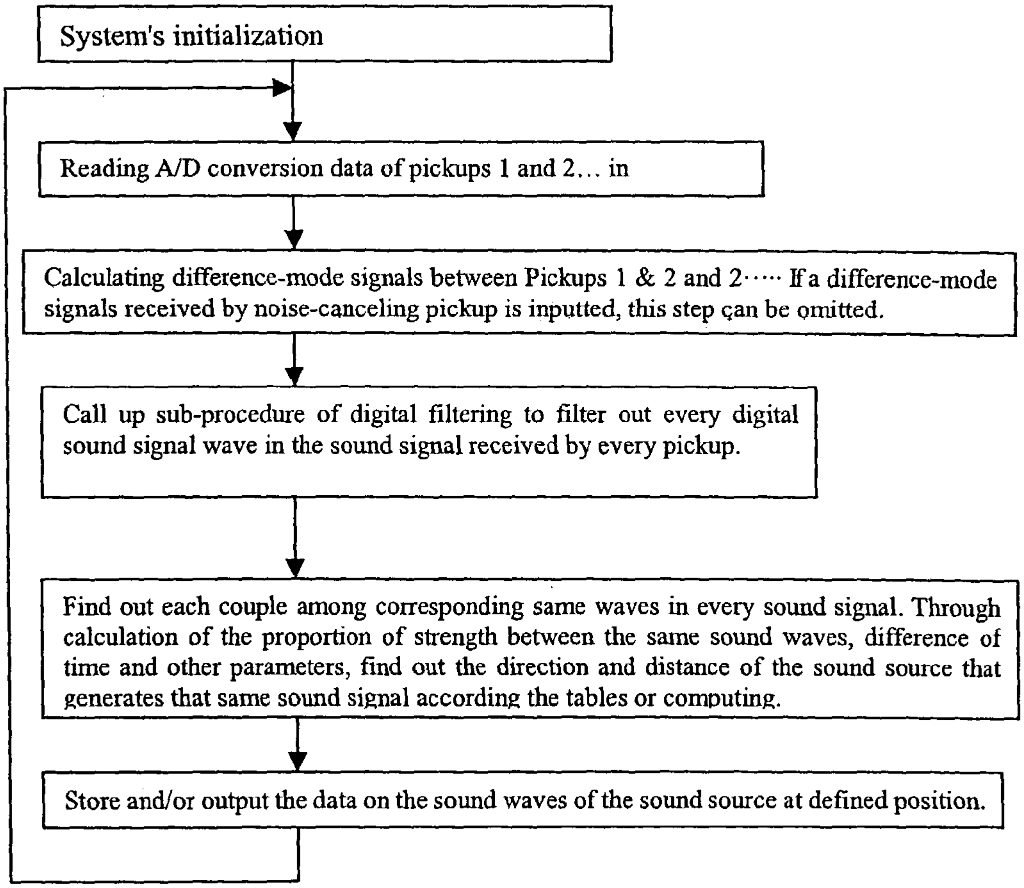
FIG. 37 is a computer flow chart for digital noise-canceling used in a pickup, which receives a voice at fixed distance or at a fixed point, according to the present invention.

FIG. 37 shows the process flow of a computer used in the pickups of this invention for digital elimination noise deciding distance or location.

We now make a description of the process flow of noise canceling sound sensor or non-noise canceling sound sensor for positional reception in this invention which uses many two-dimensional structures which are arranged in front and in rear, three-dimensional structures with a certain stereoscopic structure or a three-dimensional array structure with a certain space array arrangement: When the sound difference mode signals sent out by the receiving sound source of non-noise canceling sound sensors are used, difference mode signals between the sound wave electric signals received by sound sensors two by two can be extracted through digital common mode rejection or directly treated further without common mode rejection. Or noise canceling sound sensors can be used directly to receive the difference mode signals of the sound signals sent out by main sound source and filter each sound wave of the sound signals and (or) difference mode signals received by one of the sound sensors through digital filter. Then, a comparison is made of the sound power of each sound wave with the same wave form in the sound signals received by sound sensors to calculate such parameters as the ratio and (or) receiving time between the sound wave electric signals with the same wave form. Based on the distance and (or) location between sound sensors and the ratio between the sound signals sent out by main sound source whose distance is actually measured or calculated, we can know the actual distance and (or) location of the main sound source and pickup which have sent out this sound wave. We can also employ other calculation and treatment methods to get the actual distance and (or) location of the main sound source and pickup.

Figure 38:
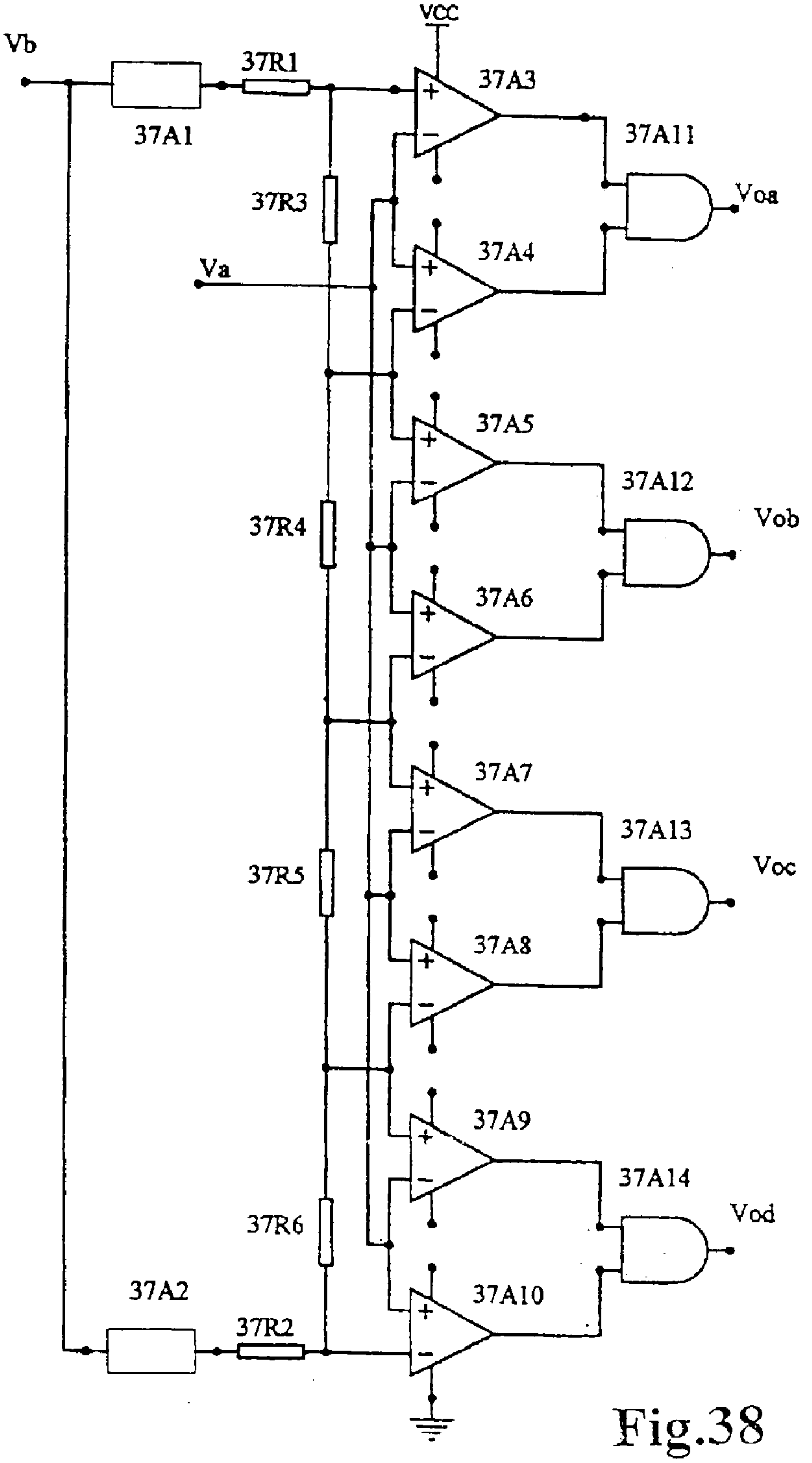
FIG. 38 is a window comparison circuit of multiple sections used in the pickup of present invention, which can regulate the amplifying ratio of amplification circuit according to receiving distance.

FIG. 38 shows the window comparator electric circuit with intervals of one of the noise canceling pickups in this invention which adjusts the amplification coefficient of amplifier based on the ratio between loops of difference mode signals.

A comparison between FIG. 38 and FIG. 36 shows that their difference lies in: Comparator with one interval is adopted in FIG. 36. This allows amplifier to adjust the amplification coefficient or attenuation coefficient of amplifier based on the ratio between difference mode signals (The approximate distance between pickup and sound source can be obtained based on the ratio between difference mode signals) and different amplification coefficients can be used based on the ratio between difference mode signals (adjustment of either amplification coefficient or attenuation coefficient) to realize automatic gain control electric circuit.

It is based on the following theory, namely, calculate the approximate distance between pickup and main sound source based on the ratio between the difference mode signals received by noise canceling sound sensors to find out the appropriate amplification coefficient of the amplifier at this approximate distance. The sound wave difference mode signals received by noise canceling sound sensors (Noise canceling sound sensors can also be used from non-noise canceling sound sensors which, two by two, extracts difference mode signals through common mode rejection electric circuit.) with a certain interval can be used, comparison can be made of the loops of difference mode signals received by noise canceling sound sensors through such parameter as sound wave signal power to get the relative distance between microphone and main sound source.

This electric circuit is in reality a window comparator electric circuit with gating function. Sound difference mode electric signals Va and Vb are sent out by the sound source received by two noise canceling sound sensors. Assume the main sound source sound electric signal received by the noise canceling sound sensor next to sound source is Va and the main sound source sound electric signal received by the noise canceling sound sensor far away from main sound source is Vb, Va or Vb can be deemed as reference. Let's assume that Vb is the reference. If the ratio between Va and Vb is within designated ratio M and N (M is the ratio of upper limit when designed distance is exceeded by a certain degree and N the ratio of lower limit within designed distance), Vb signal can be amplified by M and N times (M and N can either be positive or negative or integer or non-integer with decimal.) through amplification electric circuits 36A1 and 36A2. In this way, Vb signal can from one voltage sector between M and N after being amplified by M and N times by amplification electric circuits 36A1 and 36A2. Assume the voltage sector is Vb1 and the comparator electric circuit with gating function and intervals has four intervals and assume 37R3=37R4=37R5=37R6, then when Va is at ¾ Vb1 to Vb1, then Voa is high electric level output; when Va is at ½ Vb1 to ¾ Vb1, then Vob is high electric level output; when Va is at ¼ Vb1 to ½ Vb1, then Voc is high electric level output and when Va is at 0 Vb1 to ¼ Vb1, then Vod is high electric level output. Based on design requirements, Voa, Vob, Voc and Vod high electric level output can be guided by actuating the switch of the amplification coefficient of one stage or multiple stage analog or digital amplifier. Several alarming electric circuits can also be actuated or the switch of the different amplification coefficients of amplifier can be actuated and one or more alarming electric circuits can be actuated at the same time.

The window comparator electric circuit of a noise canceling pickup in this invention is used. Some intervals can adjust the amplification coefficient and (or) attenuation coefficient based on receiving distance and (or) other intervals can adjust alarming electric circuit based on receiving distance (one stage or multiple stage alarming electric circuit).

Number of gating sectors and intervals and the window voltage of the sectors and intervals of window comparator electric circuit with gating function and sectors and intervals can be decided based on design requirements.

In the electric circuits of the applications in present invention, comparator electric circuit can use MC14574 comparator or other comparactors and comparator electric circuits. AND gate electric circuit can use CD4081. The comparator electric circuit and AND gate electric circuit can also use other comparactor electric circuit, AND gate electric circuit and NAND gate electric circuit. They can also use other comparactor electric circuit, AND gate electric circuit and NAND gate electric circuit consisting of transistor, operational amplifier, comparator or digital electric circuit, etc. They can use integrated electric circuit, discrete component electric circuit, comparator electric circuit, AND gate electric circuit, NAND gate electric circuit or trigger electric circuit, etc. Different analog electric circuits, digital electric circuits or combination of them can be used subject to needs, as well as electric circuits which can carry out the functions of the electric circuit.

Figure 39:
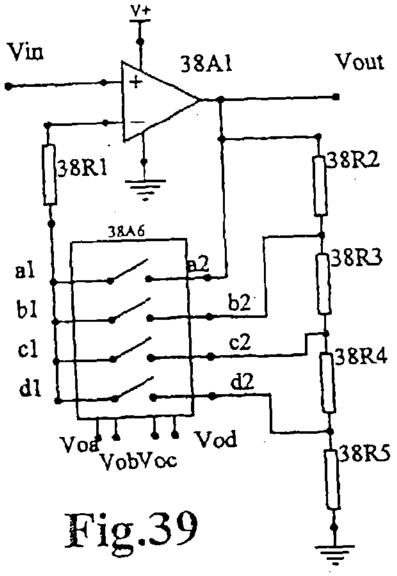
FIG. 39 is an amplifying ratio control circuit used in the pickup of present invention, which can regulate the amplifying ratio of amplification circuit according to receiving distance.

FIG. 39 shows an amplifier electric circuit used by one noise canceling pickup in the pickups of this invention which can adjust amplification coefficient based on receiving distance.

Noise canceling sound sensors with a two-dimensional structure which are arranged in front and rear or non-noise canceling sound sensors can be used for noise canceling reception.

When the Voa, Vob, Voc and Vod, the output ends of the AND gate electric circuits 37*a*1, 137*a*12, 37*a*13 and 37*a*14 in FIG. 38 have high electric level output, the input end of the Voa, Vob, Voc and Vod of analog switch 38*a*6 are actuated to open a1 to a2, b1 to b2, c1 to c2 and d1 to d2 to allow amplifier 38A1 different amplification coefficients.

Figure 40:
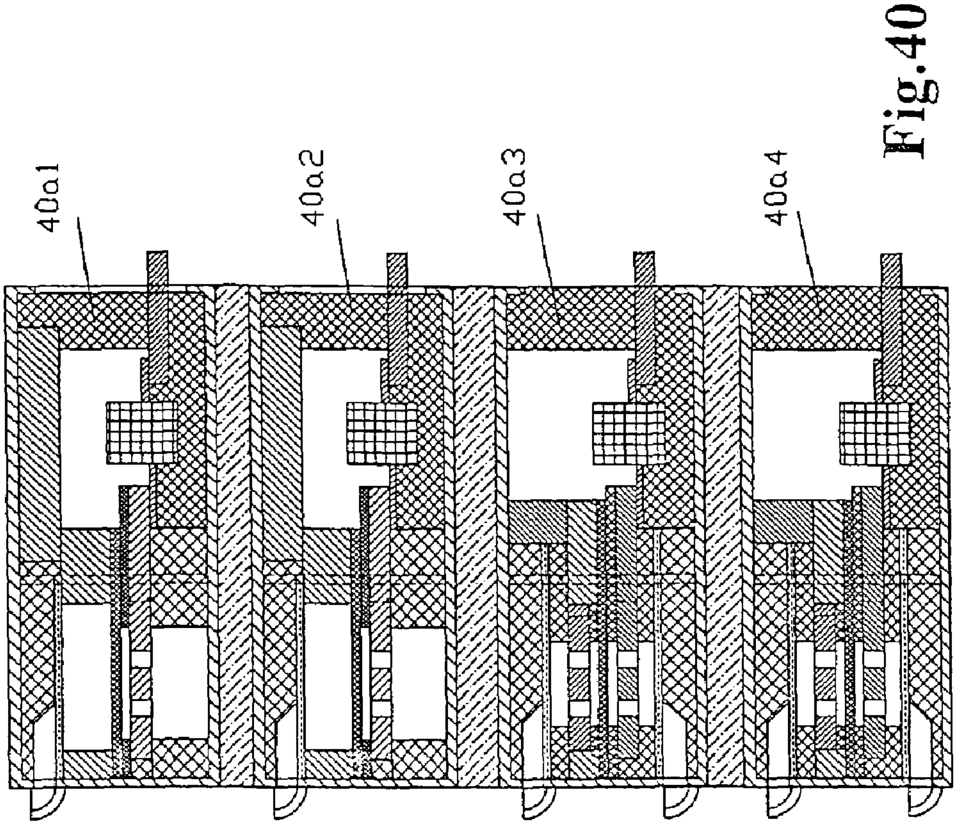
FIG. 40 is a cross section view of a noise-canceling pickup of the present invention.

FIG. 40 shows the sectional view of the noise canceling pickup of this invention.

In comparison of FIG. 40 with FIGS. 22 and 23, it can be seen that the difference is that the pickup comprises multiple non-anti-noise sound sensors 40*a*1, 40*a*2 and noise-canceling sound sensors 40*a*3 and 40*a*4. According to design requirements, it is possible to combine one or more non-anti-noise sound sensors and one or more anti-noise sound sensors.

Figure 41:
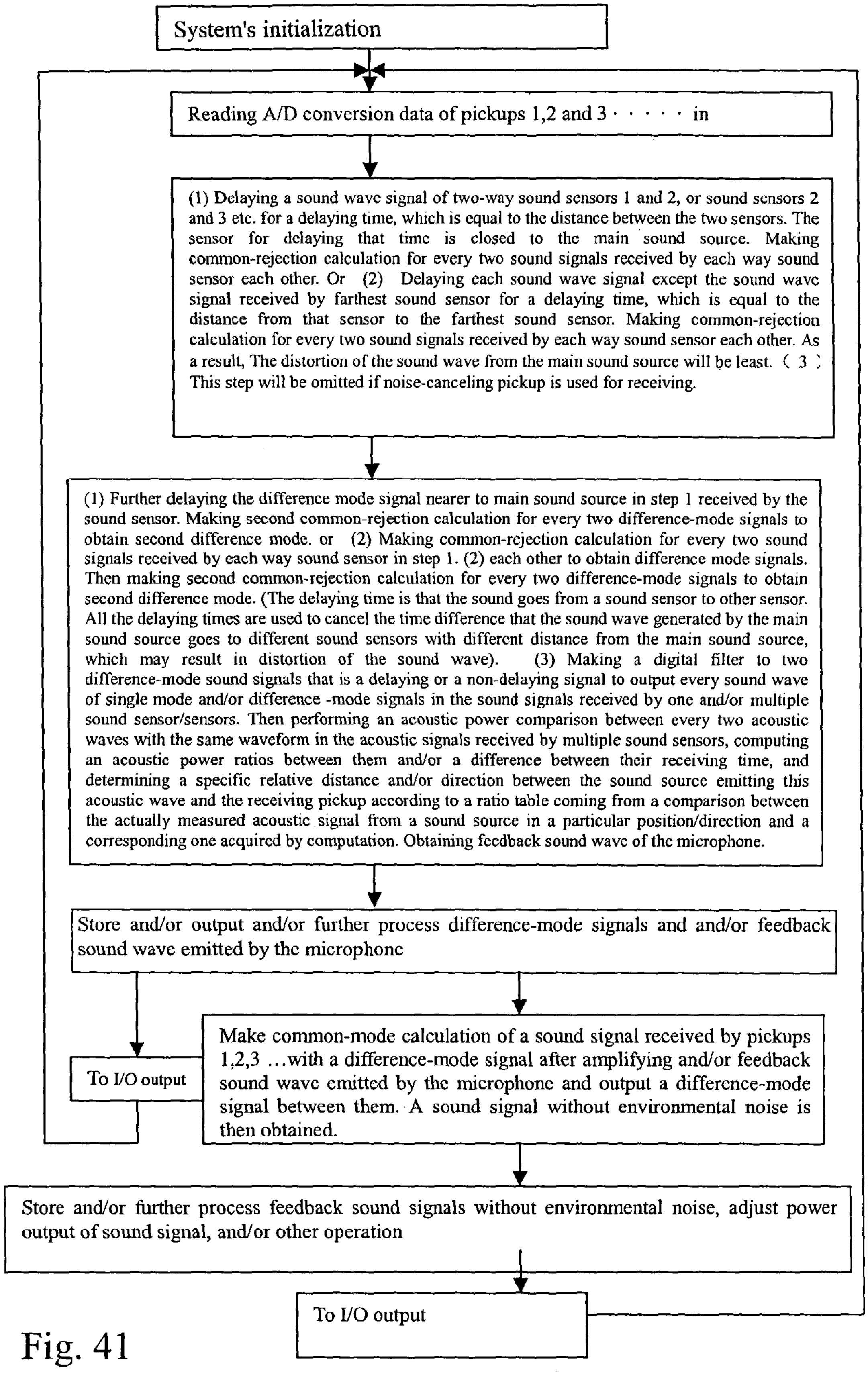
FIG. 41 is a computer flow chart for digital noise-canceling used in the pickup of the present invention.

FIG. 41 shows a digital noise-canceling computer program flow chart of this present invention.

A noise-canceling pickup comprising one or more noise-canceling sound sensors or one or more non-noise-canceling sound sensors outputs multiple sound wave signals received by noise-canceling sound sensors (multiple differential mode signals). The noise-canceling treatment procedure is as follows:

1. When a sound signal from a main sound source is received by multiple non-noise-canceling sound sensors, then (1) Performing a delaying treatment to a sound wave signal received by one of two sound sensors 1 and 2, or sound sensors 2 and 3 etc., which sound sensor is closer to the main sound source. The delaying time is about equal to the time for the sound wave signal to travel from one sound sensor to the other. Making common-rejection calculation for every two sound signals received by each pair of sound sensors, or (2) Performing a delaying treatment to all of the sound wave signals received by sound sensors 1, 2, 3, . . . except the sound wave signal received by the sound sensor located farthest from the main sound source. The delaying time is about equal to the time for the sound wave signal to travel from that corresponding sensor to the farthest sound sensor. Making common-rejection calculation for every two sound signals received by each pair of sound sensors. As a result, the distortion of the sound wave from the main sound source will be minimized.

2. (1) Further delaying the differential mode signal received in the above step (1) by the sound sensor closer to the main sound source. Making second common-rejection calculation for every two differential -mode signals to obtain a second differential mode signal, or (2) Making common-ejection calculation for every two sound signals received by each pair of sound sensors in the above step (2) to obtain differential mode signals. Then making a second common-rejection calculation for every two differential-mode signals to obtain a second differential mode signal. (The delaying time is that the sound wave signal goes from a sound sensor to other sound sensor. All the delaying times are intended to cancel the time difference that the sound wave generated by the main sound source goes to different sound sensors with different distance from the main sound source, which may result in distortion of the sound wave).

(3) Filtering, with a digital filter or other means, two differential-mode sound signals that is a delaying or a non-delaying signal to output every sound wave of single mode and/or differential-mode signals in the sound signals received by one and/or multiple sound sensors. Then performing an acoustic power comparison between sound waves with the same waveform in the acoustic signals received by multiple sound sensors, computing acoustic power ratios between the sound waves and/or a difference between their receiving time, and determining a specific relative distance and/or direction between the main sound source emitting this acoustic wave and the receiving pickup according to a ratio table obtained from a comparison between the actually measured acoustic signal from a sound source in a particular position/direction and a corresponding one acquired by computation. At that time, it is possible to select a sound signal, from the sound signals received by one or multiple sound sensors, that is consistent with the sound signal emitted from the main sound source located at a predetermined distance from the pickup. It is also possible to select a sound signal from one or multiple differential-mode signals that is consistent with the sound signal emitted from the main sound source located at a predetermined distance from the pickup. Then, memorizing and/or outputting that sound signal according to a predetermined distance and/or direction. Re-memorizing or processing those final differential-mode signals and/or sound wave signal generated from the main sound source. For example, according to the difference between the real frequency-response curve and required curve for design, adjusting the frequency-response characters of the sound wave generated by the main sound source, or making common-mode calculation to the differential -mode signals after amplifying some differential-mode signals and one sound signal among the sound signals received by sound sensors 1, 2, 3, . . . to output a new differential-mode signal and to obtain a sound signal from the main sound source without environmental noise, which will be further memorized or processed or output according to design requirements.

This computer process can be realized not only by digital circuit, but also by analogous circuit or by composite circuit, which is integrated with analogous circuit and digital circuit.

All the circuits in this present invention, such as the common-mode rejection circuit and so on, can make use the various circuits in the different patents that I have been applied and have been opened to the public.

Figure 42:
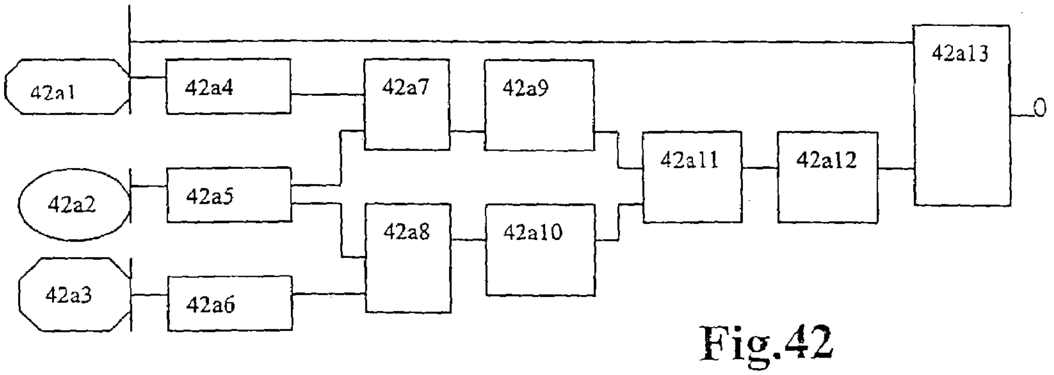
FIG. 42 is a noise canceling circuit bock diagram according to present invention.

FIG. 42 shows a block diagram of a noise-elimination circuit used in the acoustical pickup in this present invention.

It illustrates the anti-noise pickup of the present invention, which comprises multipath non-anti-noise sound sensors. The following block diagram illustrates the process of the noise-canceling treatment of the sound wave signals received by multipath sound sensors in the noise canceling pickup: When several non-anti-noise sound sensors 42*a*1, 42*a*2 and 42*a*3 are used for reception of a sound signal from a main sound source, the above steps 1. and 2. can be used, or different sound wave signals received by sound sensors 42$a$1, 42$a$2 and 42$a$3 can be passed through time-delay circuits 42$a$4, 42$a$5 and 42$a$6 except one channel sound wave signal picked up by the sound sensor which is located farthest away from the main sound source among sound sensors 42$a$1, 42$a$2 and 42$a$3. The delaying time is the time for the sound wave signal to travel from different sound sensors closer to the main sound source respectively to the sound sensor farthest away from the main sound source. The sound wave signal picked up by the sound sensors in different channels between a pair respectively should be passed through the common-mode rejection circuits 42$a$7 and 42$a$8. Thus, the distortion of the sound wave send out by the main sound source in the differential-mode signal can be minimized. The differential-mode signal, which is picked up by the sound sensor nearer to the main sound source in the multipath differential-mode signal gained in the above step 1, is passed through the time-delay circuits 42$a$9 and 42$a$10 once again; the double-path differential-mode signal is passed through the common-mode rejection circuit 42$a$11, and a differential-mode signal is obtained. Alternatively as mentioned above in step 2, after the calculation of common-mode rejection between a pair of signals, multipath differential-mode signals are obtained from the sound wave signals picked up by the sound sensors in different channels. Once again a differential-mode signal is obtained when the double-path or multiple-path differential-mode signals are passed through the common-mode rejection circuit 42$a$11. ( The delayed time is the time used for the sound wave signal to travel from a sound sensor to another sound sensor. All the time delay is intended for elimination of the time difference in the double-path signals caused by the sound wave transmission speed reaching to the front and back sound sensors. This time difference causes the sonic distortion of the sound wave (which is sent out by the main sound source) in differential-mode signal during the common-mode signal is rejected). The regained differential-mode signal is output and/or other further treatment is conducted, for example, taking one channel from the sound wave signals which are picked up from the sound sensors 42$a$1, 42$a$2 and 42$a$3, with the regained differential-mode signal from the amplifying circuit 42$a$12, then through common-mode rejection circuit 42$a$13, the differential-mode signal between them will be obtained, and also the environmental noise of the sound wave from the deleted main sound source is also obtained.

This block diagram process of noise elimination can be realized with digital circuit or with composite circuit integrated with analogue circuit and digital circuit as well. For example, analogue time-delay circuit, CCD time-delay circuit, digital time-delay circuit, etc. can be used for time delay circuit.

Figure 43A:
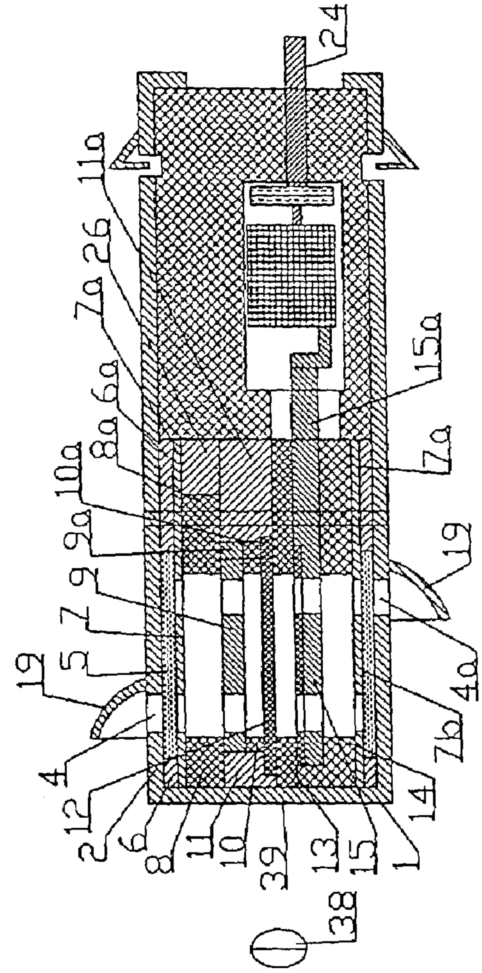
FIG. 43A is the cross section view in line A—A as shown in FIG. 43.
Figure 43:
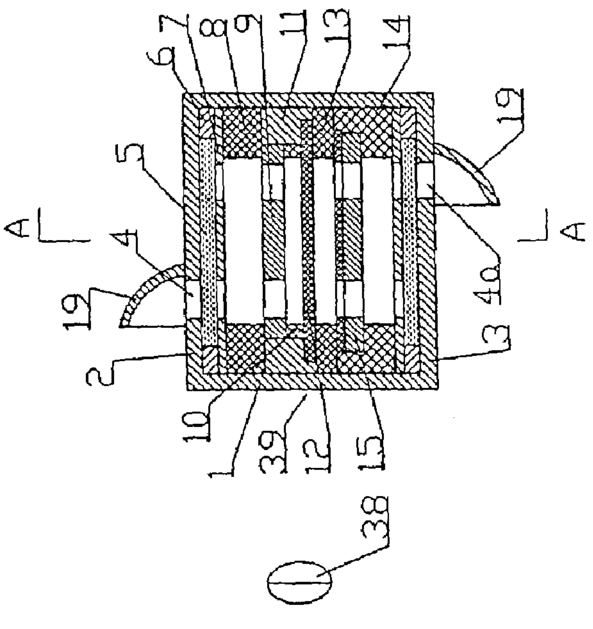
FIG. 43 is a cross section view of a noise-canceling pickup of the present invention.

FIG. 43 shows the sectional drawing of a kind of noise canceling pickup used in this present invention, and FIG. 43A is the sectional drawing A—A in FIG. 43. In comparison with FIG. 1, FIGS. 1A~1C and FIGS. 21A~21C from FIG. 43, their differences are: the front and rear sound inlets 4 and 4$a$ are not provided on the side wall of the outer wall of the inner cylinder body but on the side wall 2 of the front cover of the main cylinder body and on the side wall 3 of the rear cover of the main cylinder body (in those examples mentioned before, the relative position between the main sound source and sound sensor is a relationship of front and back, therefore they are named as side wall of inner cylinder body 1, front wall of front cover 2 and rear cover of rear cover 3. Although the absolute positions of every parts in examples 43, 44 and 45 are not changed, but the relative positions between the main sound source and the sound sensor is changed, therefore the names are changed in Examples 43, 44 and 45 as outer wall of cylinder body 1, side wall of front, cover 2 and side wall of rear cover 3), thus the front and rear sound wave leading modules 7 and 7$a$ and the front and rear sound pipes 27 and 27$a$ in 7 and 7$a$, the outer main cylinder body 33 and the outer rear cylinder body 34 are not used.

In FIG. 1, FIGS. 1A~1C and FIGS. 21A~21C, it is similar to the existing noise canceling pickup, which is on the premises that assume the location of the main sound source is ahead of the front wall of front cover or is at the rear direction on the rear wall of rear cover in the sound sensor, and also is at the extension line of the main cylinder body center line, thus the relative position between the front and rear sound inlet and the main sound source are one at the front and another one at the rear arranged in a row of front and rear. In case the location of the main sound source 40 is at the side of the sound sensor, that is at the periphery of section A—A of the front main cylinder body, the relative position between the front/rear sound inlets and the main sound source is arranged in parallel, so as to reach the main sound source in an equal distance approximately. In the present example, when the main sound source 38 is at the outer side of the outer wall of the cylinder body 1, the surface 39, which corresponding to the outer wall of the cylinder body 1 and the main sound source 38, will become actually the front wall. Place both inlets 4 (one is on the side wall of the main cylinder body front cover, another is on the side wall of the main cylinder body rear cover), one after another corresponding to the side wall of the main cylinder body and the corresponding surface 39 of the main sound source 38. Such as shown in the Figure, the front sound inlet 4 is at one side of the side wall 2 of the main cylinder body front cover (ahead), the rear sound inlet 4$a$ is at the location of another side 3 of the main cylinder body rear cover (rear), vice versa, there is a certain distance difference between front and rear corresponding to the main sound source. That means that the front and rear sound inlets are on the side wall of the main cylinder body front cover and on the side wall of the main cylinder body rear cover respectively in the noise canceling pickup, they are arranged in a row front and rear at one side of the side wall of the main cylinder body front cover and at another side of the side wall of the main cylinder body rear cover corresponding to the direction of the main sound source of the main cylinder body side wall, and it can be either a single inlet or several inlets.

The main sound source 38 in FIG. 43A is placed at the location outside the cylinder body outer wall opposite to the rear cylinder body 20, but is not placed outside of the outer wall of the cylinder body parallel to the side direction of the rear cylinder body 20. This shows when the main sound source 3 8 is different from the relative position of the outer wall of the cylinder body, the relative position of the front and rear sound inlets made on the side wall of the main cylinder body front cover and on the side wall of the main cylinder body rear cover is also different.

The specific location of the main sound source on the peripheral of the outer side surface of the pickup can be determined according to the design. The arrangement of the direction and the location of the front and rear sound inlets 4 and 4$a$ at the side wall 1 of the main cylinder body front cover and the side wall 3 of the main cylinder body rear cover as well as the distance difference of the arrangement corresponding to both main sound sources all can be determined corresponding to the specific location of the main sound source. The sound collecting cap 19 can be or can be not installed outside the front and rear sound inlets.

A new type of high noise canceling pickup with front and rear sound inlets can be produced through reformation according to various types of the noise canceling pickup based on different patents and patent applications of the present inventor. The orientation of the front and rear sound inlets are roughly the same or perpendicular roughly to the high noise canceling pickup.

Figure 44A:
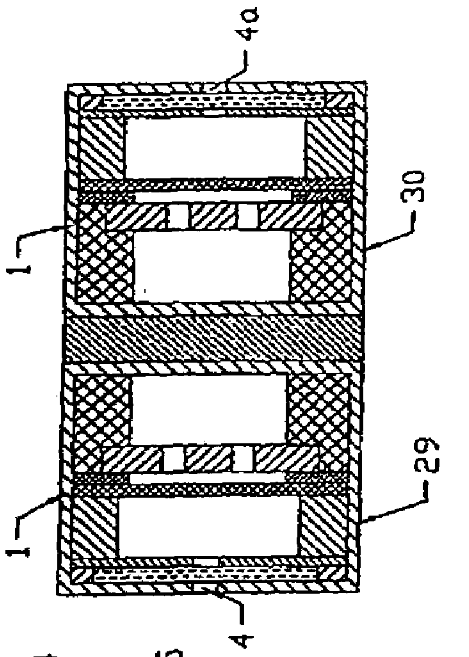
FIG. 44A is the cross section view in line A—A as shown in FIG. 44.
Figure 44:
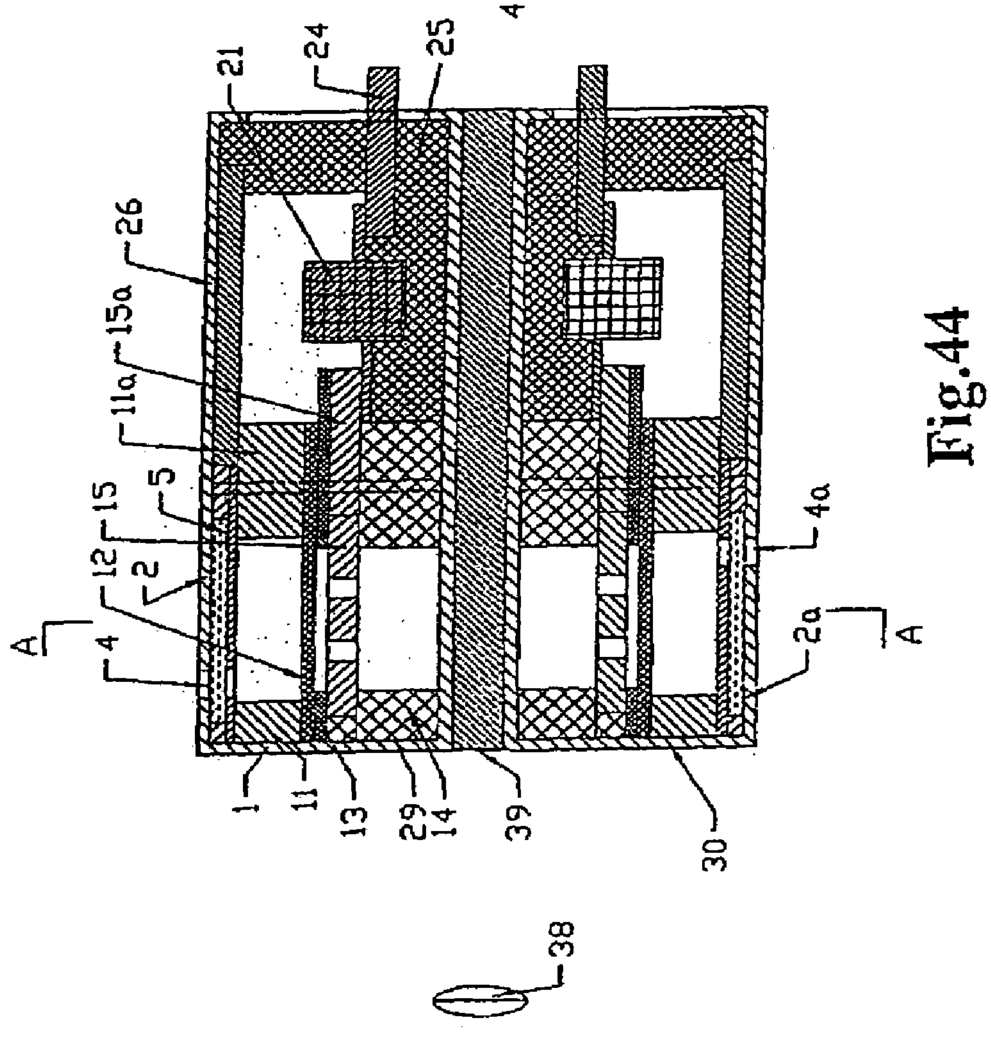
FIG. 44 is a cross section view of a noise-canceling pickup of the present invention.

FIG. 44 shows a sectional view of a noise canceling pickup which is used in the present invention, and FIG. 44A is a section A—A as shown in FIG. 44.

In comparison with FIG. 1, FIGS. 1A~1C, FIG. 43 and FIG. 43A from FIG. 44. The differences are: when the main sound source is at the side surface of the main cylinder body, the inlets 4 and 4*a* are not made at the side wall of the outer wall 1 of the inner cylinder body, but on the side wall 2 of the main cylinder body front cover and on the side wall 2*a* of the main cylinder body rear cover in the two sensors 29 and 30 without noise canceling function parallel to each other. The 2 parallel placed sensors without noise canceling function corresponding to the front sound inlet 4 at the side wall 2 of the main cylinder body front cover and the rear sound inlet 4*a* on the side wall 2*a* of the main cylinder body, are arranged in row one after another corresponding to the orientation of the main sound source of the main cylinder body side wall. For example, in the drawing, the front sound inlet 4 is at a side (ahead) of the side wall 2 of the main cylinder body front cover in a sound sensor, the rear sound inlet 4*a* is another side (rear) of the side wall 2*a* of the main cylinder body in a sound sensor, vise versa, there is a certain distance between the front and the rear corresponding to the main sound source. That means the front and rear sound inlets at the two noise canceling pickups 29 and 30 are not on a same surface in the different side walls of the main cylinder front cover, they are arranged one after another with one at one side of the side wall of the main cylinder body front cover corresponding to the orientation of the main sound source of the main cylinder body side wall, and at another side of the side wall of the cylinder body front cover in another sound sensor. The arrangement may be one inlet or several inlets. In case of several inlets, they can be arranged in parallel location, or formed in a certain angle, or in rows, or with a certain distance between front and rear. Two sound sensors can be closely contacted or with a certain distance (with some filling materials inside).

Figure 45:
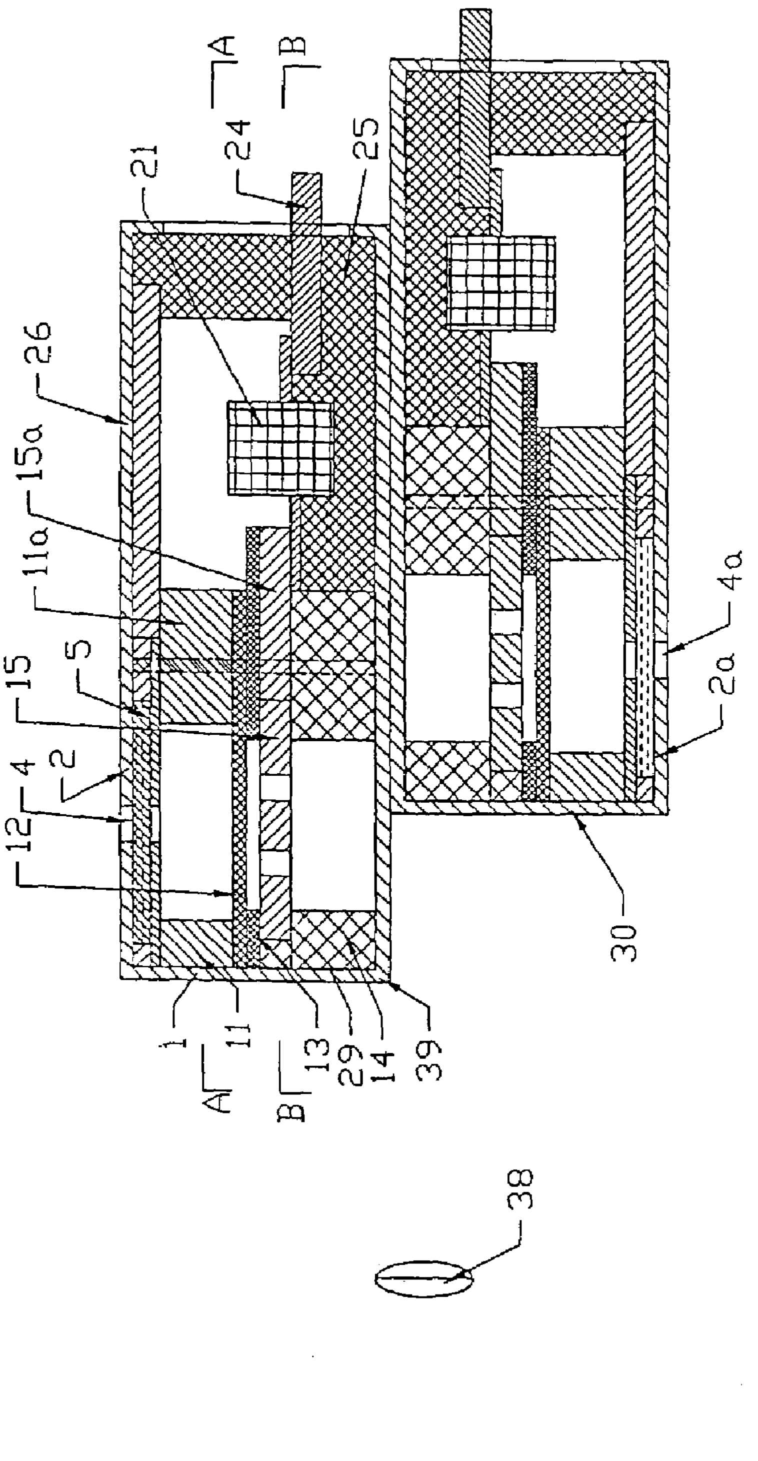
FIG. 45 is a cross section view of a noise-canceling pickup of the present invention.

FIG. 45 shows a sectional drawing of a kind of noise canceling pickup used in the present invention; FIG. 45A is section A—A of FIG. 45. In comparison with FIG. 1, FIGS. 1A~1C, FIG. 43, FIG. 431A, FIG. 44 and FIG. 45 from FIG. 45, the difference are: when the main sound source is at the side surface of the main cylinder body, the sound inlets 4 and 4*a* are not made at the side wall of the outer wall 1 of the inner cylinder body, but on the side wall 2 of the main cylinder body front cover and on the side wall 2*a* of the main cylinder body rear cover in the two non-voise0canceling sensors 29 and 30 which are positioned alternately.

The front sound inlet 4 on the side wall 2 of the cylinder body front cover and the rear sound inlet 4*a* on the side wall 2*a* of the cylinder body front cover placed in the two intersected sensors without noise canceling function, are at a relative centering position on the side walls of the main cylinder body front wall in the two sound sensors, or generally at the opening position of the normal inlet in the sound sensor. The location the inlets in the two sound sensors are roughly the same, it arranged that the two sound sensors without noise-canceling function are placed in parallel but not totally overlap with each other, so as to enable the front and rear sound inlets 4 and 4*a* are placed one after another facing to the orientation of front end 39 of the side wall in the main cylinder body of the main sound source 38.

As shown in FIG. 43, FIG. 44 and FIG. 45, the new type of high noise canceling pickup with front and rear sound inlets can be produced through reformation according to various types of the noise canceling sound pickup based on different patents and patents applications of the present inventor. The orientation of the front and rear sound inlets are roughly the same or perpendicular roughly to the high noise canceling pick up.

For example shown in FIG. 43, FIG. 44 and FIG. 45, although the front and rear sound inlets are placed at the side wall of the main cylinder body front cover and at the side wall of the main cylinder body rear cover in the noise canceling pickup that are two locations at front end and rear end on different surfaces, but in comparison with the end face 39 of the main sound source directly, the noise canceling pickup is still located on the side wall of the outer side wall of the noise canceling pickup (In fact, the pickup direct facing end face 39 of the main sound source is just the side wall of the main cylinder body in the pickup, the side wall 2 of the front cover and the side wall 2*a* of the rear cover in the main cylinder body are just the outer side wall of the main cylinder body).

Explanation:

1. All parts in the present invention can be re-designed either for their internal structure or for their external form based on the design requirement and practical needs, such as outer rear cylinder body, rear main cylinder body, inner main body, inner main cylinder body supporting 31, side wall of inner cylinder body 1, cylinder body 20, rear cylinder body 20*a*, sound collecting cap 19, leading modules of front and rear sound wave 7 and 7*a*, sound inlets 4 and 4*a*, sound inlet pipe 27 and 27, baffle plate 9, baffle plate opening 18, front washer 8, etc. The internal structure can be modified and re-designed with different combination or dismantlement for different parts and components. All parts and components can use all the different regular or irregular and modified shapes: square, rectangle, circular, cylinder, triangle, diamond, polygon, fan, oval different arcs, such as para-curve, and various curves and geometric function curve, as well as different basic shapes with a part of their curves. The shape can be also a complex shape in combination with different basic shapes, or can be a single shape, or can be a composite body formed with different shapes and single combined shape. The part can be a whole one or a part of a whole one. The part can be made with metal material or nonmetal material, or composite material in combination with both materials. However, the shapes and the location of outer rear cylinder body, outer main cylinder body, inner main cylinder body, inner main cylinder body support, inner rear cylinder body and outer cylinder body shall not influence each electret sound sensor. The electret noise canceling pickup and the unit have the noise canceling effect as same as the noise canceling pickup with the orientation and perpendicular with each other roughly the same in the front and rear sound inlets. The parts of inner main cylinder body, outer main cylinder body, inner main cylinder body support, inner rear cylinder body, outer cylinder body, etc. can be connected as a whole one or as separate parts with each other. The whole parts can be used simultaneously or some selected parts can be used. The inner main cylinder body support 31 can be used to connect several inner main cylinder bodies in the electret noise canceling sound sensors (such as the inner main cylinder body of the upper electret sound sensor 29 and the inner main cylinder body of the upper electret sound sensor 29 and the inner main cylinder body of the lower electret sound sensor 30) and several outer main cylinder bodies 25 playing a part in fixing strength. The inner main cylinder body support 31 may be one piece or more with different shapes, such as cross, ring, disk, hook-like or "-". In the combined type of noise canceling pickups, the axis (a center line formed by extension of the center line) of the inner main cylinder body of each electret sound sensor ( such as the inner main cylinder body of the upper electret sound sensor 29 and the inner main cylinder body of lower electret sound sensor 30 can be at a same axis or at different axes. The axes can be paralleled or formed a certain angle each other, when they are at different axes. As the same as mentioned above, in the present invention, the front and rear sound inlets used in different sound sensors and the sound collecting cap 19 placed outside the sound inlet can be placed on a same line or placed on different lines. Both of them can be in parallel each other or have a certain angle, or parallel to the axis of the side wall 1 of the inner cylinder body with each other, or formed a certain angle when they are on different lines. They can be placed on a line parallel to the axis of the sound pickup or on different lines. When they are placed at different lines, the lines can be in parallel or have a certain angle each other.

2. In the present invention, the orientations of the openings of the front and rear sound inlets can be roughly the same (or can be different, the angle of the orientations is about 0° to 135° between two front and rear inlets). The sound collecting cap can be used to make the initial sound inlet forward to the orientation of the main sound source, enable the phase of the entering sound wave roughly the same (but can be a difference in a range of 0°~135° approximately). (A) By making the acoustic characteristics of two sound wave channels from two corresponding initial sound inlets (wherein the two initial sound inlets are corresponding each other and can be located inside either one of the two inner main cylinder bodies) to vibrating diaphragm roughly the same (but can be not the same), and through mechanical action, the phase difference of the sound wave signal between the two channels can be adjusted to about 180° (the phase difference can also be adjusted to about 0°~135°), and a better common-mode rejection effect will be achieved when sound signals act on the vibrating diaphragm, signal output of the differential-mode signal can be obtained so as to achieve the goal of noise elimination. (B) By making the acoustic characteristics of two sound wave channels from two sound inlets to the two sides of the vibrating diaphragm roughly the same and making the phases of the sound signals roughly the same, (or it can be different, the phase difference can be in the range of about 0°~135°), the common-mode rejection can be carried out to eliminate common-mode signal and pick up differential -mode signal so as to achieve the effect of noise elimination, wherein the two sound inlets are corresponding inlets located on the front and rear inner cylinder bodies, respectively.

In the present invention, although the principle and parts of the electret noise canceling sensor have been used, but other various types of sound sensors can also be used in the present invention according to design requirement, such as sound sensors with or without noise canceling function and the principle and parts of various types of sound sensors. With all these principle and parts, the noise canceling sound sensors and single type or combined type of high noise canceling sound sensors can be produced as used in the present invention. The orientations of the front and rear sound inlets used in these sensors can be almost the same or perpendicular to each other. Various kinds of existing noise canceling sound sensors and non-anti-noise sound sensors as well as various components of sound sensors can be used in the present invention, such as: 1. electromagnetic sound sensors, including: a. electro-dynamic sound sensors, consisting of moving-coil sound sensors, flat sound sensors, moving-coil sound sensors, etc., b. electromagnetic sound sensors, etc., c. magnetostrictive sound sensors, etc., 2. electrostatic sound sensors including: a. electrostatic sound sensors, consisting of condenser sound sensors, electret sound sensors, electrostatic sound sensors, etc., b. piezo sound sensors, including those composed of materials such as piezoceramics, Rochelle salts, crystals, piezo polymers, etc., c. electrostrictive sound sensors, consisting of electrostrictive sound sensors, bimorph piezo sound sensors, etc., 3. resistor-transducing sound sensors, including: a. contact impedance sound sensors such as the granular carbon transmitters, etc., b. impedance-transducing sound sensors, consisting of resistor-sensing sound sensors, the semiconductor-sensing sound sensors, etc., 4. photoelectric sound sensors, including: a. phase-varying sound sensors, consisting of interference sound sensors, DAD sound sensors, etc., b. light-quantity-varying sound sensors, such as those that perform picking-up by detecting the light variation reflected from the diaphragm, etc., as well as other sound sensors that can be equivalently used instead of above mentioned sound sensors and its components.

Every kind of sound sensors and every kind of parts mentioned above can be exchanged each other for using. For example, in embodiments of present invention on single noise-canceling sensor, division plate spacer 10, front spacer 8, diaphragm-stretching ring 11, vibration diaphragm 12 and back electrode 15 in internal front cylinder can be exchanged for corresponding sound-picking elements or a complete sound sensor of other kinds of electret sound sensors, condenser sound sensors, moving-coil sound sensors, electromagnetic sound sensors, piezoceramics sound sensors, semiconductor-sensing sound sensors. With Every kind of single existing and new invented non-noise-canceling sensor, the sound sensor elements in the external front cylinder body 33 and the sidewall of the cylinder body can also be exchanged for corresponding sound-picking elements or a complete sound sensor of other kinds of electret sound sensors, condenser sound sensors, moving-coil sound sensors, electromagnetic sound sensors, piezoceramics sound sensors, semiconductor-sensing sound sensors. Of cause, the internal structure should be changed accordingly.

Through noise-canceling method of present invention has better noise-canceling result, but the actual single generated by the main sound source shall be lower than that of general sound sensor. Therefore, amplifier circuit and/or automatic gain control circuit should be added. The general amplifier circuit can be used and can put into the pickup or the outside of the pickup.

3. Accord to design requirements, it is possible to combine the signal noise-canceling sensor or noise-canceling sound-picking-up unit, and/or noise-canceling sensor or noise-canceling sound-picking-up unit that consist of signal non-noise-canceling sensor or non-noise-canceling sound-picking-up unit each other to be multi-pickups with noise-canceling sensor structure or non-noise-canceling sensor structure of front-back-ranged 2D structure or a 3D structure or a 3D array structure.

When multi-noise sound sensors and/or non-noise-canceling sensors are used for front-rear-ranged 2D structure, it is a up-down-ranged structure in accompanied drawings in the manual, and a far-near or front-back relationship for the distance to main sound source.

According to the design requirements, it is possible to use internal front cylinder body and internal rear cylinder body that are connected each other, or only external font cylinder body, or only the front wall of the front cover at the front of the shell and the rear wall of the rear cover at the rear of the shell of the internal front cylinder body and external front cylinder body, or without the front wall of the front cover at the front of the shell or only one of them. When only one sound-picking-up unit and sound sensor in the internal front cylinder body and external front cylinder body, a noise-canceling sensor element and a noise-canceling sound sensor should be used. In case that multiple elements of sound sensor and sound sensors are used, either elements of noise-canceling sound sensor and noise-canceling sound sensor, or elements of non-noise-canceling sound sensor and non-noise-canceling sound sensor can be used. Those elements of sound sensor and sound sensors can set in a same internal front cylinder body and the same external front cylinder body, or put them into the multi internal cylinder body or multiple external front cylinder body. An internal rear cylinder body and external rear cylinder body can connect with one or multiple internal cylinder body/bodies and external cylinder body/bodies. In case multiple sound sensor units or sound sensors are used, each kind of arrangement or combination for direction and position of each sound sensor unit or sound sensor, e.g., each sensor can be series or parallel in connection front and back, can point to the side or to the front or to the back or to the direction at an angle within 360°. All the sound receiving ends can point to same direction, or reverse direction, or opposite direction or to side direction, or a partial to positive direction, other to negative direction or side direction, or to any direction individually. While the position and the direction of the sound-picking-up units or sound sensors is/are changed, each front sound inlet or each rear sound inlet on the front end and the rear end of each electret sound sensor in the internal or external shell and/or the sound gathering cover corresponding to those sound inlets on the external sidewall of internal cylinder body and external cylinder body and/or the front and rear sound guides set around the front and rear sound inlets on internal walls of the internal cylinder body and the external cylinder body, and front and rear sound channels, their positions and directions can be changed partially or completely according to design requirements. Internal rear cylinder body and external rear cylinder body can be installed any position in the internal front cylinder body and external front cylinder body if it does not disturb sound wave going into the front sound inlets and the rear sound inlets. They can point any direction. The relative position between the front cylinder body and the rear cylinder body can be adjusted correspondingly according to design requirements.

4. Due to limited space, every new embodiment established by re-combining every parts and circuits listed in the above preferably embodiments of the present invention can not be described one by one. For example, many new embodiments can be established by exchanging or combining the internal parts in the support of the external rear cylinder body, the external front cylinder body, and the internal front cylinder body, or exchanging or re-combining every kind of sound sensors in present inventor's prior patents and patent applications or every kind of existing noise-canceling sound sensors and non- noise-canceling sound sensors, such as electret sound sensors, condenser sound sensors, moving-coil sound sensors, electromagnetic sound sensors, piezoceramics sound sensors, semiconductor-sensing sound sensors and other kinds of noise-canceling sound sensors and non- noise-canceling sound sensors. Therefore, each kind of embodiments formed by means of re-combining method should be included in this present invention.

5. Internal main cylinder body and external main cylinder body: when the pickup is divided into two parts of front cylinder body and rear cylinder body as shown in FIG. 1, the front cylinder body is the main cylinder body. If there is no rear cylinder body and the electric circuits are set in the main cylinder body, that main cylinder body includes two parts of sound picking-up and electric circuits. The main cylinder body includes three parts: front wall of main cylinder body facing to main sound source, rear wall of main cylinder body reversing from main sound source as well as sidewall of main cylinder body. In each embodiment of pickup as shown in FIG. 1~42, sidewall of main cylinder body is the sidewall 1 of the cylinder body, front wall of main cylinder body is the front wall of front cover, and rear wall of main cylinder body is the rear wall of rear cover. In each embodiment of pickup as shown in FIG. 43~45, sidewall of main cylinder body is the sidewall of the front and/or rear cover of the main cylinder body, front wall of main cylinder body is the sidewall of main cylinder body facing to main sound source, and rear wall of main cylinder body is the sidewall of main cylinder body reversing from main sound source. Therefore, in the accompanying Figures, the front wall of front cover should be named as "sidewall of front cover", the rear wall of rear cover as "sidewall of rear cover", the sidewall of the cylinder body as "external wall of the cylinder body".

This present invention is designed according to the embodiment of electret high-noise-canceling pickup that consists of electret sound sensor. It can use other kind of sound sensor to make corresponding kind of noise-canceling pickup. Of course, the internal structure should be adjusted accordingly.

Although the invention has been explained by detailed descriptions of the preferred embodiments in connection with the accompany drawings as stated above, the present invention is not limited as the disclosed embodiments. It will not difficult for those skilled in the art to make various improvements, modifications and substitutions to the noise-canceling pickup with a combined structure according to the present invention, in the hints contained in the preferred embodiments within the spirits and the scope of the present invention, which are only defined by the appended claims.

The invention claimed is:

1. A noise-canceling pickup, comprising a main cylinder body and a rear cylinder body, wherein the main cylinder body has one or more pickups with one or more noise-canceling sensors and/or one or more non-noise-canceling sensors, the main cylinder body has one or more front and/or rear sound inlets on its sidewall, wherein an intersection angle between a direction of an opening of a front sound inlet and a direction of an opening of a corresponding rear sound inlet is within about 0°~135°;

wherein there is provided a diaphragm-stretching ring in the main cylinder body, a division plate with an extrusion at its center portion is placed between a front spacer in front of the diaphragm-tightening ring and a division plate spacer, the extrusion of the division plate is inserted into the diaphragm-tightening ring, with the edge of the extrusion in tight contact with an inner edge of the diaphragm-tightening ring, forming a cavity between the division plate and a vibration diaphragm.

2. A noise-canceling pickup as claimed in claim 1, wherein the front sound inlet and the rear sound inlet are not interconnected to each other inside the main cylinder body, and are in acoustic communication with a corresponding side of the vibration diaphragm.

3. A noise-canceling pickup as claimed in claim 1, wherein the front sound inlets and the rear sound inlets are provided on sidewall of the main cylinder body.

4. A noise-canceling pickup as claimed in claim 1, wherein the front and the rear sound inlets are provided on sidewall of the sound sensors.

5. A noise-canceling pickup according to claim 1, wherein sound gathering covers corresponding to the front sound inlet and/or the rear sound inlet are provided on an external wall of the main cylinder body.

6. A noise-canceling pickup according to claim 1, wherein the division plate is placed inside the inner edge of the diaphragm-tightening ring.

7. A noise-canceling pickup according to claim 1, wherein mechanical structures at two sides of a vibration diaphragm coupling, respectively, to the front sound inlet and the rear sound inlet are symmetrical.

8. A noise-canceling pickup according to claim 1, wherein there is provided a back electrode, which goes through a back-electrode hole in a back electrode seat at the same level of the back electrode and is connected to a circuit.

9. A noise-canceling pickup according to claim 1, wherein there is provided a sound guide and a sound channel at the place of sound inlet in the main cylinder body.

10. A noise-canceling pickup according to claim 1, wherein an electric circuit is provided in the main cylinder body or in a rear cylinder body.

11. A noise-canceling pickup according to claim 1, wherein a conductive contact between the diaphragm-tightening ring and an outer shell of the sound sensors in the noise canceling pickup is provided in the rear cylinder body.

12. A noise-canceling pickup according to claim 1, wherein the noise-canceling pickup includes pickups that consist of signal or multiple anti-noise sound sensors and/or signal or multiple non-anti-noise sound sensors.

13. A noise-canceling pickup according to claim 1, wherein the noise-canceling pickup includes a sound control switch circuit that comprises a detecting circuit, a comparison circuit and a switching circuit.

14. A noise-canceling pickup according to claim 13, wherein the noise-canceling pickup includes an electric circuit and procedure for a second common mode rejection to a two-way differential mode sound signals received by the anti-noise sound sensors through a common mode rejection circuit.

15. A noise-canceling pickup according to claim 1, wherein the noise-canceling pickup includes a distance alarm circuit, which comprises a comparison circuit that receives multi-way differential mode signals.

16. A noise-canceling pickup according to claim 1, wherein the noise-canceling pickup includes a control circuit to adjust amplifying ratio according to a distance from a sound source to the noise canceling pickup, which comprises a window comparison circuit to receive a multi-way differential mode signal output from the sound sensors.

17. A noise-canceling pickup according to claim 1, wherein said front and rear sound inlets are provided on side wall of a front cover of the front cylinder-body and at side wall of a rear cover of a front cylinder-body along the lines of a main sound source individually at the side of the main cylinder body, and front and back on a side of said front cover and the other side of the rear cover side wall along the lines of the main sound source individually at the side of the main cylinder body.

18. A noise canceling pickup comprising:

a cylinder body division structure including a main cylinder body;

a noise-canceling sound sensor and/or a non-noise-canceling sensor provided in said main cylinder body;

a front sound inlet and a rear sound inlet provided, respectively, on a front end and a rear end of side walls of said main cylinder body;

wherein an angle between orientations of said front sound inlet and said rear sound inlet is in the range of 0°~135°; and wherein there is provided a diaphragm-stretching ring in the main cylinder body, a division plate with an extrusion at its center portion is placed between a front spacer in front of the diaphragm-tightening ring and a division plate spacer, the extrusion of the division plate is inserted into the diaphragm-tightening ring with the edge of the extrusion in tight contact with an inner edge of the diaphragm-tightening ring, forming a cavity between the division plate and a vibration diaphragm.

19. A noise canceling pickup according to claim 18, wherein multiple noise-canceling and/or multiple non-noise-canceling sound sensors are provided in said main cylinder body.

20. A noise canceling pickup according to claim 18, wherein the orientations of the front sound inlet and the rear sound inlet is adjusted to be roughly the same or perpendicular to each other, and to have roughly same acoustic structure of acoustic channels from the front and the rear sound inlets to the vibration diaphragm.

21. A noise canceling pickup according to claim 18, wherein the noise canceling pickup includes an over distance alarm circuit.

22. A noise canceling pickup according to claim 18, wherein a comparison circuit is provided to receive a multi-difference-mode signal from the common-mode rejection circuit, and control amplifying sound signal and/or alarming and/or turning on or off.

* * * * *